US012063093B2

(12) United States Patent
Saggar et al.

(10) Patent No.: US 12,063,093 B2
(45) Date of Patent: *Aug. 13, 2024

(54) CONFIGURATIONS FOR UTILIZATION OF A PADDING DURATION

(71) Applicant: QUALCOMM Incorporated, San Diego, CA (US)

(72) Inventors: Hemant Saggar, Irvine, CA (US); Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 476 days.

This patent is subject to a terminal disclaimer.

(21) Appl. No.: 17/344,859

(22) Filed: Jun. 10, 2021

(65) Prior Publication Data

US 2022/0399930 A1    Dec. 15, 2022

(51) Int. Cl.
*H04B 7/08* (2006.01)
*H04L 27/26* (2006.01)
*H04W 16/28* (2009.01)

(52) U.S. Cl.
CPC ....... *H04B 7/088* (2013.01); *H04L 27/26025* (2021.01); *H04L 27/2607* (2013.01); *H04W 16/28* (2013.01)

(58) Field of Classification Search
CPC . H04B 7/088; H04B 7/0695; H04L 27/26025; H04L 27/2607; H04W 16/28
See application file for complete search history.

(56) References Cited

U.S. PATENT DOCUMENTS

| | | | |
|---|---|---|---|
| 2009/0225707 A1 | 9/2009 | Baldemair et al. | |
| 2011/0103351 A1* | 5/2011 | Wang | H04W 28/065 370/335 |
| 2013/0294262 A1* | 11/2013 | Jose | H04L 1/0009 370/252 |
| 2015/0264161 A1 | 9/2015 | Tian et al. | |
| 2016/0302104 A1 | 10/2016 | Bharadwaj et al. | |
| 2017/0201395 A1* | 7/2017 | Jia | H04L 27/2605 |
| 2018/0367355 A1* | 12/2018 | Pan | H04L 27/2607 |
| 2018/0376423 A1 | 12/2018 | Atefi | |
| 2019/0372704 A1* | 12/2019 | Wang | H04B 7/0632 |
| 2019/0386862 A1* | 12/2019 | Islam | H04L 5/0007 |

(Continued)

*Primary Examiner* — Harry H Kim
*Assistant Examiner* — Mohammed M Murshid
(74) *Attorney, Agent, or Firm* — Holland & Hart LLP

(57) ABSTRACT

Methods, systems, and devices for wireless communication are described. Some user equipments (UEs) and base stations may communicate in a set of transmission time intervals (TTIs) according to a configured subcarrier spacing (SCS). Each TTI may include, in accordance with the SCS, a quantity of symbols, a corresponding quantity of cyclic prefixes, and a padding duration that may be longer than a symbol duration. The base station may transmit a control signal to the UE to indicate a configuration for the padding duration. The configuration may allocate the padding duration for reference signal repetition or one or more other operations. In some examples, the padding duration may be allocated for beam switching, and the one or more other operations may be different than beam switching. The UE and the base station may perform the reference signal repetition or the other operations during the padding duration based on the configuration.

30 Claims, 23 Drawing Sheets

(56) References Cited

U.S. PATENT DOCUMENTS

| | | | |
|---|---|---|---|
| 2020/0099562 A1* | 3/2020 | Pajukoski | H04L 5/0007 |
| 2020/0145268 A1* | 5/2020 | Zhang | H04L 27/2605 |
| 2020/0244503 A1* | 7/2020 | Bala | H04L 5/0044 |
| 2020/0281013 A1* | 9/2020 | Li | H04B 7/063 |
| 2021/0044470 A1 | 2/2021 | Ciochina | |
| 2021/0051653 A1* | 2/2021 | Park | H04W 72/21 |
| 2021/0111778 A1 | 4/2021 | Jung et al. | |
| 2021/0126726 A1 | 4/2021 | Parkvall et al. | |
| 2021/0218608 A1 | 7/2021 | Rama Chandran | |
| 2021/0399934 A1* | 12/2021 | Xia | H04L 27/26025 |
| 2022/0131730 A1* | 4/2022 | Liu | H04L 25/03178 |
| 2022/0210819 A1 | 6/2022 | Sevindik | |
| 2022/0361218 A1 | 11/2022 | He et al. | |
| 2022/0399951 A1 | 12/2022 | Saggar et al. | |

* cited by examiner

CONFIGURATIONS FOR UTILIZATION OF A PADDING DURATION

FIELD OF TECHNOLOGY

The following relates to wireless communication, including configurations for utilization of a padding duration.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a UE and a base station may communicate across a set of transmission time intervals (TTIs) according to a subcarrier spacing (SCS) numerology. A configuration of symbols and corresponding cyclic prefixes in each TTI of the set of TTIs may be based on an SCS. Each TTI may include an integer number of symbols, and with shrinking symbol sizes, an extra duration may be left in each TTI after the symbols and cyclic prefixes are allocated according to an SCS.

SUMMARY

The described techniques relate to improved methods, systems, devices, and apparatuses that support configurations for utilization of a padding duration. Generally, the described techniques provide for a base station to configure a padding duration within a transmission time interval (TTI) (e.g., subframes, half-subframes, slots, or other TTIs) for one or more operations. The base station and a user equipment (UE) may communicate across a set of TTIs according to a subcarrier spacing (SCS) numerology. The base station may transmit an indication of the SCS to the UE. Each TTI of the set of TTIs may include a quantity of symbols, a corresponding quantity of cyclic prefixes, and a padding duration based on the SCS. The padding duration may, in some examples, be longer than a symbol duration of each of the symbols in a TTI. The base station may transmit a control signal to the UE to indicate a configuration for the padding duration. The configuration may allocate the padding duration and a first symbol of the TTI that is subsequent to the padding duration in time for transmission of reference signal repetitions.

Additionally or alternatively, the configuration may allocate the padding duration for one or more other operations. The one or more other operations may include transmission of a reference signal repetition, transmission of a set of extra coding bits, an interference measurement procedure, transmission of an extended cyclic prefix, or any combination thereof. In some examples, the padding duration may be allocated for a beam switching procedure, and the configuration may allocate the padding duration for the one or more other operations that are different from the beam switching procedure. The UE, the base station, or both may perform the indicated operations during the padding duration. For example, the UE or the base station may transmit the reference signal repetitions during the padding duration and the first symbol. Or, the UE or the base station may perform at least one of the one or more operations in at least a portion of the padding duration. By allocating the padding duration for the described operations, the base station and the UE may support efficient utilization of communication resources, improved communication reliability, and reduced latency associated with communications between the base station and the UE.

A method for wireless communication at a UE is described. The method may include receiving an indication of an SCS for communications in a set of multiple TTIs, where a TTI of the set of multiple TTIs includes a set of multiple symbols, a corresponding set of multiple cyclic prefixes, and a padding duration, and where a symbol duration of the set of multiple symbols is based on the SCS, and where the padding duration is longer than the symbol duration, receiving a control signal indicating a configuration for the padding duration, where the configuration allocates the padding duration and a first symbol of the set of multiple symbols for transmission of reference signal repetitions, the first symbol being subsequent in time to the padding duration, and communicating the reference signal repetitions during the padding duration and the first symbol in accordance with the configuration.

An apparatus for wireless communication at a UE is described. The apparatus may include a processor, memory coupled with the processor, and instructions stored in the memory. The instructions may be executable by the processor to cause the apparatus to receive an indication of an SCS for communications in a set of multiple TTIs, where a TTI of the set of multiple TTIs includes a set of multiple symbols, a corresponding set of multiple cyclic prefixes, and a padding duration, and where a symbol duration of the set of multiple symbols is based on the SCS, and where the padding duration is longer than the symbol duration, receive a control signal indicating a configuration for the padding duration, where the configuration allocates the padding duration and a first symbol of the set of multiple symbols for transmission of reference signal repetitions, the first symbol being subsequent in time to the padding duration, and communicate the reference signal repetitions during the padding duration and the first symbol in accordance with the configuration.

Another apparatus for wireless communication at a UE is described. The apparatus may include means for receiving an indication of an SCS for communications in a set of multiple TTIs, where a TTI of the set of multiple TTIs includes a set of multiple symbols, a corresponding set of multiple cyclic prefixes, and a padding duration, and where a symbol duration of the set of multiple symbols is based on the SCS, and where the padding duration is longer than the symbol duration, means for receiving a control signal indicating a configuration for the padding duration, where the configuration allocates the padding duration and a first symbol of the set of multiple symbols for transmission of reference signal repetitions, the first symbol being subsequent in time to the padding duration, and means for communicating the reference signal repetitions during the padding duration and the first symbol in accordance with the configuration.

A non-transitory computer-readable medium storing code for wireless communication at a UE is described. The code may include instructions executable by a processor to receive an indication of an SCS for communications in a set of multiple TTIs, where a TTI of the set of multiple TTIs includes a set of multiple symbols, a corresponding set of multiple cyclic prefixes, and a padding duration, and where a symbol duration of the set of multiple symbols is based on the SCS, and where the padding duration is longer than the symbol duration, receive a control signal indicating a configuration for the padding duration, where the configuration allocates the padding duration and a first symbol of the set of multiple symbols for transmission of reference signal repetitions, the first symbol being subsequent in time to the padding duration, and communicate the reference signal repetitions during the padding duration and the first symbol in accordance with the configuration.

Some examples of the method, apparatuses, and non-transitory computer-readable medium described herein may further include operations, features, means, or instructions for applying the configuration for the padding duration by shifting a first cyclic prefix corresponding to the first symbol to be prior to the padding duration in a time domain.

In some examples of the method, apparatuses, and non-transitory computer-readable medium described herein, the padding duration may be contiguous to the first symbol in a time domain, and one or more samples of each reference signal repetition in the padding duration correspond to a respective cyclic prefix for a subsequent reference signal repetition.

In some examples of the method, apparatuses, and non-transitory computer-readable medium described herein, communicating the reference signal repetitions may include operations, features, means, or instructions for receiving, from a base station, the reference signal repetitions during the padding duration and the first symbol.

In some examples of the method, apparatuses, and non-transitory computer-readable medium described herein, receiving the reference signal repetitions may include operations, features, means, or instructions for receiving the reference signal repetitions using a set of multiple receive beams, where the reference signal repetitions may be transmitted using a same transmit beam and selecting a receive beam from the set of multiple receive beams for reception of subsequent downlink signals in accordance with the reference signal repetitions, where the control signal indicates that the reference signal repetitions may be configured for downlink beam refinement.

In some examples of the method, apparatuses, and non-transitory computer-readable medium described herein, communicating the reference signal repetitions may include operations, features, means, or instructions for transmitting the reference signal repetitions during the padding duration and the first symbol.

In some examples of the method, apparatuses, and non-transitory computer-readable medium described herein, transmitting the reference signal repetitions may include operations, features, means, or instructions for transmitting each of the reference signal repetitions using a same transmit beam, the reference signal repetitions including sounding reference signals (SRSs), where the control signal indicates that the reference signal repetitions may be configured for uplink beam refinement.

In some examples of the method, apparatuses, and non-transitory computer-readable medium described herein, transmitting the reference signal repetitions may include operations, features, means, or instructions for transmitting a set of multiple random access preamble message repetitions during the padding duration and the first symbol.

In some examples of the method, apparatuses, and non-transitory computer-readable medium described herein, communicating the reference signal repetitions may include operations, features, means, or instructions for communicating a first reference signal repetition of the reference signal repetitions prior to the gap period and communicating a second reference signal repetition of the reference signal repetitions in the first symbol after the gap period.

In some examples of the method, apparatuses, and non-transitory computer-readable medium described herein, communicating the first reference signal repetition and the second reference signal repetition may include operations, features, means, or instructions for receiving the first reference signal repetition using a first receive beam, switching to a second receive beam during the gap period subsequent to the first reference signal repetition, and receiving the second reference signal repetition using the second receive beam.

Some examples of the method, apparatuses, and non-transitory computer-readable medium described herein may further include operations, features, means, or instructions for receiving a second control signal indicating a first duration of the gap period.

Some examples of the method, apparatuses, and non-transitory computer-readable medium described herein may further include operations, features, means, or instructions for applying the configuration for the padding duration by allocating a second gap period at a beginning of the padding duration, where a second duration of the second gap period may be based on a first duration of the gap period, a third duration of at least one of the reference signal repetitions, and the padding duration.

In some examples of the method, apparatuses, and non-transitory computer-readable medium described herein, receiving the control signal may include operations, features, means, or instructions for receiving, via the control signal including the configuration for the padding duration, an allocation of resources for the reference signal repetitions, the allocation of the resources indicating at least one of fractions of symbol numbers, symbol numbers corresponding to the SCS, or a bit indicative of a quantity of symbols in the padding duration and a symbol number indicating an offset from the first symbol to the padding duration.

In some examples of the method, apparatuses, and non-transitory computer-readable medium described herein, a quantity of the reference signal repetitions may be based on a ratio of the padding duration to the symbol duration of each symbol of the set of multiple symbols and the symbol duration may be inversely proportional to the SCS.

A method for wireless communication at a UE is described. The method may include receiving an indication of an SCS for communications in a set of multiple TTIs, where a TTI of the set of multiple TTIs includes a set of multiple symbols, a corresponding set of multiple cyclic prefixes, and a padding duration allocated for a beam switching procedure, and where a symbol duration of the set of multiple symbols is based on the SCS and where the padding duration is longer than a duration corresponding to the beam switching procedure, receiving a control signal indicating a configuration for the padding duration, where the configuration allocates the padding duration for one or more operations different than the beam switching procedure, and performing, during at least a portion of the padding duration, at least one operation of the one or more operations for which the padding duration is allocated in accordance with the configuration.

An apparatus for wireless communication at a UE is described. The apparatus may include a processor, memory coupled with the processor, and instructions stored in the memory. The instructions may be executable by the processor to cause the apparatus to receive an indication of an SCS for communications in a set of multiple TTIs, where a TTI of the set of multiple TTIs includes a set of multiple symbols, a corresponding set of multiple cyclic prefixes, and a padding duration allocated for a beam switching procedure, and where a symbol duration of the set of multiple symbols is based on the SCS and where the padding duration is longer than a duration corresponding to the beam switching procedure, receive a control signal indicating a configuration for the padding duration, where the configuration allocates the padding duration for one or more operations different than the beam switching procedure, and perform, during at least a portion of the padding duration, at least one operation of the one or more operations for which the padding duration is allocated in accordance with the configuration.

Another apparatus for wireless communication at a UE is described. The apparatus may include means for receiving an indication of an SCS for communications in a set of multiple TTIs, where a TTI of the set of multiple TTIs includes a set of multiple symbols, a corresponding set of multiple cyclic prefixes, and a padding duration allocated for a beam switching procedure, and where a symbol duration of the set of multiple symbols is based on the SCS and where the padding duration is longer than a duration corresponding to the beam switching procedure, means for receiving a control signal indicating a configuration for the padding duration, where the configuration allocates the padding duration for one or more operations different than the beam switching procedure, and means for performing, during at least a portion of the padding duration, at least one operation of the one or more operations for which the padding duration is allocated in accordance with the configuration.

A non-transitory computer-readable medium storing code for wireless communication at a UE is described. The code may include instructions executable by a processor to receive an indication of an SCS for communications in a set of multiple TTIs, where a TTI of the set of multiple TTIs includes a set of multiple symbols, a corresponding set of multiple cyclic prefixes, and a padding duration allocated for a beam switching procedure, and where a symbol duration of the set of multiple symbols is based on the SCS and where the padding duration is longer than a duration corresponding to the beam switching procedure, receive a control signal indicating a configuration for the padding duration, where the configuration allocates the padding duration for one or more operations different than the beam switching procedure, and perform, during at least a portion of the padding duration, at least one operation of the one or more operations for which the padding duration is allocated in accordance with the configuration.

In some examples of the method, apparatuses, and non-transitory computer-readable medium described herein, performing the at least one operation may include operations, features, means, or instructions for communicating at least one reference signal and at least one corresponding cyclic prefix during the portion of the padding duration, where the portion of the padding duration may be less than or the same as the symbol duration of each symbol of the set of multiple symbols, and where the at least one reference signal may be transmitted in a frequency domain or in a time domain.

In some examples of the method, apparatuses, and non-transitory computer-readable medium described herein, performing the at least one operation may include operations, features, means, or instructions for communicating a set of coding bits during the portion of the padding duration, where the set of coding bits may be communicated in a frequency domain or in a time domain using a cyclic prefix having a reduced duration.

In some examples of the method, apparatuses, and non-transitory computer-readable medium described herein, performing the at least one operation may include operations, features, means, or instructions for performing an interference measurement procedure during the portion of the padding duration to obtain an interference measurement value and transmitting an indication of the interference measurement value to a base station.

In some examples of the method, apparatuses, and non-transitory computer-readable medium described herein, performing the at least one operation may include operations, features, means, or instructions for refraining from transmitting signals during the portion of the padding duration and receiving an indication of an interference measurement value corresponding to an interference measurement procedure performed during the portion of the padding duration in accordance with refraining from transmitting the signals.

In some examples of the method, apparatuses, and non-transitory computer-readable medium described herein, performing the at least one operation may include operations, features, means, or instructions for communicating an extended cyclic prefix during the portion of the padding duration, where the extended cyclic prefix includes a repetition of a first symbol of the set of multiple symbols.

Some examples of the method, apparatuses, and non-transitory computer-readable medium described herein may further include operations, features, means, or instructions for performing the beam switching procedure in a first portion of the padding duration and performing the at least one operation in a remaining portion of the padding duration.

In some examples of the method, apparatuses, and non-transitory computer-readable medium described herein, receiving the control signal may include operations, features, means, or instructions for receiving at least one of a transmission configuration indicator (TCI) state update, downlink control information (DCI), or a medium access control (MAC) control element (CE) including the configuration for the padding duration.

In some examples of the method, apparatuses, and non-transitory computer-readable medium described herein, receiving the control signal may include operations, features, means, or instructions for receiving the control signal including an indication to switch from a first operation of the one or more operations to a second operation of the one or more operations, where performing the at least one operation includes performing the second operation in accordance with the configuration.

In some examples of the method, apparatuses, and non-transitory computer-readable medium described herein, the at least one operation may be based on a criterion associated with the communications between the UE and a base station in the set of multiple TTIs.

In some examples of the method, apparatuses, and non-transitory computer-readable medium described herein, receiving the control signal may include operations, features, means, or instructions for transmitting a UE capability message indicating a beam switching capability of the UE and receiving the control signal in response to the UE capability message, where the one or more operations may be based on the beam switching capability of the UE.

Some examples of the method, apparatuses, and non-transitory computer-readable medium described herein may further include operations, features, means, or instructions for receiving a signal that requests the UE capability message and transmitting the UE capability message in response to the signal.

Some examples of the method, apparatuses, and non-transitory computer-readable medium described herein may further include operations, features, means, or instructions for transmitting an uplink message including a request for the one or more operations and receiving the control signal including the configuration for the padding duration in response to the uplink message, where the configuration indicates the one or more operations based on the uplink message.

A method for wireless communication at a base station is described. The method may include transmitting, to a UE, an indication of an SCS for communications in a set of multiple TTIs, where a TTI of the set of multiple TTIs includes a set of multiple symbols, a corresponding set of multiple cyclic prefixes, and a padding duration, and where a symbol duration of the set of multiple symbols is based on the SCS, and where the padding duration is longer than the symbol duration, transmitting, to the UE, a control signal including a configuration for the padding duration, where the configuration allocates the padding duration and a first symbol of the set of multiple symbols for transmission of reference signal repetitions, the first symbol being subsequent in time to the padding duration, and communicating the reference signal repetitions during the padding duration and the first symbol in accordance with the configuration.

An apparatus for wireless communication at a base station is described. The apparatus may include a processor, memory coupled with the processor, and instructions stored in the memory. The instructions may be executable by the processor to cause the apparatus to transmit, to a UE, an indication of an SCS for communications in a set of multiple TTIs, where a TTI of the set of multiple TTIs includes a set of multiple symbols, a corresponding set of multiple cyclic prefixes, and a padding duration, and where a symbol duration of the set of multiple symbols is based on the SCS, and where the padding duration is longer than the symbol duration, transmit, to the UE, a control signal including a configuration for the padding duration, where the configuration allocates the padding duration and a first symbol of the set of multiple symbols for transmission of reference signal repetitions, the first symbol being subsequent in time to the padding duration, and communicate the reference signal repetitions during the padding duration and the first symbol in accordance with the configuration.

Another apparatus for wireless communication at a base station is described. The apparatus may include means for transmitting, to a UE, an indication of an SCS for communications in a set of multiple TTIs, where a TTI of the set of multiple TTIs includes a set of multiple symbols, a corresponding set of multiple cyclic prefixes, and a padding duration, and where a symbol duration of the set of multiple symbols is based on the SCS, and where the padding duration is longer than the symbol duration, means for transmitting, to the UE, a control signal including a configuration for the padding duration, where the configuration allocates the padding duration and a first symbol of the set of multiple symbols for transmission of reference signal repetitions, the first symbol being subsequent in time to the padding duration, and means for communicating the reference signal repetitions during the padding duration and the first symbol in accordance with the configuration.

A non-transitory computer-readable medium storing code for wireless communication at a base station is described. The code may include instructions executable by a processor to transmit, to a UE, an indication of an SCS for communications in a set of multiple TTIs, where a TTI of the set of multiple TTIs includes a set of multiple symbols, a corresponding set of multiple cyclic prefixes, and a padding duration, and where a symbol duration of the set of multiple symbols is based on the SCS, and where the padding duration is longer than the symbol duration, transmit, to the UE, a control signal including a configuration for the padding duration, where the configuration allocates the padding duration and a first symbol of the set of multiple symbols for transmission of reference signal repetitions, the first symbol being subsequent in time to the padding duration, and communicate the reference signal repetitions during the padding duration and the first symbol in accordance with the configuration.

In some examples of the method, apparatuses, and non-transitory computer-readable medium described herein, communicating the reference signal repetitions may include operations, features, means, or instructions for receiving, from the UE, the reference signal repetitions using a set of multiple receive beams, where the reference signal repetitions may be transmitted using a same transmit beam and selecting a receive beam from the set of multiple receive beams for reception of subsequent uplink signals in accordance with the reference signal repetitions, where the control signal indicates that the reference signal repetitions may be configured for uplink beam refinement.

A method for wireless communication at a base station is described. The method may include transmitting, to a UE, an indication of an SCS for communications in a set of multiple TTIs, where a TTI of the set of multiple TTIs includes a set of multiple symbols, a corresponding set of multiple cyclic prefixes, and a padding duration allocated for a beam switching procedure, and where a symbol duration of the set of multiple symbols is based on the SCS and where the padding duration is longer than a duration corresponding to the beam switching procedure, transmitting, to the UE, a control signal indicating a configuration for the padding duration, where the configuration allocates the padding duration for one or more operations different than the beam switching procedure, and performing, during at least a portion of the padding duration, at least one operation of the one or more operations for which the padding duration is allocated in accordance with the configuration.

An apparatus for wireless communication at a base station is described. The apparatus may include a processor, memory coupled with the processor, and instructions stored in the memory. The instructions may be executable by the processor to cause the apparatus to transmit, to a UE, an indication of an SCS for communications in a set of multiple TTIs, where a TTI of the set of multiple TTIs includes a set of multiple symbols, a corresponding set of multiple cyclic prefixes, and a padding duration allocated for a beam switching procedure, and where a symbol duration of the set of multiple symbols is based on the SCS and where the padding duration is longer than a duration corresponding to the beam switching procedure, transmit, to the UE, a control signal indicating a configuration for the padding duration, where the configuration allocates the padding duration for one or more operations different than the beam switching procedure, and perform, during at least a portion of the padding duration, at least one operation of the one or more operations for which the padding duration is allocated in accordance with the configuration.

Another apparatus for wireless communication at a base station is described. The apparatus may include means for transmitting, to a UE, an indication of an SCS for communications in a set of multiple TTIs, where a TTI of the set of multiple TTIs includes a set of multiple symbols, a corresponding set of multiple cyclic prefixes, and a padding duration allocated for a beam switching procedure, and where a symbol duration of the set of multiple symbols is based on the SCS and where the padding duration is longer than a duration corresponding to the beam switching procedure, means for transmitting, to the UE, a control signal indicating a configuration for the padding duration, where the configuration allocates the padding duration for one or more operations different than the beam switching procedure, and means for performing, during at least a portion of the padding duration, at least one operation of the one or more operations for which the padding duration is allocated in accordance with the configuration.

A non-transitory computer-readable medium storing code for wireless communication at a base station is described. The code may include instructions executable by a processor to transmit, to a UE, an indication of an SCS for communications in a set of multiple TTIs, where a TTI of the set of multiple TTIs includes a set of multiple symbols, a corresponding set of multiple cyclic prefixes, and a padding duration allocated for a beam switching procedure, and where a symbol duration of the set of multiple symbols is based on the SCS and where the padding duration is longer than a duration corresponding to the beam switching procedure, transmit, to the UE, a control signal indicating a configuration for the padding duration, where the configuration allocates the padding duration for one or more operations different than the beam switching procedure, and perform, during at least a portion of the padding duration, at least one operation of the one or more operations for which the padding duration is allocated in accordance with the configuration.

DETAILED DESCRIPTION

Figure 1:
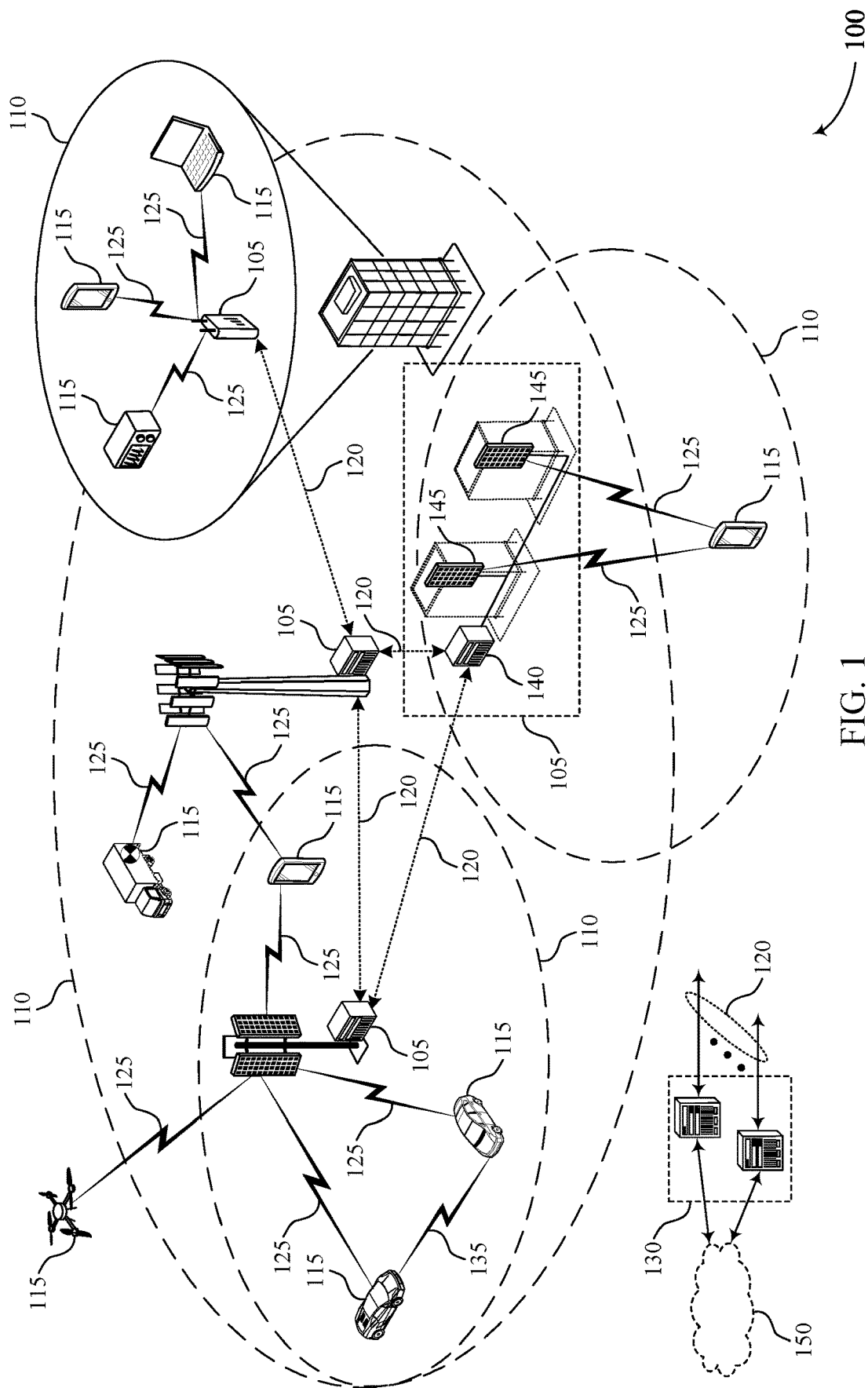
FIG. 1 illustrates an example of a wireless communications system that supports configurations for utilization of a padding duration in accordance with aspects of the present disclosure.

In some wireless communications systems, a user equipment (UE) and a base station may communicate according to a subcarrier spacing (SCS) numerology. A configuration (length and number of symbols within a subframe) for a set of transmission time intervals (TTIs) (e.g., subframes, half-subframes, slots, or other TTIs) may be based on an SCS used for communication. For example, the UE and the base station may communicate via a set of TTIs that each include a quantity of symbols and a corresponding quantity of cyclic prefixes. The quantity of the symbols and cyclic prefixes in a TTI may be inversely proportional to the SCS numerology. That is, as the SCS increases, a duration of the symbols and cyclic prefixes may decrease and more symbols may fit in a TTI. While an integer number of symbols may fit within a TTI, the combination of symbols and cyclic prefixes may result in a portion of the TTI being otherwise unused. The portion may be referred to as a padding duration. Additionally or alternatively, the padding duration may be allocated for beam switching by the UE, the base station, or both. In some examples, however, the beam switching may be performed in a beam switching duration that is shorter than the padding duration, such that at least a portion of the padding duration may be otherwise unused.

To improve utilization of the padding duration for more efficient communications, a padding duration as described herein may be configured for reference signal repetition or other operations. For some SCS values, the padding duration may be the same as or greater than a symbol duration, such that the UE or the base station may transmit a reference signal in a first symbol, and may repeat the reference signal one or more times in the padding duration prior to the first symbol. In such cases, a cyclic prefix for the first symbol may be re-allocated to before the padding duration. At least a portion of the padding duration may correspond to a cyclic prefix for the first symbol. The base station may transmit control signaling to the UE to indicate a configuration for the padding duration, where the configuration allocates the padding duration for the one or more reference signal repetitions. A quantity of repetitions of the reference signal that may be transmitted may be proportional to the SCS. That is, as the SCS increases and the symbol duration decreases, the UE and the base station may be able to communicate more reference signal repetitions in the padding duration (e.g., the padding duration may remain constant irrespective of the SCS). In some examples, the reference signal repetitions in the padding duration may be used for downlink beam refinement or uplink beam refinement by the UE or the base station, respectively. Configuring the padding duration for reference signal repetition may provide for improved communication reliability, more efficient utilization of resources, and reduced latency for communications between the UE and the base station.

In some examples, the padding duration may be allocated for beam switching by the UE, the base station, or both, but the padding duration may be longer than a beam switching duration. In such cases, the UE and the base station may be configured to utilize the padding duration, or at least a remaining portion of the padding duration different than the beam switching duration, for one or more other operations. The one or more other operations may include repetition of a reference signal, reception of extra coding bits, interference measurement, or extension of a cyclic prefix. In some examples, the remaining portion of the padding duration after the beam switch is performed may be less than a symbol duration, and the one or more other operations may be best-effort operations. For example, the UE or base station may transmit a reference signal or coding bits in a reduced duration or using a shortened cyclic prefix. The one or more other operations may be configured at the UE and the base station, indicated to the UE via control signaling, based on a criterion associated with communications between the UE and the base station, based on a UE capability, based on a UE request, or any combination thereof. A UE and a base station may thereby utilize a padding duration for one or more operations to improve utilization of communication resources and reduce latency.

Aspects of the disclosure are initially described in the context of wireless communications systems. Additional aspects are described in the with reference to communication timelines, beam switching timelines, and process flows. Aspects of the disclosure are further illustrated by and described with reference to apparatus diagrams, system diagrams, and flowcharts that relate to configurations for utilization of a padding duration.

FIG. 1 illustrates an example of a wireless communications system 100 that supports configurations for utilization of a padding duration in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and SCS are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include an SCS ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported SCS, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on SCS. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the SCS or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a base station 105 may configure a padding duration within a TTI for one or more operations. The base station 105 and a UE 115 may communicate across a set of TTIs according to an SCS numerology. The base station 105 may transmit an indication of the SCS to the UE 115. Each TTI of the set of TTIs may include a quantity of symbols, a corresponding quantity of cyclic prefixes, and a padding duration based on the SCS. The padding duration may, in some examples, be longer than a symbol duration of each of the symbols in a TTI. The base station 105 may transmit a control signal to the UE 115 to indicate a configuration for the padding duration. The configuration may allocate the padding duration and a first symbol of the TTI that is subsequent to the padding duration in time for transmission of reference signal repetitions.

Additionally or alternatively, the configuration may allocate the padding duration for one or more other operations. The one or more other operations may include transmission of a reference signal repetition, transmission of a set of extra coding bits, an interference measurement procedure, transmission of an extended cyclic prefix, or any combination thereof. In some examples, the padding duration may be allocated for a beam switching procedure, and the configuration may allocate the padding duration for the one or more other operations that are different from the beam switching procedure. The UE 115, the base station 105, or both may perform the indicated operations during the padding duration. For example, the UE 115 or the base station 105 may transmit the reference signal repetitions during the padding duration and the first symbol. Or, the UE 115 or the base station 105 may perform at least one of the one or more operations in at least a portion of the padding duration. By allocating the padding duration for the described operations, the base station 105 may support efficient utilization of communication resources, improved communication reliability, and reduced latency associated with communications between the base station 105 and the UE 115.

Figure 2:
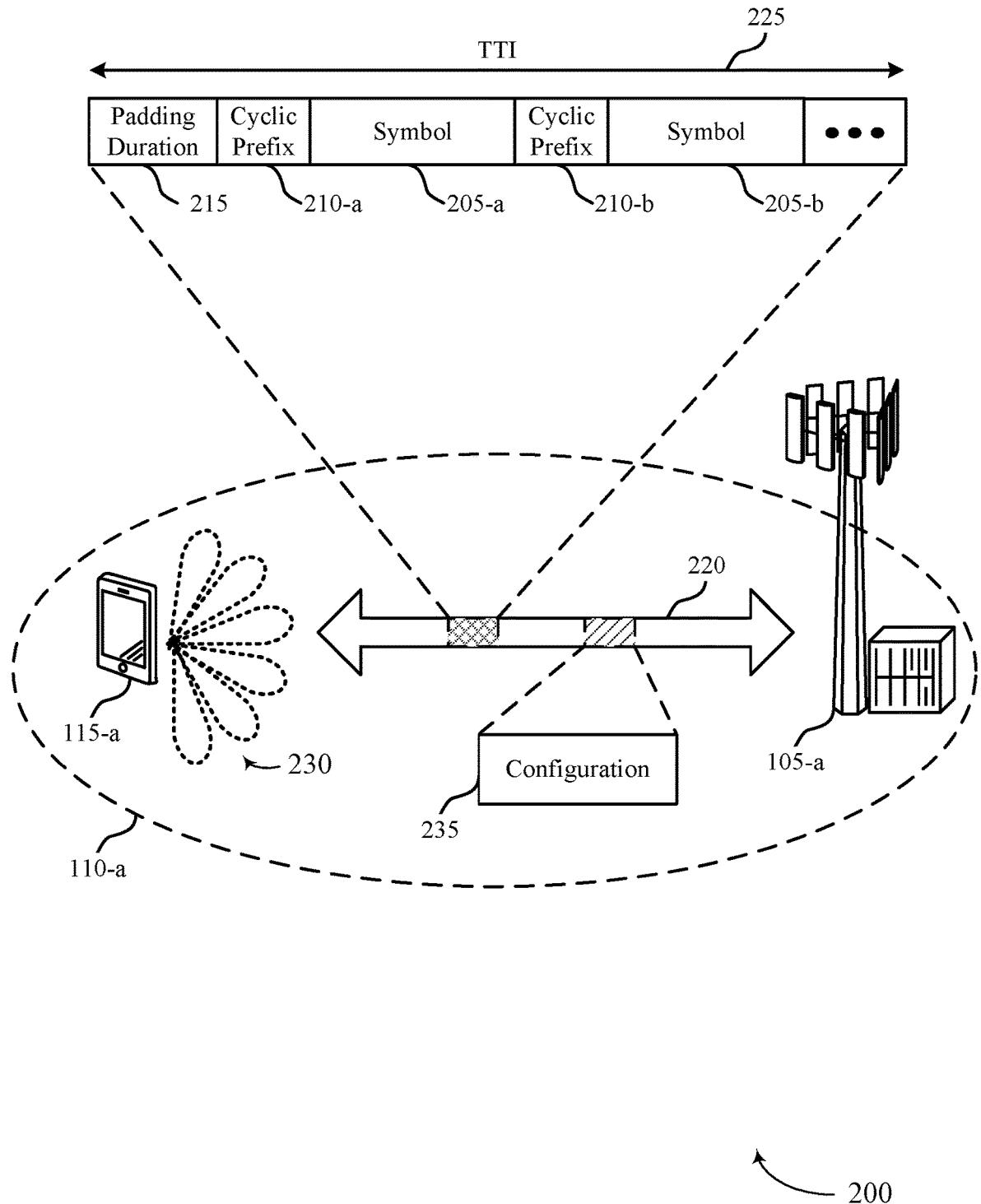
FIG. 2 illustrates an example of a wireless communications system that supports configurations for utilization of a padding duration in accordance with aspects of the present disclosure.

FIG. 2 illustrates an example of a wireless communications system 200 that supports configurations for utilization of a padding duration in accordance with aspects of the present disclosure. The wireless communications system 200 may implement or be implemented by aspects of the wireless communications system 100 as described with reference to FIG. 1. For example, the wireless communications system 200 may illustrate communications between a UE 115-a and a base station 105-a, which may represent examples of a UE 115 and a base station 105 as described with reference to FIG. 1. The UE 115-a and the base station 105-a may communicate via a communication link 220 in a geographic coverage area 110-a. In the example of the wireless communications system 200, the UE 115-a and the base station 105-a may communicate via one or more TTIs 225 according to a configured SCS.

The base station 105-a may transmit an indication of the SCS to the UE 115-a via the communication link 220. The SCS may correspond to a configuration for the TTI 225 (e.g., a half-subframe, a subframe, or some other TTI 225) and one or more other TTIs 225 used for communications between the UE 115-a and the base station 105-a. In addition, higher frequency SCSs result in more symbols of shorter durations within a subframe. Typically, the communications are organized so that each symbol is preceded by a cyclic prefix. For example, the TTI 225 may include a set of symbols 205 (e.g., the symbols 205-a, 205-b, and one or more other symbols 205), a set of cyclic prefixes 210 (e.g., the cyclic prefixes 210-a, 210-b, and one or more other cyclic prefixes 210) corresponding to the set of symbols 205, and a padding duration 215 in accordance with the SCS. The padding duration 215 may be the same as or greater than a duration of each symbol 205 (e.g., if the SCS is large enough to support a padding duration 215 that is the same as or greater than a symbol duration).

As depicted in the example of FIG. 2, each TTI 225 may include an integer number of symbols 205. Accordingly, each TTI 225 may include extra space after each symbol 205 and each corresponding cyclic prefix 210 is allocated. The extra space may be referred to as the padding duration 215. The TTI 225 may include more symbols 205 for higher SCS values. That is, the symbol duration and the cyclic prefix duration may be inversely proportional to the SCS. In some examples, in 15 kHz numerology schemes, a padding duration may be allocated at the beginning of each half-subframe and may be used as an extended cyclic prefix for the first symbol of the half-subframe. As the SCS numerology increases, this padding duration may increase in comparison to the shrinking symbol size. The padding duration 215 may thereby include more symbol durations for higher SCSs. Details of the configuration of each symbol 205, cyclic prefix 210, and the padding duration 215 are described in further detail elsewhere herein, including with reference to FIGS. 3 and 4.

In some cases, the padding duration 215 may include null resources or other unused (e.g., wasted) resources. Additionally, the padding duration 215 may alter a boundary or window for each symbol 205 every TTI 225 (e.g., every 0.5 ms for a half-subframe TTI 225), which may result in wasted processing and overhead by the UE 115-a. To reduce the overhead and improve utilization of the communication resources, the base station 105-a as described herein may transmit a control signal indicating the configuration 235 for the padding duration 215 to the UE 115-a. The configuration 235 may allocate the padding duration 215 for reference signal repetitions, beam switching, or one or more other operations, which may reduce latency and improve utilization of the resources in each TTI 225.

In one example, the configuration 235 may allocate the padding duration 215 for reference signal repetitions. The UE 115-*a* or the base station 105-*a* may communicate the reference signal repetitions in the padding duration 215 and the first symbol 205-*a* of the TTI 225 in accordance with the configuration 235. In some examples, the configuration may indicate the padding duration 215 is to be used for uplink or downlink receive beam refinement. The UE 115-*a* and the base station 105-*a* may communicate using a set of beams 230, which may include transmit or receive beams 230. If the padding duration 215 is to be used for downlink receive beam refinement, the base station 105-*a* may transmit each of the one or more downlink reference signal repetitions using a same transmit beam 230. The UE 115-*a* may receive the reference signal repetitions using multiple receive beams 230 of the set of beams 230. For example, the UE 115-*a* may receive a first reference signal repetition in the padding duration 215 using a first receive beam 230, and the UE 115-*a* may switch to a second receive beam 230 to use for receiving a second reference signal repetition in the first symbol 205-*a* of the TTI 225. The UE 115-*a* may thereby perform beam refinement (e.g., beam sweeping) to select a receive beam 230 for reception of subsequent downlink signals in the symbol 205-*b* or other symbols 205 in the TTI 225.

In other examples, the configuration 235 may configure the padding duration 215 for uplink receive beam refinement, and the UE 115-*a* may transmit uplink reference signal repetitions via the padding duration 215 and the first symbol 205-*a* using a same transmit beam 230. The base station 105-*a* may perform beam sweeping to receive the uplink reference signal repetitions using a set of one or more receive beams 230. The base station 105-*a* may thereby select a receive beam 230 to use for reception of subsequent uplink signals. Additionally or alternatively, the UE 115-*a* may transmit multiple random access preamble message repetitions via the padding duration 215 and the first symbol 205-*a*, which may provide diversity gain and improve a random access procedure between the UE 115-*a* and the base station 105-*a*. Details of the configuration for reference signal repetitions in the padding duration 215 are described in further detail elsewhere herein, including with reference to FIGS. 5 and 6.

In some examples, the configuration 235 may allocate the padding duration 215 for one or more other operations, such as repetition of a reference signal, reception of extra coding bits, interference measurement, or extension of a cyclic prefix. In such cases, the UE 115-*a* or the base station 105-*a* may perform the indicated one or more other operations during at least a portion of the padding duration 215. In some examples, the padding duration 215 may previously be allocated for a beam switching procedure, and the UE 115-*a*, the base station 105-*a*, or both may perform the one or more operations in at least a portion of the padding duration 215 after the beam switching procedure is performed. For example, the beam switching procedure may be performed in a duration that is less than the padding duration 215, and the UE 115-*a* and the base station 105-*a* may utilize a remaining portion of the padding duration 215 for the one or more other operations. Additionally or alternatively, the UE 115-*a*, the base station 105-*a*, or both may perform the one or more operations in at least a portion of the padding duration 215 instead of performing the beam switching procedure. The UE 115-*a* and the base station 105-*a* may thus perform the operations depicted herein to improve utilization of the communication resources, improve communication reliability, and reduce latency. Details of the configuration for the one or more other operations are described in further detail elsewhere herein, including with reference to FIG. 8.

The UE 115-*a* and the base station 105-*a* described herein may thereby perform one or more operations during a padding duration 215 of a TTI 225. The whole padding duration 215 or at least a portion of the padding duration 215 may otherwise be unused. Accordingly, by transmitting the configuration 235 for the padding duration 215, the base station 105-*a* may improve utilization of communication resources and improve communication reliability.

Figure 3:
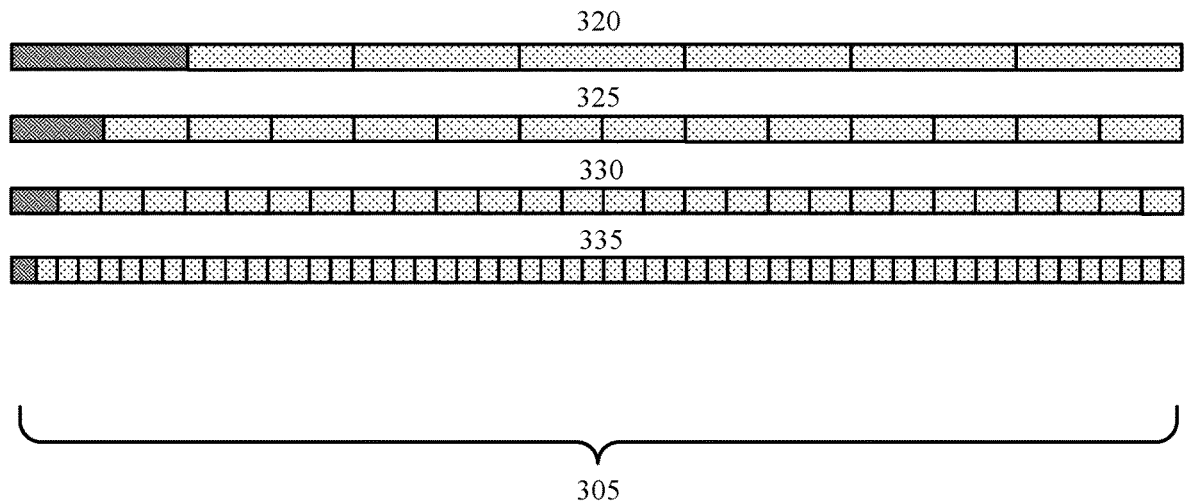
FIG. 3 illustrates an example of a symbol design that supports configurations for utilization of a padding duration in accordance with aspects of the present disclosure.

FIG. 3 illustrates an example of a symbol design 300 that supports configurations for utilization of a padding duration in accordance with aspects of the present disclosure. The symbol design 300 may implement aspects of the wireless communications system 100, the wireless communications system 200, or both, or may be implemented by aspects of the wireless communications system 100, the wireless communications system 200, or both, as described with reference to FIG. 1 and FIG. 2.

As described with reference to FIGS. 1 and 2, a TTI 305 may include a quantity of symbols 310 in accordance with an SCS configured for communications between a UE 115 and a base station 105 via the TTI 305. In particular, FIG. 3 provides for a TTI 305 configuration according to multiple SCS numerologies. In the example of FIG. 3, the TTI 305 may include a half subframe. A duration and quantity of the symbols 310 and cyclic prefixes within each TTI 305 may be based on the configured SCS, and a remaining portion of the TTI 305 may be referred to as a padding duration.

In some wireless communications systems, a first device (e.g., a base station 105) may transmit a signal to a second device (e.g., a UE 115). The signal may include a configuration for time and frequency resources, where the configuration may indicate that the time resources may be divided into subframes, and each subframe may be 1 ms in duration. As depicted in FIG. 3, half-subframes (e.g., 0.5 ms) 305 may include one or more OFDM symbols 310 each having a first duration, and a corresponding cyclic prefix. Each cyclic prefix may have a second duration (e.g., shorter than the OFDM symbol duration). In some cases, a half-subframe may include an OFDM symbol and a corresponding extra cyclic prefix 315 (e.g., longer in duration than other cyclic prefix durations in the subframe). Such extra cyclic prefix may be included in or be otherwise referred to as an extra padding. In some cases, the OFDM symbol with the extra cyclic prefix may be included in the first symbol of the half-subframe (e.g., first symbol in time).

As depicted herein, an SCS may define a spacing in the frequency domain between subcarriers. For example, signal 320 with an SCS of 15 kHz may include one or more subcarriers with a 15 kHz spacing between each subcarrier. SCS may be associated with an OFDM symbol length with cyclic prefix such that a first signal having an SCS that is double a second SCS of a second signal may be associated with an OFDM symbol length and cyclic prefix length that is half that of the OFDM symbol length and cyclic prefix length of the second signal having the second SCS. However, the second signal may be associated with twice as many OFDM symbols and corresponding cyclic prefixes per half-subframe as that of the first signal. For example, a 15 kHz SCS signal may include 7 symbols per half-subframe, each symbol length being 66.67 µs, while signal 325 with 30 kHz may include 14 symbols per half-subframe, each symbol length being 33.3 µs. Other signals may include the same or other SCS configurations (e.g., signal 330 with 60 kHz, signal 335 with 120 kHz, or other signals with other SCS values). However, in some cases, an extra padding length may remain constant across different SCS for OFDM symbols with the extra padding length. For example, signal 320 having an SCS of 15 kHz may include an OFDM symbol with cyclic prefix with an extra padding duration of 5.2 µs, and signal 325 having an SCS of 30 kHz may include an OFDM symbol with cyclic prefix with an extra padding duration of 5.2 µs. Thus, a configuration (length and number of symbols within a subframe) for a set of TTIs (e.g., subframes, half-subframes, slots, or other TTIs) may be based on an SCS used for communication. As the SCS increases, a duration of the symbols and cyclic prefixes may decrease and more symbols may fit in a TTI. While an integer number of symbols may fit within a TTI, the combination of symbols and cyclic prefixes may result a portion of the TTI not being available for communication, or otherwise unused. Table 1 illustrates examples of SCS configurations, demonstrating the effects of increasing or decreasing SCS for some signals.

TABLE 1

Symbol, Cyclic Prefix, and Extra Padding Durations in NR up to 240 kHz SCS

| SCS (kHz) | Number of Symbols per 0.5 ms | Symbol Duration (µs) | Cyclic Prefix Duration (µs) | Extra Padding Duration (µs) |
|---|---|---|---|---|
| 15 | 7 | 66.67 | 4.69 | 5.2 |
| 30 | 14 | 33.33 | 2.34 | 5.2 |
| 60 | 28 | 16.67 | 1.17 | 5.2 |
| 120 | 56 | 8.33 | 0.59 | 5.2 |
| 240 | 112 | 4.17 | 0.29 | 5.2 |

Figure 4:
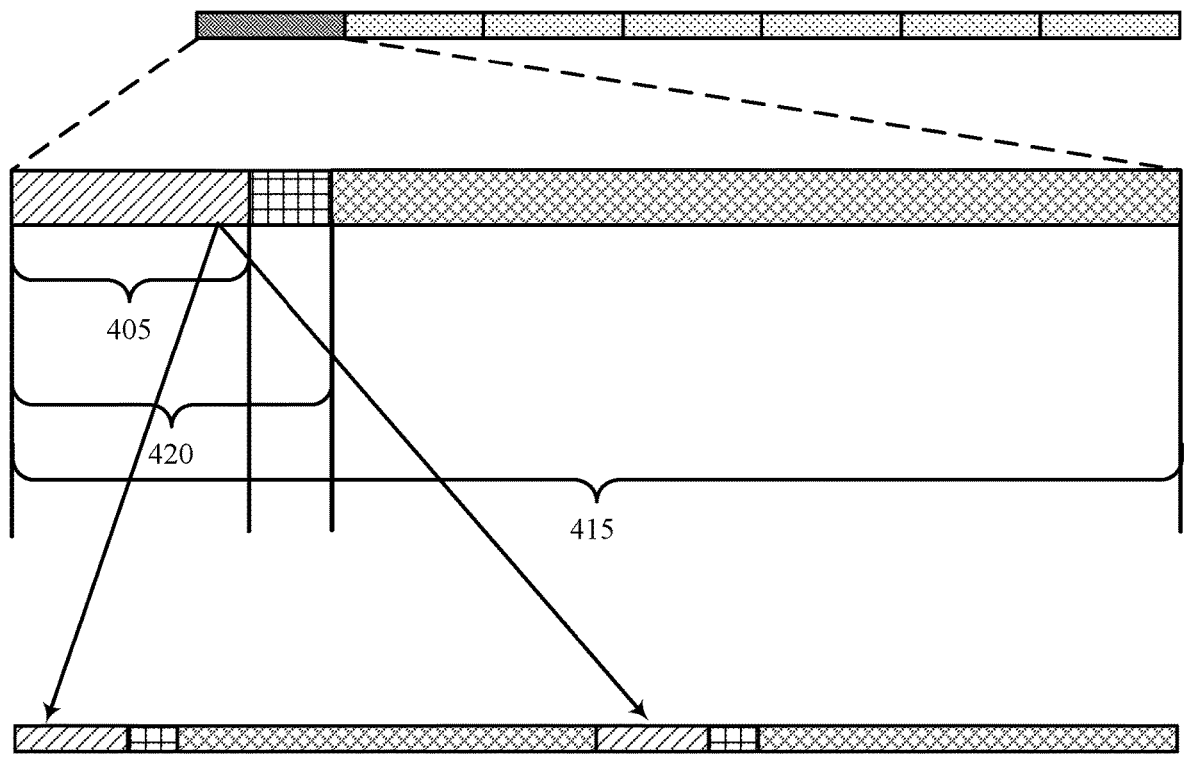
FIG. 4 illustrates an example of an extra padding duration that supports configurations for utilization of a padding duration in accordance with aspects of the present disclosure.

FIG. 4 illustrates an example of an extra padding duration 400 that supports configurations for utilization of a padding duration in accordance with aspects of the present disclosure. Extra padding duration 400 may implement aspects of the wireless communications system 100, the wireless communications system 200, or both, or may be implemented by aspects of the wireless communications system 100, the wireless communications system 200, or both, as described with reference to FIG. 1 and FIG. 2.

Extra padding 405 in addition to cyclic prefix 410 for a symbol with extra cyclic prefix 415 may be null resource (e.g., wasted resource) in cases where the extra padding 405 is used as extra cyclic prefix 420. Further, as illustrated in Tables 1 and 2, the extra padding 405 duration remains constant even as SCS increases.

TABLE 2

Symbol, Cyclic Prefix, and Extra Padding Durations in NR from 480 kHz to 3840 kHz

| SCS (kHz) | Fast Fourier Transform (FFT) Size ($N_{FFT}$) | Max Bandwidth (BW) (GHz) | Chip Duration (nanoseconds (ns)) | Symbol Duration (ns) | Cyclic Prefix and Extra Padding* Duration (ns) |
|---|---|---|---|---|---|
| 480 | 4096 | 1.97 | Tc | 4096Tc | 288Tc + 1024Tc* |
| 960 | 4096 | 3.93 | Tc/2 | 2048Tc | 144Tc + 1024Tc* |
| 1920 | 4096 | 7.86 | Tc/4 | 1024Tc | 72Tc + 1024Tc* |
| 3840 | 4096 | 15.73 | Tc/8 | 512Tc | 36Tc + 1024Tc* |
| 7680 | 4096 | 31.46 | Tc/16 | 256Tc | 18Tc + 1024Tc* |
| 15360 | 4096 | 62.92 | Tc/32 | 128Tc | 9Tc + 1024Tc* |

In particular, Table 2 illustrates that increasing SCS values for signals may correspond with decreasing symbol, chip, and cyclic prefix durations. In some cases, a chip time or duration may be a basic frame period for radio processing. In some cases, Table 4 may assume a fixed FFT size of 4096 (e.g., 4K), and that a symbol duration and a cyclic prefix duration may decrease along with corresponding increases in SCS values. However, increasing SCS values may correspond with a constant extra padding 405 duration (e.g., 1024Tc, where, in some cases, $$Tc = \frac{1}{480 \text{ KHz} * 4096} = 0.509 \text{ ns}).$$

Thus, there may exist an SCS value for which the extra padding duration equals or approximately equals the symbol duration. For example, in Table 2, an SCS value of 1920 kHz includes a symbol duration of 1024Tc, and an extra padding duration of 1024Tc. However, for signals with relatively high SCS, and thus relatively low symbol durations, the extra padding 405 duration may exceed a symbol duration corresponding to the relatively high SCS. For example, for an SCS of 3840 kHz, the symbol duration and the cyclic prefix duration combined total 512Tc+36Tc=548Tc, while the extra padding duration equals 1024Tc. Higher SCS values may thus result in the extra padding 405 duration including a significant fraction of an OFDM symbol 425. Such a fraction may be illustrated in Table 3, showing that increased SCS may result in the extra padding 405 duration constituting an increasingly higher percentage of the symbol duration. Table 3 also illustrates that the cyclic prefix (e.g., cyclic prefix 410) duration remains relatively unchanged as SCS values increase.

TABLE 3

Cyclic Prefix and Extra Padding at Various SCS

| Parameter | Value | Value | Value | Value | Value |
|---|---|---|---|---|---|
| SCS | 960 kHz | 1920 kHz | 3840 kHz | 7680 kHz | 15360 kHz |
| Chip/Sample Duration Tc | Tc/2 | Tc/4 | Tc/8 | Tc/16 | Tc/32 |
| $N_{FFT}$ | 4096 | 4096 | 4096 | 4096 | 4096 |
| OFDM Symbol Duration | 4096 chips | 4096 chips | 4096 chips | 4096 chips | 4096 chips |
| Cyclic Prefix Duration | 288 samples = 7% of symbol | 288 samples = 7% of symbol | 288 samples = 7% of symbol | 288 samples = 7% of symbol | 288 samples = 7% of symbol |

TABLE 3-continued

Cyclic Prefix and Extra Padding at Various SCS

| Parameter | Value | Value | Value | Value | Value |
|---|---|---|---|---|---|
| Extra Cyclic Prefix Duration | 2048 + 288 samples = 57% of symbol | 4096 + 288 samples = 107% of symbol | 8192 + 288 samples = 207% of symbol | 16384 + 288 samples = 407% of symbol | 32768 + 288 samples = 807% of symbol |
| Number of Symbols in Half-Subframe | 488 | 996 | 1992 | 3984 | 7968 |

In some cases, such as for higher SCS scenarios, the extra padding 405 may be split into one or more padding durations, each padding duration corresponding to a symbol, as illustrated in FIG. 4. In some cases, such splitting of the extra padding 405 may allow for increased effectivity in beam switching at a UE (e.g., in downlink transmission), or at a base station (e.g., a gNB, in uplink transmission). Additionally or alternatively, the extra padding 405 may be split over two, four, eight, or other quantities of symbols. For example, Table 4 may illustrate that the extra padding 405 may be split over a first and a second symbol, the first through a fourth symbol, the first through an eighth symbol, or the like for 960 kHz SCS signals. Tables 5 and 6 may further illustrate scenarios for splitting the extra padding 405 over the first through a sixteenth symbol and the first through a thirty-second symbol for 1920 kHz SCS and 3840 kHz SCS signals, respectively. As depicted in Tables 4, 5, and 6, a device may sample a continuous-time signal a number of times during a sampling period to form a discrete-time signal depending on an SCS for the signal, which symbols include the distributed extra cyclic prefix 405, and the like. Table 4 may also illustrate the reduction in duration of extra cyclic prefix as extra cyclic prefix 405 is distributed to an increasing number of symbols.

TABLE 4

Extra Padding Splitting Options at 960 kHz SCS

| Symbols to Distribute Extra Cyclic Prefix Over | Samples in Extra Cyclic Prefix at Sampling Period of (Tc/2, 8Tc) | Duration (ns) of extra Cyclic Prefix | Samples in Cyclic Prefix at Sampling Period of (Tc/2, 8Tc) | Duration (ns) of Cyclic Prefix |
|---|---|---|---|---|
| 1st symbol every 448 symbols | (2336, 146) | 594.1 | (288, 18) | 73.3 |
| 1st to 2nd symbols every 448 symbols | (1312, 82) | 333.7 | (288, 18) | 73.3 |
| 1st to 4th symbols every 448 symbols | (800, 50) | 203.4 | (288, 18) | 73.3 |
| 1st to 8th symbols every 448 symbols | (544, 34) | 138.3 | (288, 18) | 73.3 |

TABLE 5

Extra Padding Splitting Options at 1920 kHz SCS

| Symbols to Distribute Extra Cyclic Prefix Over | Samples in Extra Cyclic Prefix at Sampling Period of (Tc/4, 4Tc) | Duration (ns) of extra Cyclic Prefix | Samples in Cyclic Prefix at Sampling Period of (Tc/4, 4Tc) | Duration (ns) of Cyclic Prefix |
|---|---|---|---|---|
| 1st of 996 symbols every half-subframe | (4384, 274) | 557.4 | (288, 18) | 36.6 |
| 1st and 2nd of 996 symbols every half-subframe | (2336, 146) | 297.0 | (288, 18) | 36.6 |
| 1st to 4th of 996 symbols every half-subframe | (1312, 82) | 166.8 | (288, 18) | 36.6 |
| 1st to 8th of 996 symbols every half-subframe | (800, 50) | 101.7 | (288, 18) | 36.6 |
| 1st to 16th of 996 symbols every half-subframe | (544, 34) | 69.2 | (288, 18) | 36.6 |

TABLE 6

Extra Padding Splitting Options at 3840 kHz SCS

| Symbols to Distribute Extra Cyclic Prefix Over | Samples in Extra Cyclic Prefix at Sampling Period of (Tc/8, 2Tc) | Duration (ns) of extra Cyclic Prefix | Samples in Cyclic Prefix at Sampling Period of (Tc/8, 2Tc) | Duration (ns) of Cyclic Prefix |
|---|---|---|---|---|
| 1st of 1992 symbols every half-subframe | (8480, 530) | 539.1 | (288, 18) | 18.3 |
| 1st and 2nd of 1992 symbols every half-subframe | (4384, 274) | 278.7 | (288, 18) | 18.3 |
| 1st to 4th of 1992 symbols every half-subframe | (2336, 146) | 148.5 | (288, 18) | 18.3 |
| 1st to 8th of 1992 symbols every half-subframe | (1312, 82) | 83.4 | (288, 18) | 18.3 |
| 1st to 16th of 1992 symbols every half-subframe | (800, 50) | 50.9 | (288, 18) | 18.3 |
| 1st to 32nd of 1992 symbols every half-subframe | (544, 34) | 34.6 | (288, 18) | 18.3 |

Figure 5A:
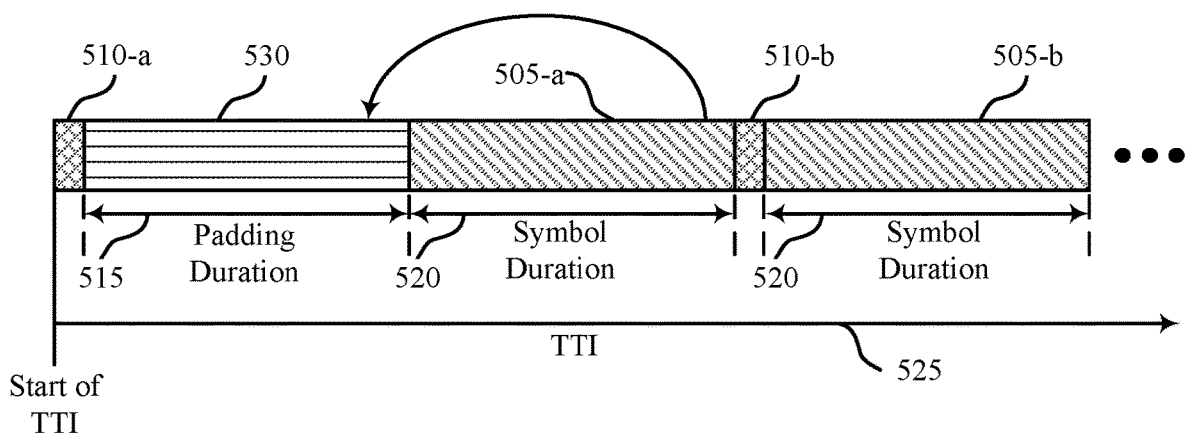
FIGS. 5A and 5B illustrate examples of communication timelines that support configurations for utilization of a padding duration in accordance with aspects of the present disclosure.
Figure 5B:
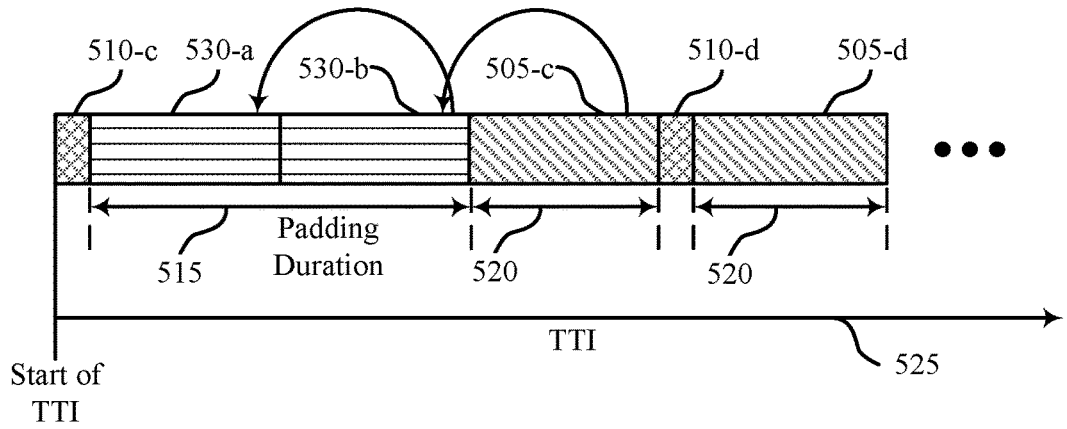

FIGS. 5A and 5B illustrate examples of communication timelines 500-a and 500-b that support configurations for utilization of a padding duration in accordance with aspects of the present disclosure. The communication timelines 500-a and 500-b may implement or be implemented by aspects of the wireless communications systems 100 and 200 as described with reference to FIGS. 1 and 2. For example, the communication timelines 500-a and 500-b illustrate resources allocated for communications between a UE 115 and a base station 105, which may represent examples of a UE 115 and a base station 105 as described with reference to FIGS. 1 through 4. The communication timelines 500-a and 500-b illustrate resources allocated for communications between the UE 115 and the base station 105 in one or more TTIs 525. The communication timelines 500-a and 500-b may be configured according to first and second SCSs, respectively.

FIG. 5A illustrates an example communication timeline 500-a, which illustrates communications between a UE 115 and a base station 105 according to a first SCS (e.g., 1920 kHz, or some other SCS). The communication timeline 500-a illustrates a portion of a TTI 525, such as a half-subframe, a subframe, or some other TTI 525. The TTI 525 may include a quantity of symbols 505 (e.g., OFDM symbols 505, such as the symbols 505-a, 505-b, and one or more other symbols 505), a corresponding quantity of cyclic prefixes 510 (e.g., the cyclic prefixes 510-a, 510-b, and one or more other cyclic prefixes 510), and a padding duration 515. A symbol duration 520 for each symbol 505 may be based on (e.g., inversely proportional to) the SCS. Similarly, a duration of each cyclic prefix 510 may be inversely proportional to the SCS. In the example of the communication timeline 500-a, the padding duration 515 may be the same as or longer than the symbol duration 520, such that an entire symbol 505 may be repeated in the padding duration 515.

As described herein, the UE 115 may receive a control signal from the base station 105 that indicates a configuration for the padding duration 515. The configuration may allocate the padding duration 515 and the first symbol 505-a of the quantity of symbols 505 in the TTI 525 for transmission of reference signal repetitions 530. For example, the configuration may allocate the first symbol 505-a for transmission a reference signal (e.g., with repetition=ON) and the padding duration 515 for a repetition 530 of the reference signal. In such cases, the cyclic prefix 510-a may be re-allocated such that the cyclic prefix 510-a occurs prior to the padding duration 515 in time. The cyclic prefix 510-a may be re-allocated because one or more samples (e.g., the ending samples) of the reference signal repetition 530 in the padding duration 515 may correspond to a cyclic prefix 510 for the subsequent reference signal transmission in the first symbol 505-a. That is, the one or more samples of the reference signal repetition 530 may repeat one or more of the ending samples of the reference signal transmission in the first symbol 505-a (e.g., as illustrated by the curved arrow in FIG. 5A).

The configuration may allocate the padding duration 515 for uplink reference signal repetitions or downlink reference signal repetitions. That is, the UE 115 or the base station 105 may be configured to transmit reference signals via the padding duration 515 and the first symbol 505-a. If the padding duration 515 is allocated for downlink reference signal repetition 530, the base station 105 may transmit a downlink reference signal, such as a CSI-RS, an SSB, or some other downlink reference signal, via the first symbol 505-a, and the base station 105 may transmit a repetition 530 of the downlink reference signal via the padding duration 515. In such cases, the configuration may indicate that the padding duration 515 is allocated for downlink beam refinement. The base station 105 may transmit the downlink reference signal repetition 530 and the downlink reference signal using a same transmit beam, and the UE 115 may receive the reference signal repetition 530 and the reference signal using a set of receive beams. For example, the UE 115 may use a first receive beam to receive the downlink reference signal repetition 530 via the padding duration 515, and the UE 115 may switch beams and use a second receive beam to receive the downlink reference signal via the first symbol 505-a. As such, the UE 115 may perform downlink beam refinement and select a receive beam from the set of receive beams for reception of subsequent downlink signals based on receiving the reference signal repetition 530.

If the padding duration 515 is allocated for uplink reference signal repetitions, the UE 115 may transmit an uplink reference signal, such as a sounding reference signal (SRS) or a physical random access channel (PRACH) preamble message, via the first symbol 505-a, and the UE 115 may transmit a repetition 530 of the uplink reference signal via the padding duration 515. In such cases, the configuration may indicate that the padding duration 515 is allocated for uplink beam refinement or for random access channel (RACH) repetition. If the padding duration is allocated for uplink beam refinement, the UE 115 may transmit the reference signal and the reference signal repetition 530 (e.g., SRSs) using a same transmit beam, and the base station 105 may receive the reference signal and the reference signal repetition 530 using multiple receive beams. The base station 105 may receive the reference signal repetition 530 via the padding duration 515 using a first receive beam, and the base station 105 may switch beams to use a second receive beam for reception of the uplink reference signal via the first symbol 505-a. Accordingly, the base station 105 may perform uplink beam refinement (e.g., beam sweeping or analog beam refinement) and select a receive beam from the multiple receive beams to use for reception of subsequent uplink signals. If the uplink reference signal includes a RACH preamble transmission, the transmission of the repetition 530 of the RACH preamble transmission via the padding duration 515 may provide diversity gain and increase a probability of a successful RACH procedure between the UE 115 and the base station 105 (e.g., to achieve uplink synchronization between the UE 115 and the base station 105).

The base station 105 may indicate the resources allocated for the reference signal repetition 530 within the padding duration 515 via the configuration for the padding duration 515. The configuration may indicate the allocation of resources for the reference signal repetition 530 based on fractions of symbol numbers, symbol numbers corresponding to the SCS, or a bit indicative of a quantity of symbols 505 in the padding duration 515 and a symbol number indicating an offset from the first symbol 505-a and the padding duration 515. In one example, the base station 105 may indicate the allocated resources via fractions of symbol numbers (e.g., ½, ¼, or other fractions of symbol numbers represented in binary). The fractions of symbol numbers may count backwards from zero (e.g., −1, −2, . . . ) for new symbols 505 that are included in the padding duration 515 and forwards from zero (e.g., 0, 1, 2, . . . ) for the symbols 505-a, 505-b, and the remaining symbols 505 in the TTI 525. In the example of FIG. 5A, the padding duration 515 may be one symbol duration 520 or longer, and may thus include one symbol 505 (e.g., for transmitting the reference signal repetition 530). The base station 105 may thereby indicate the symbol using a symbol number of one half (e.g., or some other fraction).

In another example, the base station 105 may indicate the resources allocated for the reference signal repetition 530 in the padding duration 515 by extending a range of symbol numbers for the TTI 525. That is, the first SCS may correspond to a first range of symbol numbers (e.g., symbol numbers 0, 1, . . . K−1), and any symbol(s) 505 in the padding duration 515 may be indicated using additional symbol numbers (e.g., starting from K, K+1 . . . ) starting at a first symbol 505 at the beginning of the TTI 525. For example, the symbol 505 allocated for the reference signal repetition 530 in the padding duration 515 may be indicated by symbol number K. Additionally or alternatively, the symbol numbering may restart from zero for the new symbols 505 in the padding duration 515. For example, the symbol 505 allocated for the reference signal repetition 530 in the padding duration 515 may be indicated by symbol number zero.

In another example, the control signal may be DCI or a medium access control (MAC) control element (CE) that may include a bit configured to indicate the allocation of the resources in the padding duration 515. The bit may indicate a quantity of symbols 505 in the padding duration 515 and a symbol number indicating an offset from the first symbol 505-a of the TTI 525 to the padding duration 515. Each option for indicating the resource allocation of the padding duration 515 may be configured for the UE 115 and the base station 105 and one option of the set of configured options may be selected via a control signal, or one or more options may be indicated to the UE 115 via control signaling prior to transmission of the configuration for the padding duration 515.

Accordingly, a padding duration 515 within a TTI 525 may be the same as or longer than a symbol duration 520 of one or more symbols 505 within the TTI 525 based on a first SCS configured for communications between a UE 115 and a base station 105. In such cases, the padding duration may be allocated for transmission of a reference signal repetition 530, which may reduce latency, improve utilization of communication resources, and improve communication reliability.

FIG. 5B illustrates an example of the communication timeline 500-b, which may illustrate communications between a UE 115 and a base station 105 in a TTI 525 (e.g., a half-subframe, a subframe, or some other TTI 525) according to a second SCS (e.g., 3840 kHz, or some other SCS). The communication timeline 500-b illustrates a portion of the TTI 525, where the TTI 525 includes a quantity of symbols 505 (e.g., OFDM symbols 505, such as the symbols 505-c, 505-d, and one or more other symbols 505), a corresponding quantity of cyclic prefixes 510 (e.g., the cyclic prefixes 510-c, 510-d, and one or more other cyclic prefixes 510), and a padding duration 515. A symbol duration 520 for each symbol 505 may be based on (e.g., inversely proportional to) the SCS. Similarly, a duration of each cyclic prefix 510 may be inversely proportional to the SCS. The second SCS may be greater than the first SCS described with reference to FIG. 5A (e.g., two times as large), such that each symbol duration 520 may be shorter than the symbol durations 520 described with reference to FIG. 5A. However, the padding duration 515 may remain the same. In the example of the communication timeline 500-b, the padding duration 515 may be the same as or longer than two symbol durations 520 based on the SCS, such that two symbols 505 may be repeated in the padding duration 515.

The UE 115 may receive a control signal from the base station 105 that indicates a configuration for the padding duration 515. The configuration may allocate the padding duration 515 and the first symbol 505-c of the quantity of symbols 505 in the TTI 525 for transmission of reference signal repetitions 530 (e.g., the reference signal repetitions 530-a and 530-b). For example, the configuration may allocate the first symbol 505-c for a reference signal (e.g., with repetition=ON), and may allocate the padding duration 515 for one or more repetitions 530 of the reference signal. In such cases, the cyclic prefix 510-*c* may be re-allocated such that the cyclic prefix 510-*c* occurs prior to the padding duration 515 in time. The cyclic prefix 510-*c* may be re-allocated because one or more bits (e.g., the ending bits) of each reference signal repetition 530 in the padding duration 515 may correspond to a respective cyclic prefix 510 for a subsequent reference signal repetition 530 in the padding duration 515 or in the first symbol 505-*c* (e.g., as illustrated by the curved arrows in FIG. 5B).

The configuration may allocate the padding duration 515 for uplink reference signal repetitions or downlink reference signal repetitions, as described with reference to FIG. 5A. If the padding duration 515 is allocated for downlink reference signal repetitions, the base station 105 may transmit a downlink reference signal, such as a CSI-RS, an SSB, or other downlink reference signal, via the first symbol 505-*c*, and the base station 105 may transmit two repetitions 530-*a* and 530-*b* of the downlink reference signal via the padding duration 515. In such cases, the configuration may indicate that the padding duration 515 is allocated for downlink beam refinement. The base station 105 may transmit the downlink reference signal repetitions 530-*a* and 530-*b* and the reference signal using a same transmit beam, and the UE 115 may receive the reference signal repetitions 530 using a set of receive beams. For example, the UE 115 may use first and second receive beams to receive the downlink reference signal repetitions 530-*a* and 530-*b*, respectively via the padding duration 515, and the UE 115 may use a third receive beam to receive the downlink reference signal via the first symbol 505-*c*. As such, the UE 115 may perform downlink beam refinement and select a receive beam from the set of receive beams for reception of subsequent downlink signals based on receiving the reference signal repetitions 530.

If the padding duration 515 is allocated for uplink reference signal repetitions, the UE 115 may transmit an uplink reference signal, such as an SRS or a PRACH preamble message, via the first symbol 505-*c*, and the UE 115 may transmit two repetitions 530-*a* and 530-*b* of the uplink reference signal via the padding duration 515. In such cases, the configuration may indicate that the padding duration 515 is allocated for uplink beam refinement or for RACH repetition. If the padding duration is allocated for uplink beam refinement, the UE 115 may transmit the reference signal repetitions 530-*a* and 530-*b* (e.g., SRSs) and the reference signal using a same transmit beam, and the base station 105 may receive the reference signal repetitions 530-*a* and 530-*b* and the reference signal using multiple receive beams. The base station 105 may receive the first and second reference signal repetitions 530-*a* and 530-*b* via the padding duration 515 using first and second receive beams, respectively and the base station 105 may use a third receive beam for reception of the uplink reference signal via the first symbol 505-*c*. Accordingly, the base station 105 may perform uplink beam refinement (e.g., beam sweeping) and select a receive beam from the multiple receive beams to use for reception of subsequent uplink signals. If the uplink reference signal includes a RACH preamble transmission, the transmission of the repetitions 530 of the RACH preamble transmission via the padding duration 515 may provide diversity gain and increase a probability of a successful RACH procedure between the UE 115 and the base station 105 (e.g., to achieve uplink synchronization between the UE 115 and the base station 105).

The base station 105 may indicate the resources allocated for the reference signal repetitions 530 within the padding duration 515 via the configuration for the padding duration 515, as described with reference to FIG. 5A. In one example, if the base station 105 indicates the allocated resources via fractions of symbol numbers (e.g., fractions represented in binary), a first symbol 505 allocated for the first reference signal repetition 530-*a* in the padding duration 515 may correspond to a symbol number of one half, and a second symbol 505 allocated for transmission of the second reference signal repetition 530-*b* in the padding duration 515 may correspond to a symbol number of one fourth. The first symbol 505-*a* in the TTI 525 may correspond to a symbol number of zero and the second symbol 505-*b* in the TTI 525 may correspond to a symbol number of one.

In another example, the base station 105 may use a range of symbol numbers for the TTI 525 to indicate resources allocated for the reference signal repetitions 530 in the padding duration 515 starting at a first symbol 505 at the beginning of the TTI 525. The symbol 505-*c* may correspond to a symbol number of zero, the symbol 505-*d* may correspond to a symbol number of one, and a last symbol 505 in the TTI 525 may correspond to a symbol number of K−1. In such cases, a first symbol 505 in the padding duration allocated for transmission of the reference signal repetition 530-*a* may correspond to a symbol number of K and a second symbol 505 in the padding duration that is allocated for transmission of the reference signal repetition 530-*b* may correspond to a symbol number of K+1. Additionally or alternatively, the symbol numbering may restart from zero for the new symbols 505 in the padding duration 515. For example, the first symbol 505 allocated for the reference signal repetition 530-*a* in the padding duration 515 may be indicated by symbol number zero and the second symbol 505 in the padding duration 515 may be indicated by the symbol number one. In another example, the control signal may be DCI or a MAC-CE that may include a bit configured to indicate the allocation of the resources in the padding duration 515. The bit may indicate that there are two symbols in the padding duration 515 and a symbol number indicating an offset from the first symbol 505-*c* of the TTI 525 to the padding duration 515.

Accordingly, a padding duration 515 within a TTI 525 may be the same as or longer than a symbol duration 520 of two or more symbols 505 within the TTI 525 based on a second SCS configured for communications between a UE 115 and a base station 105. In such cases, the padding duration may be allocated for transmission of reference signal repetitions 530, which may reduce latency, improve utilization of communication resources, and improve communication reliability.

Although two example communication timelines 500-*a* and 500-*b* for two example SCS values are illustrated, it is to be understood that a padding duration 515 may be greater than any quantity of symbol durations 520 according to multiple different SCS values, and that a padding duration 515 may be allocated for any quantity of reference signal repetitions 530. The quantity of reference signal repetitions 530 transmitted in the padding duration 515 may be based on the symbol duration 520 and the SCS value. As the SCS value increases, more repetitions 530 may be possible within the padding duration 515, which may provide for more beams to be swept (e.g., finer precision of beamforming) or more RACH preambles to be repeated, which may improve gain, improve communication reliability, and provide for a more efficient utilization of communication resources.

Figure 6:
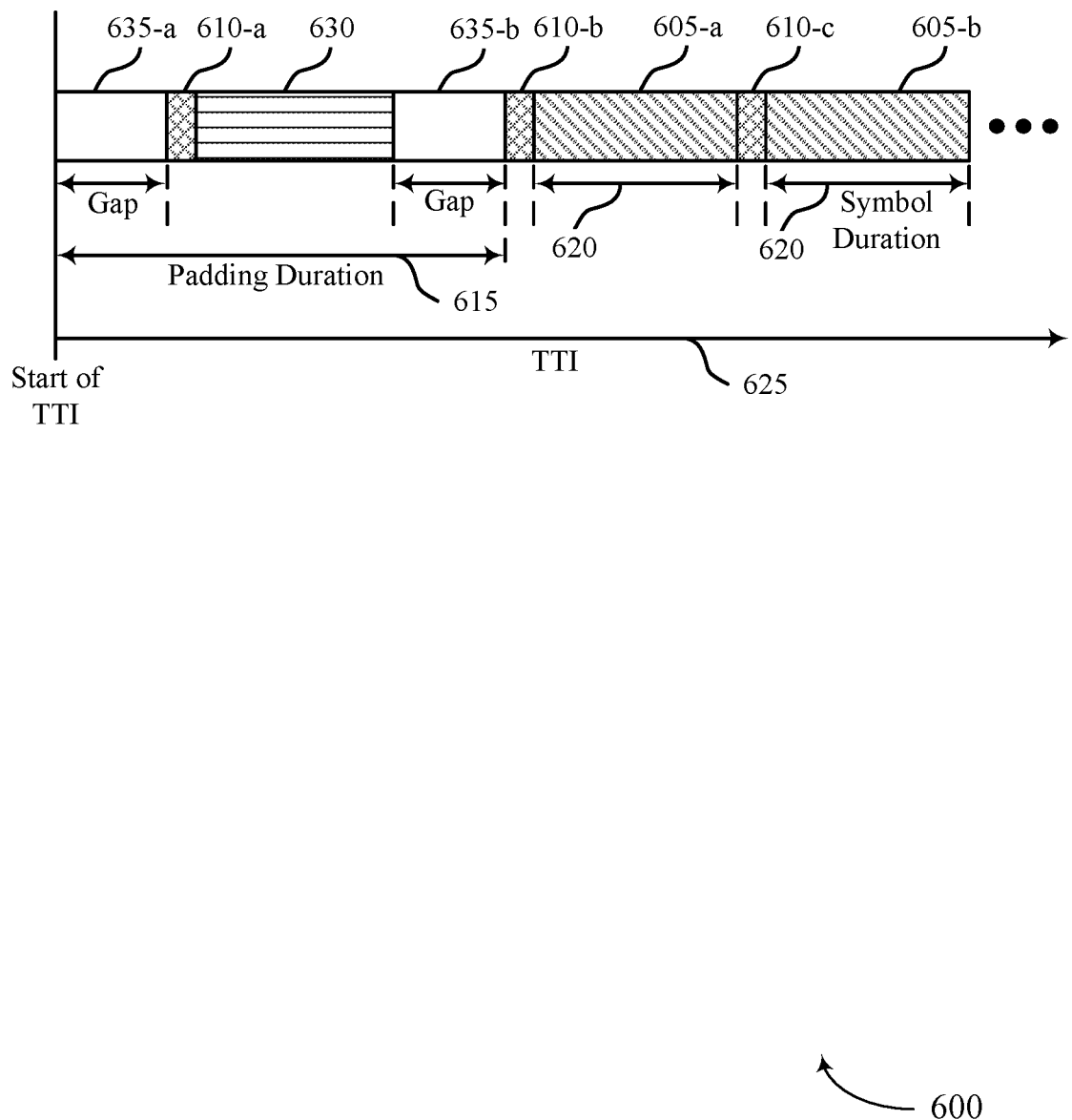
FIG. 6 illustrates an example of a communication timeline that supports configurations for utilization of a padding duration in accordance with aspects of the present disclosure.

FIG. 6 illustrates an example of a communication timeline 600 that supports configurations for utilization of a padding duration in accordance with aspects of the present disclosure. The communication timeline 600 may implement or be implemented by aspects of the wireless communications systems 100 and 200 and the communication timelines 500-a and 500-b as described with reference to FIGS. 1, 2, and 5. For example, the communication timeline 600 illustrates resources allocated for communications between a UE 115 and a base station 105, which may represent examples of a UE 115 and a base station 105 as described with reference to FIGS. 1 through 5. The communication timeline 600 may illustrate a portion of a TTI 625 configured to support a second SCS, which may represent an example of the second SCS described with reference to FIG. 5B (e.g., 3840 kHz, or some other SCS value). In some examples, a padding duration 615 within the TTI 625 may be allocated for one or more reference signal repetitions 630, beam switching, or both.

The communication timeline 600 illustrates a portion of the TTI 625, where the TTI 625 includes a quantity of symbols 605 (e.g., OFDM symbols 605, such as the symbols 605-a, 605-b, and one or more other symbols 605), a corresponding quantity of cyclic prefixes 610 (e.g., the cyclic prefixes 610-a, 610-b, and 610-c, and one or more other cyclic prefixes 610), and a padding duration 615. A symbol duration 620 for each symbol 605 may be based on (e.g., inversely proportional to) the SCS. Similarly, a duration of each cyclic prefix 610 may be inversely proportional to the SCS. In the example of FIG. 6, the padding duration 615 may be the same as or longer than two symbol durations 620 based on the second SCS, such that two symbols 605 may be repeated in the padding duration 615.

As described with reference to FIGS. 5A and 5B, the UE 115 may receive a control signal indicating a configuration for the padding duration 615, and the configuration may allocate the padding duration 615 and the first symbol 605-a of the set of symbols 605 for reference signal repetitions 630. In some examples, the UE 115, the base station 105, or both may perform uplink or downlink beam refinement based on the reference signal repetitions 630. IN such cases, the UE 115 or the base station 105 may perform beam switching between reception of the reference signal repetitions 630. For example, if the UE 115 performs downlink beam refinement, the UE 115 may switch beams between each reference signal repetition 630. The beam switching may correspond to a beam switching gap, or delay period. If the reference signal repetitions 630 are contiguous in a time domain, the UE 115 or the base station 105 may, in some examples, not have sufficient time to perform beam switching between reception of the reference signal repetitions 630.

To provide time for the UE 115, the base station 105, or both, to perform beam switching, the configuration may allocate one or more beam switching gaps 635 in the padding duration 615. That is, the configuration may allocate a first portion of the padding duration 615 for a reference signal repetition 630 and a second portion of the padding duration 615 for beam switching. Because the beam switching gap 635-b is allocated between the reference signal repetition 630 and the first symbol 605-a in time, the last portion of the reference signal repetition 630 may not be used as a cyclic prefix 610 for the reference signal transmitted via the first symbol 605-a. As such, the first portion of the padding duration 615 may be longer than a symbol duration 620 such that a reference signal repetition 630 and a cyclic prefix 610-a for the reference signal repetition 630 may be transmitted in the first portion of the padding duration 615. A separate cyclic prefix 610-b may be allocated for the reference signal transmitted via the first symbol 605-a.

Although only one reference signal repetition 630 is illustrated in the padding duration 615, in some examples (e.g., for higher SCS), a duration of each symbol 605 may be shorter than the illustrated symbol durations 620 based on an SCS that is different than (e.g., greater than) the second SCS, and the first portion of the padding duration 615 may be allocated for two or more reference signal repetitions 630. In some examples, if there are two or more reference signal repetitions 630 transmitted within the padding duration 615, a beam switching gap 635 may be allocated between each reference signal repetition 630 and a cyclic prefix 610 may be configured for each reference signal repetition 630. Additionally or alternatively, two or more reference signal repetitions 630 may be contiguous in time, and the cyclic prefix 610-a may be used for each of the two or more reference signal repetitions 630.

In the example of FIG. 6, the beam switching gap 635-b may be allocated for the UE 115 or the base station 105 to switch beams after receiving the first reference signal repetition 630 during the first portion of the padding duration 615. The UE 115 or the base station 105 may receive the reference signal repetition 630 using a first receive beam prior to the gap 635-b, switch to a second receive beam during the gap 635-b, and receive a reference signal using the second receive beam during the first symbol 605-a. In some examples, the gap 635-a may provide time for another beam switch by the UE 115 and/or the base station 105 prior to receiving the reference signal repetition 630, or the gap 635-a may include a configurable duration to absorb a remaining portion of the padding duration 615 that is not allocated for the reference signal repetition 630 or the beam switching gap 635-b. That is, a duration of the gap 635-a may be based on the padding duration 615, a duration of the reference signal repetition 630 (e.g., a symbol duration 620), and a duration of the beam switching gap 635-b.

In one example, the base station 105 may transmit a control signal, such as an RRC signal, DCI, a MAC-CE, or another control signal, to the UE 115 to indicate the duration of the gap 635-b. Additionally or alternatively, the duration of the gap 635-b may be configured for (e.g., implicitly known by) UE 115 and the base station 105. The beam switching gap 635-b, the gap 635-a, or both may include null resources (e.g., empty resources). That is, the gaps 635 may not be allocated for any communications.

The base station 105 may indicate an allocation of the resources within the padding duration 615 for the reference signal repetition 630 and the gaps 635 using adjusted symbol number techniques. As described with reference to FIGS. 5A and 5B, the base station 105 may indicate the resource allocations via fractions of symbol numbers, symbol numbers corresponding to the SCS, or a bit indicative of a quantity of symbols 605 in the padding duration 615 and a symbol number indicating an offset from the first symbol 605-a to the padding duration 615.

A padding duration 615 of a TTI 625 may thereby be configured for reference signal repetition, beam refinement, or both, by allocating one or more beam switching gaps 635 within the padding duration 615. By configuring the padding duration 615 for reference signal repetition and beam switching, a base station 105 may improve utilization of communication resources and reduce latency, which may provide for more reliable communications between the base station 105 and a UE 115.

Figure 7:
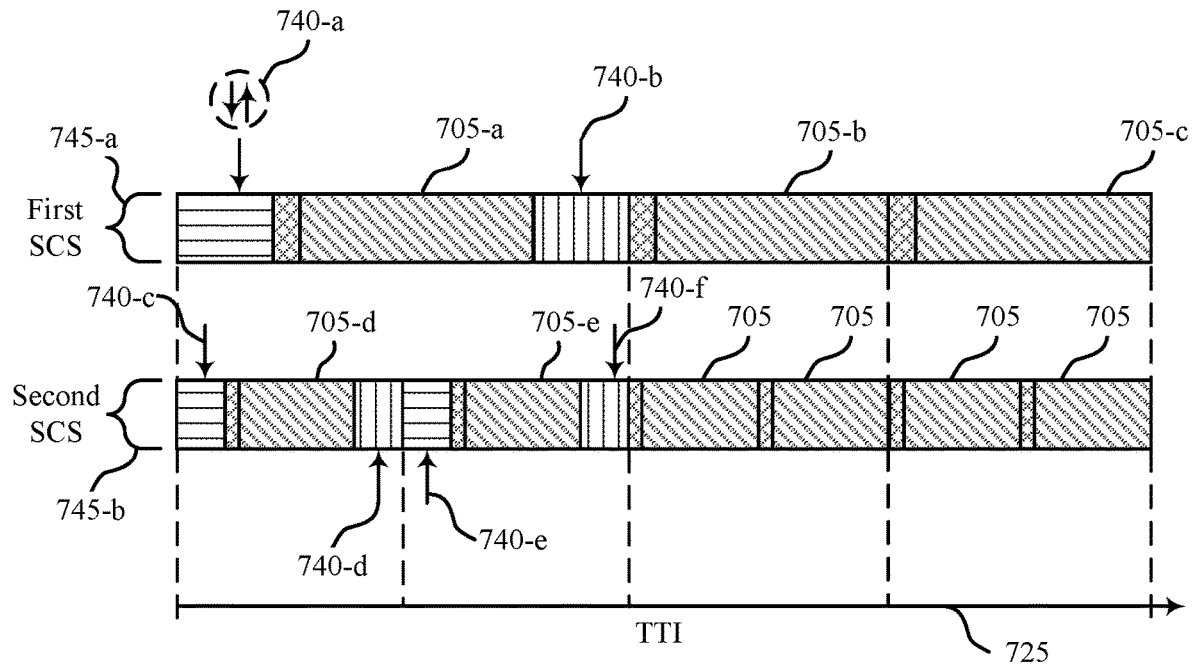
FIG. 7 illustrates an example of a beam switching timeline that supports configurations for utilization of a padding duration in accordance with aspects of the present disclosure.
Figure 7:
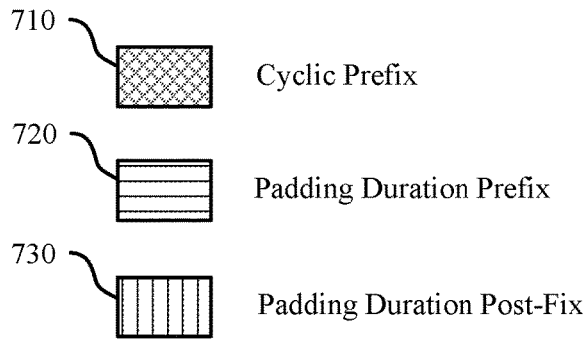

FIG. 7 illustrates an example of a beam switching timeline 700 that supports configurations for utilization of a padding duration in accordance with aspects of the present disclosure. The beam switching timeline 700 may implement or be implemented by aspects of the wireless communications systems 100 or 200 described with reference to FIGS. 1 and 2. For example, the beam switching timeline 700 may illustrate a timeline for communications between a UE 115 and a base station 105, which may represent examples of a UE 115 and a base station 105 as described with reference to FIGS. 1 through 6. The beam switching timeline may illustrate an allocation of symbols 705, cyclic prefixes 710, and padding durations 715 or 720 within a TTI 725 according to a first SCS 745-a and a second SCS 745-b, where the first SCS 745-a and the second SCS 745-b may represent examples of the first and second SCS, respectively, as described with reference to FIGS. 5 and 6.

As described with reference to FIGS. 1 through 6, a TTI 725 may include a quantity of symbols 705, a corresponding quantity of cyclic prefixes 710, and a padding duration 715 in accordance with an SCS 745 configured for communications between a UE 115 and a base station 105 via the TTI 725. A duration and quantity of the symbols 705 and cyclic prefixes 710 within each TTI 725 may be based on the configured SCS 745, and a remaining portion of the TTI 725 may be referred to as a padding duration. In the example of FIG. 7, the first SCS 745-a (e.g., 1920 kHz, or some other SCS 745) may correspond to a first symbol duration, such that the padding duration may be the same as or longer than a single symbol 705. The second SCS 745-b (e.g., 3840 kHz, or some other SCS 745) may be greater than the first SCS 745-a and may correspond to a second symbol duration that is less than the first symbol duration. Thus, the padding duration may be the same as or longer than two or more symbols 705 according to the second SCS 745-b.

In some examples, as described with reference to FIG. 4, and in further detail with reference to FIG. 7, the padding duration may be split into a prefix 720 and a post-fix 730, where the prefix 720 may occur prior to a symbol 705 and the post-fix 730 may occur subsequent to the symbol 705 within a TTI 725. If, for example, the second SCS 745-b is configured for communications such that the padding duration is longer than a duration of two or more symbols 705, the padding duration may be split into two or more sets of prefixes 720 and post-fixes 730 over two or more symbols 705 (e.g., the symbols 705-d and 705-e). A duration, in units of symbol length, of each prefix 720 or post-fix 730 and a quantity of the prefixes 720 and post-fixes 730 may be based on the SCS 745. Higher SCSs 745 may provide for each prefix 720 and post-fix 730 to include more symbol durations, may provide for more prefixes 720 and post-fixes 730 within a TTI 725, or both.

For the second SCS 745-b, each prefix 720 and post-fix 730 may include half of a symbol duration. Additionally or alternatively (not pictured in FIG. 7), a single prefix 720 and a single post-fix 730 may be allocated within the TTI 725, and the prefix 720 and the post-fix 730 may each include two symbol durations. In another example, four prefixes 720 and four post-fixes 730 may be allocated within the TTI 725 according to the SCS 745-b, and each may include half of a symbol duration. That is, a total duration of the prefixes 720 and post-fixes 730 in the TTI 725 according to the SCS 745-b may sum to two symbol durations. A total duration of the prefixes 720 and post-fixes 730 in the TTI 725 according to the first SCS 745-a may sum to one symbol duration. Although the total padding duration may include more symbol durations as the SCS 745 increases and the symbol durations decrease, the padding duration may remain a constant time period (e.g., 520 ns, or some other duration).

In some examples, the prefix 720, the post-fix 730, or both, may be allocated for a beam switch 740. That is, the prefix 720 or the post-fix 730 may represent examples of a beam switching gap 635 as described with reference to FIG. 6. The beam switch 740 may be performed by a UE 115, a base station 105, or both. In one example, a UE 115 may receive a set of CSI-RS, SSBs, or other downlink reference signals prior to the TTI 725. The UE 115 may perform downlink beam refinement to select a receive beam to use for reception of signals in the TTI 725. For communications according to the first SCS 745-a, the UE 115 may thereby perform the beam switch 740-a to switch to the selected beam at the start of the TTI 725 during the prefix 720. The prefix 720 may include null resources, which may provide time for the UE 115 to adjust receive beams. The UE 115 may receive downlink transmissions via the symbol 705-a using the selected beam. In some examples, the UE 115 may perform a second beam switch 740-b to switch to a second beam during the post-fix 730. The UE 115 may thereby receive downlink communications via the symbol 705-b and the symbol 705-c using the second receive beam after performing the beam switch 740-b. Additionally or alternatively, a base station 105 may perform the beam switch 740-a and/or the beam switch 740-b. The beam switches 740 may be transmit or receive beam switches. For communications according to the second SCS 745-b, the UE 115 or the base station 105 may perform up to four beam switches 740 (e.g., the beam switches 740-c, 740-d, 740-e, and 740-f).

A beam switch 740 performed by a UE 115 or a base station 105 may be performed in a duration that is less than the prefix 720 or post-fix 730 durations, in some examples. In such cases, the UE 115 or the base station 105 may perform the beam switch 740, and remaining resources in the padding duration may be unused (e.g., wasted resources). As described herein, the base station 105 may transmit a control signal to the UE 115 to allocate the remaining portion of the padding duration for other operations. Details of the configuration for the padding duration and the other operations are described in further detail elsewhere herein, including with reference to FIG. 8.

Figure 8:
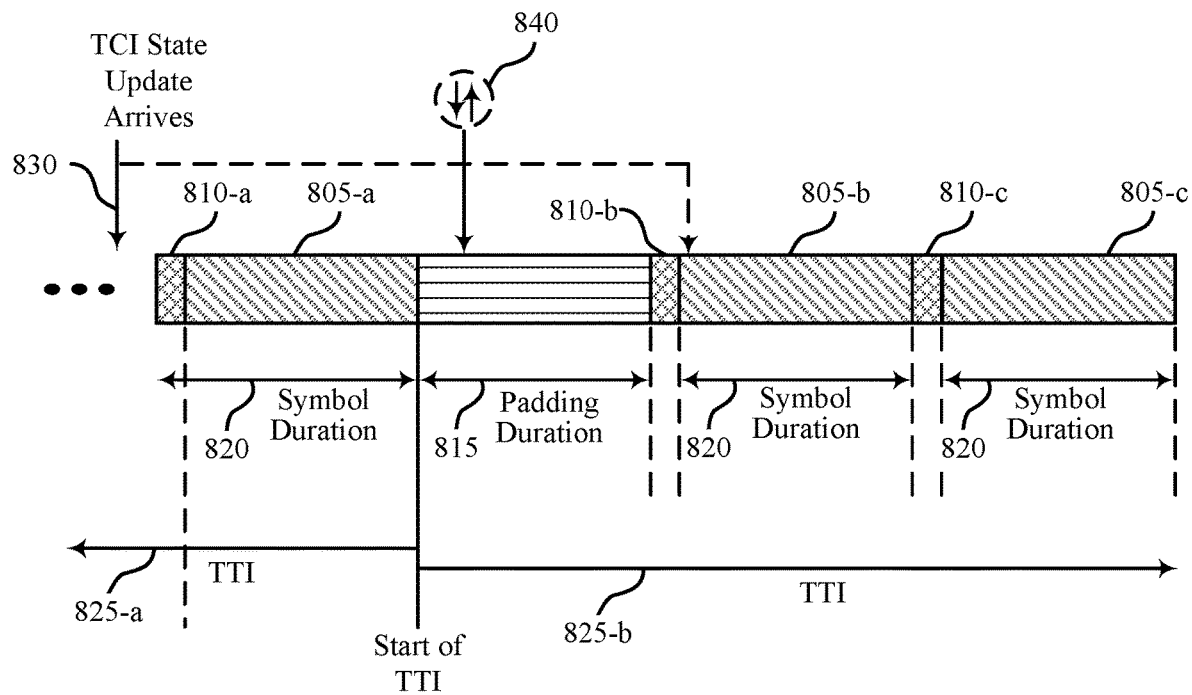
FIG. 8 illustrates an example of a beam switching timeline that supports configurations for utilization of a padding duration in accordance with aspects of the present disclosure.

FIG. 8 illustrates an example of a beam switching timeline 800 that supports configurations for utilization of a padding duration in accordance with aspects of the present disclosure. The beam switching timeline 800 may implement or be implemented by aspects of the wireless communications systems 100 or 200 described with reference to FIGS. 1 and 2. For example, the beam switching timeline 800 may illustrate a timeline for communications between a UE 115 and a base station 105, which may represent examples of a UE 115 and a base station 105 as described with reference to FIGS. 1 through 7. The beam switching timeline 800 may illustrate a timeline for the UE 115 or the base station 105 to perform a beam switch 840, one or more other operations, or both, during a padding duration 815 of a TTI 825-b.

The UE 115 and the base station 105 may be configured to communicate via the TTI 825-b (e.g., and one or more other TTIs 825, such as the TTI 825-a) according to a first SCS. The first SCS may represent an example of the first SCS 745-a described with reference to FIG. 7. The TTI 825-a and the TTI 825-b may each include a quantity of symbols 805 (e.g., the symbols 805-a, 805-b, and 805-c), a corresponding quantity of cyclic prefixes 810 (e.g., the cyclic prefixes 810-a, 810-b, and 810-c), and a padding duration 815 based on the first SCS, as described with reference to FIGS. 1 through 7. The padding duration 815 may be greater than or the same as a symbol duration 820 of each of the symbols 805.

In some cases, at 830 (e.g., in a first TTI 825-a), the UE 115 or the base station 105 may receive an indication of a transmission configuration indicator (TCI) state update or may identify a new beam based on a beam refinement procedure. The UE 115 or the base station 105 may perform communications using a current beam during the remainder of the TTI 825-a (e.g., the cyclic prefix 810-a and the symbol 805-a), and the UE 115 or the base station 105 may be configured to apply the new beam for communications in a first symbol 805-b of a subsequent TTI 825-b. As described with reference to FIGS. 7 and 8, the base station 105 may allocate a beam switching gap for performing a beam switch 840 to apply the new beam. In the example of FIG. 8, the entire padding duration 815 may be allocated for the beam switch 840. However, the padding duration 815 (e.g., a 520 ns duration, or some other duration) may be the same as or greater than a symbol duration 820 based on the SCS, which may be greater than a duration for performing the beam switch 840 (e.g., 100 ns or some other beam switching duration). Accordingly, the UE 115 or the base station 105 may perform the beam switch 840 during the padding duration 815, and a remaining portion of the padding duration 815 may be unused (e.g., may include wasted resources).

To improve utilization of communication resources and reduce latency, the base station 105 described herein may transmit a control signal to the UE 115 indicating a configuration for the padding duration 815. The configuration may re-allocate at least a portion of the padding duration 815 for one or more operations different than the beam switch 840. The UE 115, the base station 105, or both may perform the one or more operations in at least a portion of the padding duration 815 based on the control signal. The one or more operations may include reference signal repetition, communication of an extended cyclic prefix, communication of extra coding bits, interference measurement, other operations, or any combination thereof.

In some examples, the one or more operations, such as transmission of a reference signal repetition or transmission of coding bits, may utilize an entire symbol duration 820, but an available portion of the padding duration 815 may be less than a symbol duration 820. Additionally or alternatively, transmission of the reference signal repetition or coding bits may utilize a cyclic prefix 810. However, for some SCS, such as the first and second SCS described herein (e.g., 1920 kHz or greater), the padding duration 815 may be an integer multiple of the symbol duration 820, and there may not be space for an extra cyclic prefix 810. In such cases, the UE 115 or the base station 105 may perform a best-effort transmission of the reference signal repetition or the coding bits in the available portion of the padding duration 815 (e.g., a remaining portion after the beam switch 840 is performed). The best-effort transmission may include shortening the symbol 805 or cyclic prefix 810. The symbol 805 may be shortened using smaller Fast Fourier Transform (FFT) sizes (e.g., using two thousand samples instead of four thousand, or some other reduction of FFT size), or creating a zero-padded symbol 805.

In one example, the control signal may allocate the padding duration 815 for transmission of a reference signal repetition. The reference signal repetition may improve accuracy of a channel estimate (e.g., a phase, timing, or channel estimate) by the UE 115 or the base station 105, which may improve reliability of the communications. The reference signal repetition may be similar to the reference signal repetitions described with reference to FIGS. 5 and 6, but may be transmitted via a shorter symbol 805 (e.g., a best-effort transmission). The UE 115 or the base station 105 may transmit the reference signal repetition (e.g., a phase tracking reference signal (PTRS), a DMRS, a CSI-RS, an SRS, or some other reference signal) in a frequency domain or a time domain with a symbol length that is less than an FFT length.

The transmitting device (e.g., the UE 115 or the base station 105) may use an inverse FFT (IFFT) to transmit the reference signal repetition in the frequency domain (e.g., via an FDM waveform). Due to a shortened symbol length associated with the reference signal repetition, an FFT computation for the reference signal may include a different length than other symbols 805 (e.g., different from the symbol duration 820). The transmitting device may additionally or alternatively use wide-band samples to transmit the reference signal repetition in the time domain without an IFFT. The reference signal repetition may be transmitted via a quadrature amplitude modulation (QAM) single carrier waveform. If the reference signal repetition is transmitted via the time domain, a bandwidth part (BWP) for transmitting the reference signal repetition may be the same for each receiving device (e.g., each user) because the reference signals are transmitted via a relatively wide bandwidth and may not be duplexed in the frequency domain (e.g., no FDM of users during the padding duration 815). The reference signal repetition may be transmitted with a corresponding cyclic prefix 810 within the padding duration 815 (e.g., the remaining portion of the padding duration 815 after the beam switch 840) for both the time or frequency domain transmissions since the reference signal repetition is shortened in time other than symbols 805.

In another example, the control signal may allocate the padding duration 815 for transmission of extra coding bits. Each symbol 805 may be coded using sufficient coding bits. The base station 105 may, however, transmit additional coding information for subsequent communications, or the base station 105 may provide a repetition of the coding bits as a buffer for the UE 115 to improve communication reliability. The transmission of the coding bits may be via a shortened symbol 805 to provide room for transmission of a cyclic prefix 810 for the coding bits. Thus, the transmitting device may use a smaller FFT size or zero-padded symbol 805 to transmit the coding bits. The coding bits may be transmitted in the time domain or the frequency domain.

In another example, the control signal may not allocate the padding duration 815 for other transmissions, and the padding duration 815 may remain empty. In such cases, the padding duration 815 may be used for uplink or downlink interference measurement. The control signal may indicate that the UE 115 or the base station 105 is to perform interference measurement in the padding duration 815, or the UE 115 or the base station 105 may be configured (e.g., pre-configured via prior signaling or a standard) to use a remaining portion of the padding duration 815 that is not being used for the beam switch 840 or other operations to perform interference measurement. Any signals received by the base station 105 or the UE 115 during the padding duration 815 may be interference and noise because the base station 105 and the UE 115 may not be configured to transmit during the padding duration 815. By using the padding duration 815 to estimate received interference, the base station 105 and the UE 115 may update outdated or expired interference information for subsequent communications. In some examples, the UE 115 or the base station 105, or both may use the interference measurement for subsequent beam refinement.

In one example, the UE 115 may be receiving during the padding duration 815. The UE 115 may switch a receive beam during the beam switch 840, and the UE 115 may continue to receive signals via the remainder of the padding duration 815. The padding duration 815 may not be allocated for other operations, and the UE 115 may perform the interference measurement. The UE 115 may use an interference measurement value to improve a channel estimation for receiving other downlink signals via the symbols 805-b, 805-c, and other symbols 805 in the TTI 825-b. In some examples, the UE 115 may transmit an indication of the interference measurement value to the base station 105 to improve communication reliability. The base station 105 may use the indicated interference measurement value to adjust a transmit power, a modulation and coding scheme (MCS), a beam, or any combination thereof, for subsequent downlink transmissions. Additionally or alternatively, the base station 105 may switch receive beams during the beam switch 840, and the base station 105 may perform an interference measurement procedure during the remainder of the padding duration 815. In such cases, the base station 105 may adjust a transmit power, MCS, or beam based on the measured interference, or the base station 105 may transmit an indication of the interference measurement value to the UE 115.

In another example, the control signal may allocate the padding duration 815 for an extended cyclic prefix 810. The extended cyclic prefix 810 may be an extension of the cyclic prefix 810-b, which may include a repetition of the data transmitted via the first symbol 805-b of the TTI 525-b. The extended cyclic prefix 810 may provide for the UE 115 to accurately decode the first symbol 805-b.

A padding duration 815 may thereby be allocated for one or more other operations different than the beam switch 840 to reduce latency and improve communication reliability. In some examples (not illustrated in FIG. 8), all of the padding duration 815 may be allocated for at least one of the one or more operations described herein. That is, even if the padding duration 815 is not allocated for the beam switch 840, a base station 105 may transmit a control signal that allocates the padding duration 815 for one of the reference signal repetition, the communication of extra coding bits, the interference measurement procedure, or the communication of the extended cyclic prefix 810.

The network may configure one of the one or more operations described above. For example, the network may select one of the operations that may be supported by default, and the UE 115 and the base station 105 may be configured to perform the default operation if a padding duration 815 is not allocated for other operations. Additionally or alternatively, the UE 115 and the base station 105 may be configured to perform the default operation if a padding duration 815 is allocated for a beam switch 840 that may not utilize the full padding duration 815. Alternatively, the base station 105 may transmit a TCI state update, DCI, or a MAC-CE to the UE 115 to indicate at least one of the operations that are to be performed in the padding duration 815. In some examples, the TCI state update, DCI, or MAC-CE may trigger the beam switch 840 and additionally indicate the one or more other operations to be performed if the beam switch 840 does not take the full padding duration 815.

In some examples, the network may switch the operation that is configured for the padding duration 815 dynamically based on a criterion associated with the communications between the UE 115 and the base station 105 in the TTI 825-b and one or more other TTIs 825. For example, if the base station 105 determines that a better channel estimate is needed, the base station 105 may transmit a control signal to allocate the padding duration 815 for reference signal repetition. If the base station 105 transmits information having a relatively high importance, the base station 105 may transmit a control signal to allocate the padding duration 815 for communication of extra coding bits to assist with decoding the information having a relatively high importance (e.g., high priority).

In some examples, the UE 115 may transmit a UE capability report to the base station 105 to indicate a beam switching capability, which may indicate a duration in which the UE 115 may perform the beam switch 840. In such cases, the base station 105 may select an operation from the one or more operations to configure for the padding duration 815 based on the beam switching capability of the UE 115. For example, the base station 105 may configure a reference signal repetition if the UE 115 supports a relatively short beam switching time (e.g., shorter than 520 ns), and the base station 105 may configure the padding duration 815 for an extended cyclic prefix 810 if the UE 115 supports a relatively long beam switching time (e.g., if the UE 115 may require a majority of the 520 ns padding duration 815). In some examples, the base station 105 may transmit a signal that requests a one-time, periodic, or need-based report of the beam switching time supported by the UE 115, and the UE 115 may transmit the UE capability report in response to the signal. The base station 105 may request the UE capability report to use for determining how to utilize the beam switching gap for the UE 115.

In some examples, the UE 115 may transmit an uplink message that includes a request for one or more operations to be performed during the padding duration 815. For example, the UE 115 may request that the padding duration 815 is allocated for interference measurement (e.g., no transmission) so the UE 115 may measure out-of-cell interference. In some examples, the uplink message may indicate a request for configuring a remainder of the padding duration 815 that is not used for the beam switch 840. Additionally or alternatively, the uplink message may indicate a request for configuring any padding duration 815 that may or may not include the beam switch 740.

The base station 105 may thereby allocate a padding duration 815 for one or more operations different from a beam switch 840 to reduce latency, improve communication reliability, and improve utilization of communication resources. In some examples, the padding duration 815 may be allocated for a beam switch 840, and the one or more operations may be performed in a remaining portion of the padding duration 815 after the beam switch 840 is performed. Additionally or alternatively, the base station 105 may allocate a padding duration 815 or a portion of a padding duration 815 that is not previously allocated for the beam switch 840 to be used for the one or more operations.

Figure 9:
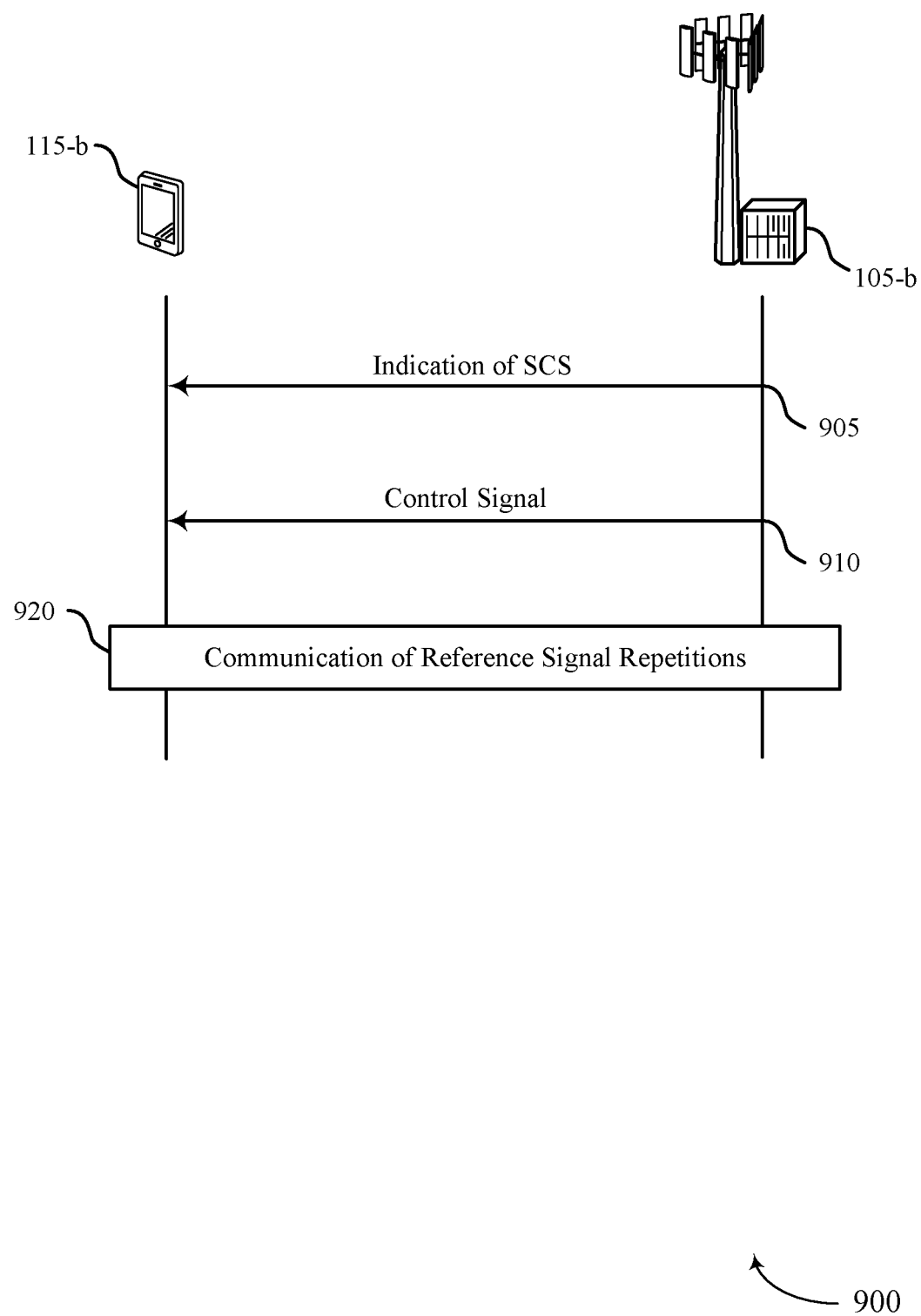
FIG. 9 illustrates an example of a process flow that supports configurations for utilization of a padding duration in accordance with aspects of the present disclosure.

FIG. 9 illustrates an example of a process flow 900 that supports configurations for utilization of a padding duration in accordance with aspects of the present disclosure. In some examples, the process flow 900 may implement aspects of the wireless communications systems 100 and 200 or may be implemented by aspects of the wireless communications systems 100 and 200 as described with reference to FIGS. 1 and 2, respectively. For example, the process flow 900 may implement or be implemented by a base station 105-b and a UE 115-b, which may be examples of a base station 105 and a UE 115 as described with reference to FIGS. 1 through 8. In some examples, the base station 105-*b* may indicate, to the UE 115-*b*, a configuration for a padding duration that may allocate the padding duration for reference signal repetitions.

At 905, the base station 105-*b* may transmit, to the UE 115-*b*, an indication of an SCS for communications in a set of TTIs. Each TTI of the set of TTIs may include a quantity of symbols, a corresponding quantity of cyclic prefixes, and a padding duration in accordance with the SCS. A symbol duration of each of the quantity of symbols may be based on the SCS, and the padding duration may be longer than the symbol duration.

At 910, the base station 105-*b* may transmit, to the UE 115-*b*, a control signal indicating a configuration for the padding duration. The configuration may allocate the padding duration and a first symbol of the quantity of symbols for transmission of reference signal repetitions. The first symbol may be subsequent in time to the padding duration.

At 915, the UE 115-*b* and the base station 105-*b* may communicate the reference signal repetitions during the padding duration and the first symbol in accordance with the configuration. In some examples, the base station 105-*b* may transmit the reference signal repetitions (e.g., downlink reference signal repetitions). The configuration may configure the reference signal repetitions for downlink beam refinement. In such cases, the base station 105-*b* may transmit the reference signal repetitions using a same transmit beam, and the UE 115-*b* may receive the reference signal repetitions using a set of receive beams. Additionally or alternatively, the UE 115-*b* may transmit the reference signal repetitions (e.g., uplink reference signal repetitions). The configuration may configure the reference signal repetitions for uplink beam refinement or for RACH repetition. If the reference signal repetitions are configured for uplink beam refinement, the UE 115-*b* may transmit the uplink reference signals using a same transmit beam, and the base station 105-*b* may receive the uplink reference signals using a set of receive beams. If the reference signal repetitions are configured for RACH repetition, the UE 115-*b* may transmit a set of random access preamble message repetitions during the padding duration and the first symbol.

Figure 10:
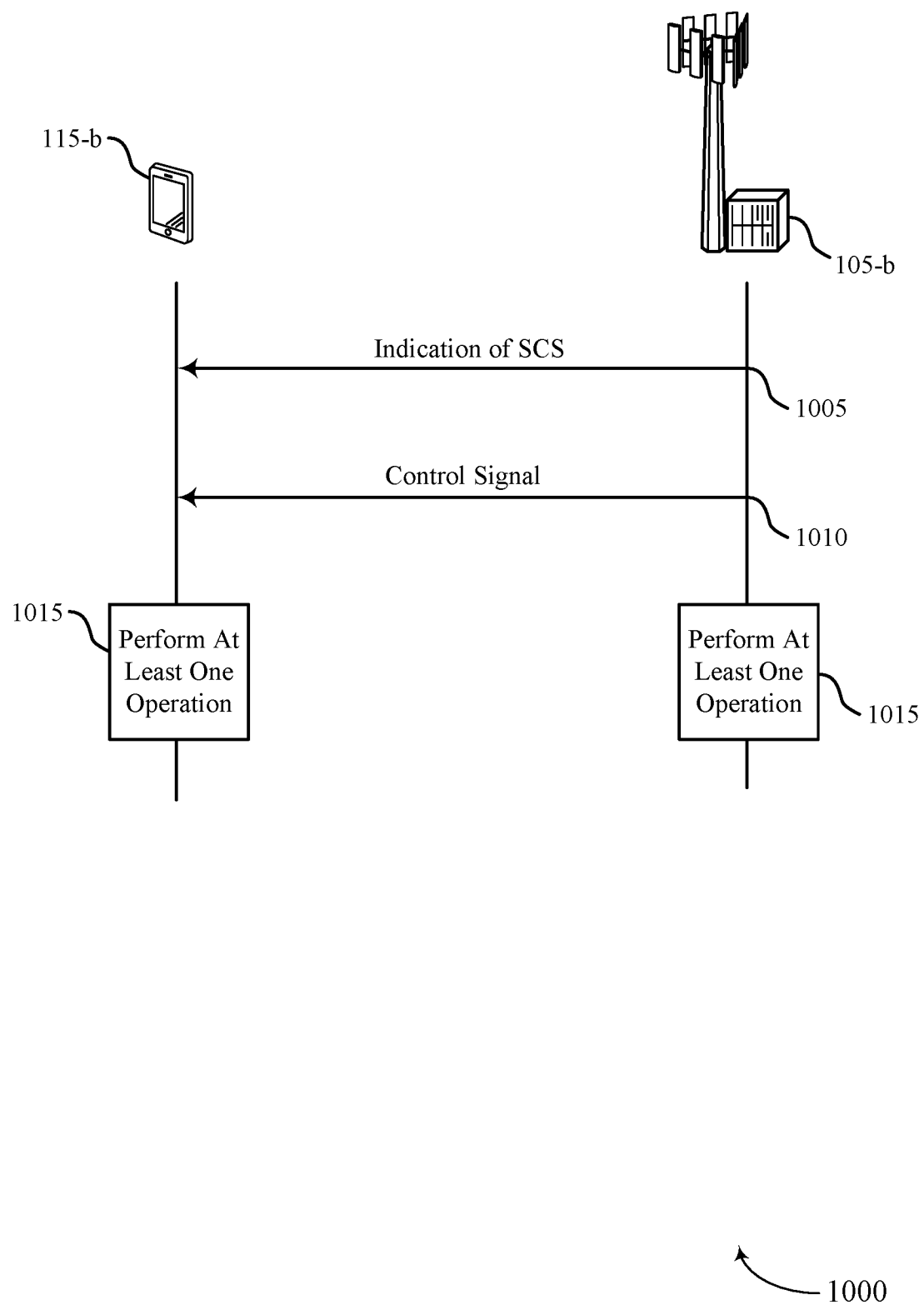
FIG. 10 illustrates an example of a process flow that supports configurations for utilization of a padding duration in accordance with aspects of the present disclosure.

FIG. 10 illustrates an example of a process flow 1000 that supports configurations for utilization of a padding duration in accordance with aspects of the present disclosure. In some examples, the process flow 1000 may implement aspects of the wireless communications systems 100 and 200 or may be implemented by aspects of the wireless communications systems 100 and 200 as described with reference to FIGS. 1 and 2, respectively. For example, the process flow 1000 may implement or be implemented by a base station 105-*c* and a UE 115-*c*, which may be examples of a base station 105 and a UE 115 as described with reference to FIGS. 1 through 9. In some examples, the base station 105-*c* may indicate, to the UE 115-*c*, a configuration for performing one or more operations during a padding duration that is allocated for beam switching.

At 1005, the base station 105-*c* may transmit, to the UE 115-*c*, an indication of an SCS for communications in a set of TTIs. Each TTI of the set of TTIs may include a quantity of symbols, a corresponding quantity of cyclic prefixes, and a padding duration allocated for a beam switching procedure. A symbol duration of each of the quantity of symbols may be based on the SCS, and the padding duration may be longer than a duration corresponding to the beam switching procedure.

At 1010, the base station 105-*c* may transmit, to the UE 115-*c*, a control signal indicating a configuration for the padding duration. The configuration may allocate the padding duration for one or more operations different than the beam switching procedure.

At 1015, the UE 115-*c*, the base station 105-*c*, or both, may perform, during at least a portion of the padding duration, at least one of the one or more operations for which the padding duration in accordance with the configuration. The one or more operations may include communication of a reference signal, communication of a set of coding bits, an interference measurement procedure, communication of an extended cyclic prefix, or any combination thereof.

Figure 11:
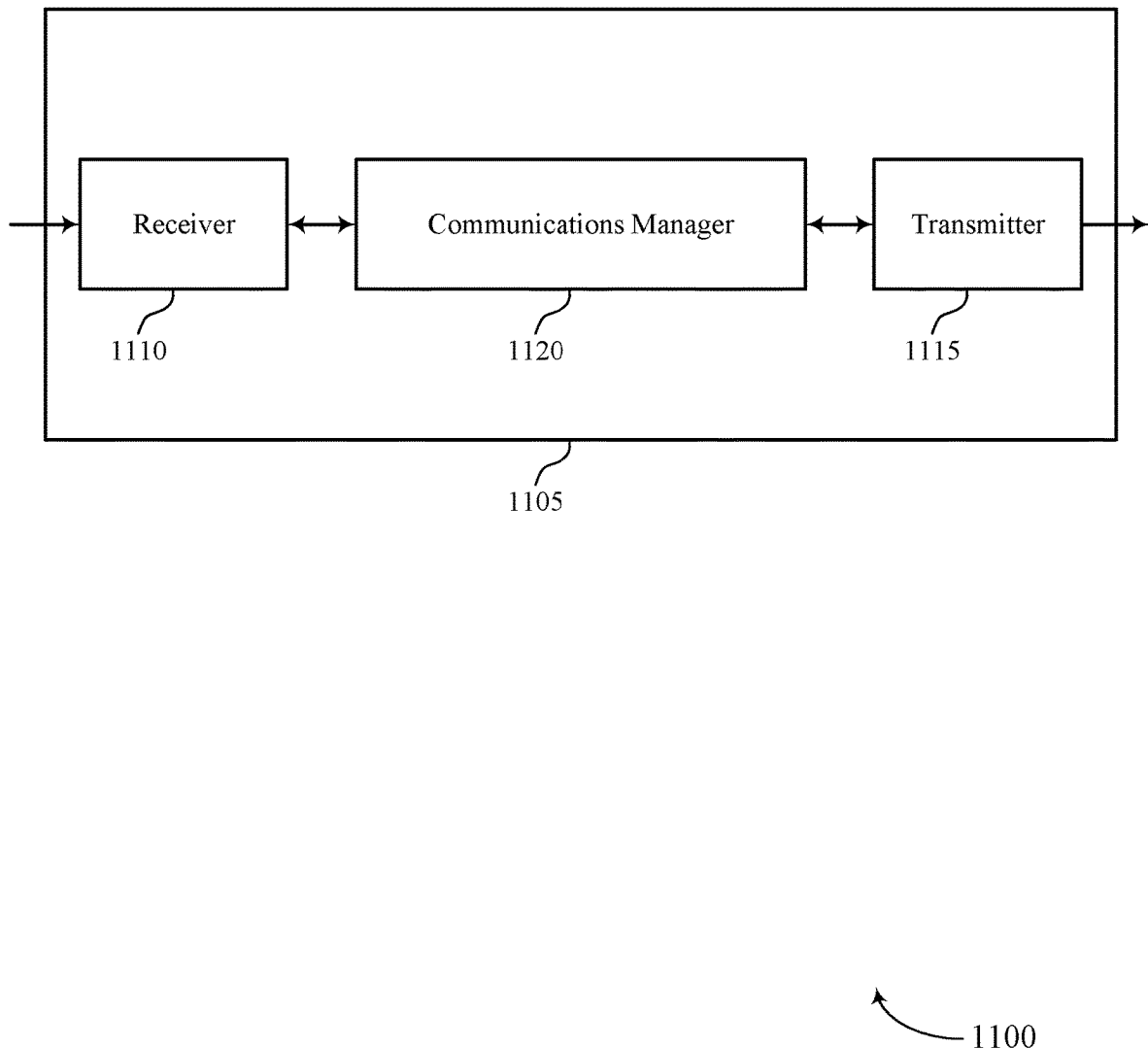
FIGS. 11 and 12 show block diagrams of devices that support configurations for utilization of a padding duration in accordance with aspects of the present disclosure.

FIG. 11 shows a block diagram 1100 of a device 1105 that supports configurations for utilization of a padding duration in accordance with aspects of the present disclosure. The device 1105 may be an example of aspects of a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to configurations for utilization of a padding duration). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to configurations for utilization of a padding duration). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of configurations for utilization of a padding duration as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a UE in accordance with examples as disclosed herein. For example, the communications manager 1120 may be configured as or otherwise support a means for receiving an indication of an SCS for communications in a set of multiple TTIs, where a TTI of the set of multiple TTIs includes a set of multiple symbols, a corresponding set of multiple cyclic prefixes, and a padding duration, and where a symbol duration of the set of multiple symbols is based on the SCS, and where the padding duration is longer than the symbol duration. The communications manager 1120 may be configured as or otherwise support a means for receiving a control signal indicating a configuration for the padding duration, where the configuration allocates the padding duration and a first symbol of the set of multiple symbols for transmission of reference signal repetitions, the first symbol being subsequent in time to the padding duration. The communications manager 1120 may be configured as or otherwise support a means for communicating the reference signal repetitions during the padding duration and the first symbol in accordance with the configuration.

Additionally or alternatively, the communications manager 1120 may support wireless communication at a UE in accordance with examples as disclosed herein. For example, the communications manager 1120 may be configured as or otherwise support a means for receiving an indication of an SCS for communications in a set of multiple TTIs, where a TTI of the set of multiple TTIs includes a set of multiple symbols, a corresponding set of multiple cyclic prefixes, and a padding duration allocated for a beam switching procedure, and where a symbol duration of the set of multiple symbols is based on the SCS and where the padding duration is longer than a duration corresponding to the beam switching procedure. The communications manager 1120 may be configured as or otherwise support a means for receiving a control signal indicating a configuration for the padding duration, where the configuration allocates the padding duration for one or more operations different than the beam switching procedure. The communications manager 1120 may be configured as or otherwise support a means for performing, during at least a portion of the padding duration, at least one operation of the one or more operations for which the padding duration is allocated in accordance with the configuration.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced processing and more efficient utilization of communication resources. The device 1105 may receive a configuration for a padding duration that may allocate the padding duration for one or more operations. The one or more operations may, in some examples, improve a communication reliability associated with communications between the device 1105 and another device. By performing the one or more operations, such as reference signal repetition, beam refinement, interference measurement, reception of coding bits, or the like, the processor of the device 1105 may improve communication reliability while reducing latency, which may provide for reduced processing overall. For example, by performing the operations to improve communication reliability during the padding duration, the processor may refrain from performing the operations in a subsequent TTI or performing extra decoding or error correcting to receive data. Additionally, the padding duration may otherwise include empty resources (e.g., wasted resources) that may not be used for communications. By receiving the configuration for the padding duration and performing the one or more operations during the padding duration, the processor may support more efficient utilization of communication resources.

Figure 12:
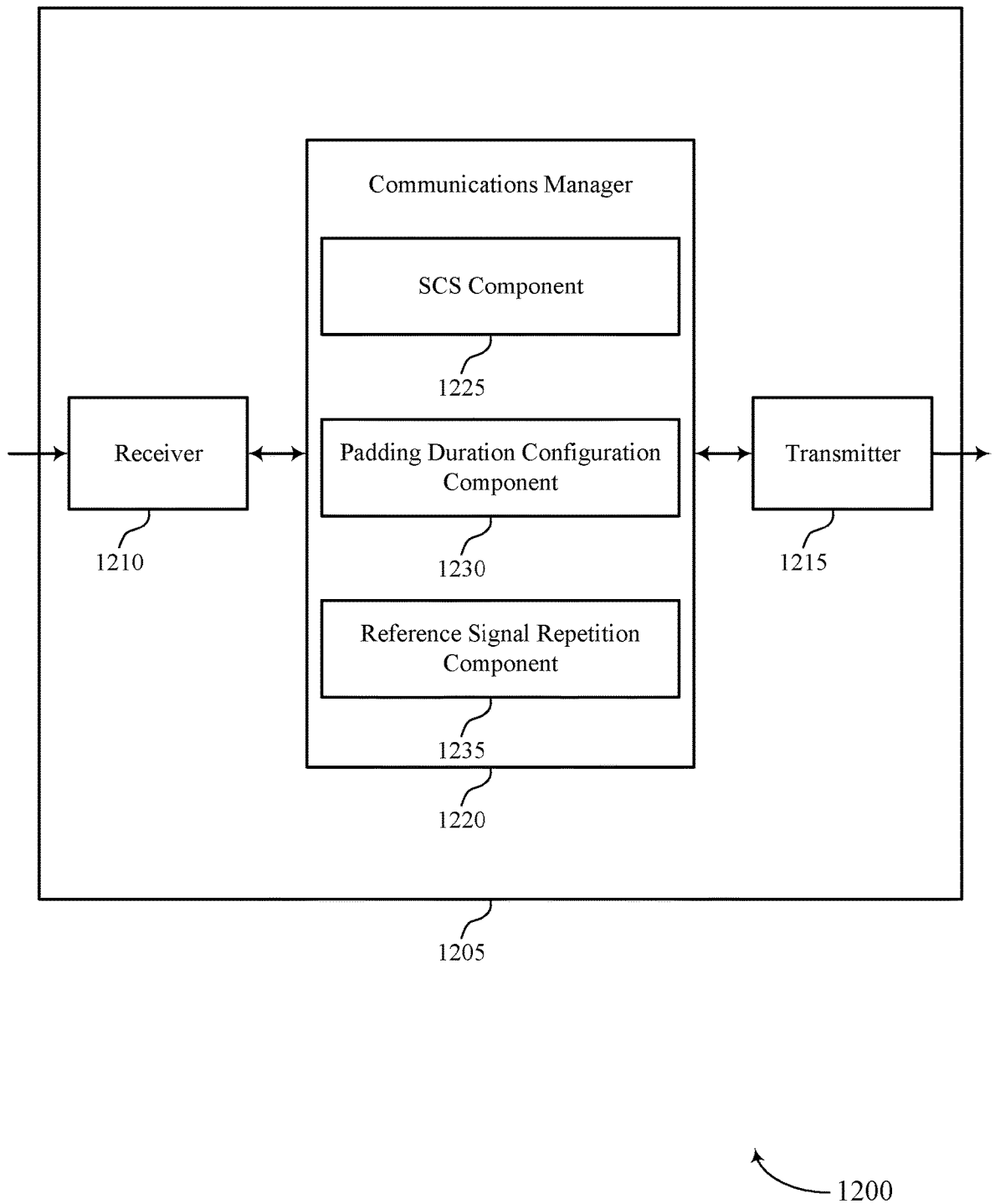

FIG. 12 shows a block diagram 1200 of a device 1205 that supports configurations for utilization of a padding duration in accordance with aspects of the present disclosure. The device 1205 may be an example of aspects of a device 1105 or a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to configurations for utilization of a padding duration). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to configurations for utilization of a padding duration). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of configurations for utilization of a padding duration as described herein. For example, the communications manager 1220 may include an SCS component 1225, a padding duration configuration component 1230, a reference signal repetition component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a UE in accordance with examples as disclosed herein. The SCS component 1225 may be configured as or otherwise support a means for receiving an indication of an SCS for communications in a set of multiple TTIs, where a TTI of the set of multiple TTIs includes a set of multiple symbols, a corresponding set of multiple cyclic prefixes, and a padding duration, and where a symbol duration of the set of multiple symbols is based on the SCS, and where the padding duration is longer than the symbol duration. The padding duration configuration component 1230 may be configured as or otherwise support a means for receiving a control signal indicating a configuration for the padding duration, where the configuration allocates the padding duration and a first symbol of the set of multiple symbols for transmission of reference signal repetitions, the first symbol being subsequent in time to the padding duration. The reference signal repetition component 1235 may be configured as or otherwise support a means for communicating the reference signal repetitions during the padding duration and the first symbol in accordance with the configuration.

Additionally or alternatively, the communications manager 1220 may support wireless communication at a UE in accordance with examples as disclosed herein. The SCS component 1225 may be configured as or otherwise support a means for receiving an indication of an SCS for communications in a set of multiple TTIs, where a TTI of the set of multiple TTIs includes a set of multiple symbols, a corresponding set of multiple cyclic prefixes, and a padding duration allocated for a beam switching procedure, and where a symbol duration of the set of multiple symbols is based on the SCS and where the padding duration is longer than a duration corresponding to the beam switching procedure. The padding duration configuration component 1230 may be configured as or otherwise support a means for receiving a control signal indicating a configuration for the padding duration, where the configuration allocates the padding duration for one or more operations different than the beam switching procedure. The padding duration configuration component 1230 may be configured as or otherwise support a means for performing, during at least a portion of the padding duration, at least one operation of the one or more operations for which the padding duration is allocated in accordance with the configuration.

Figure 13:
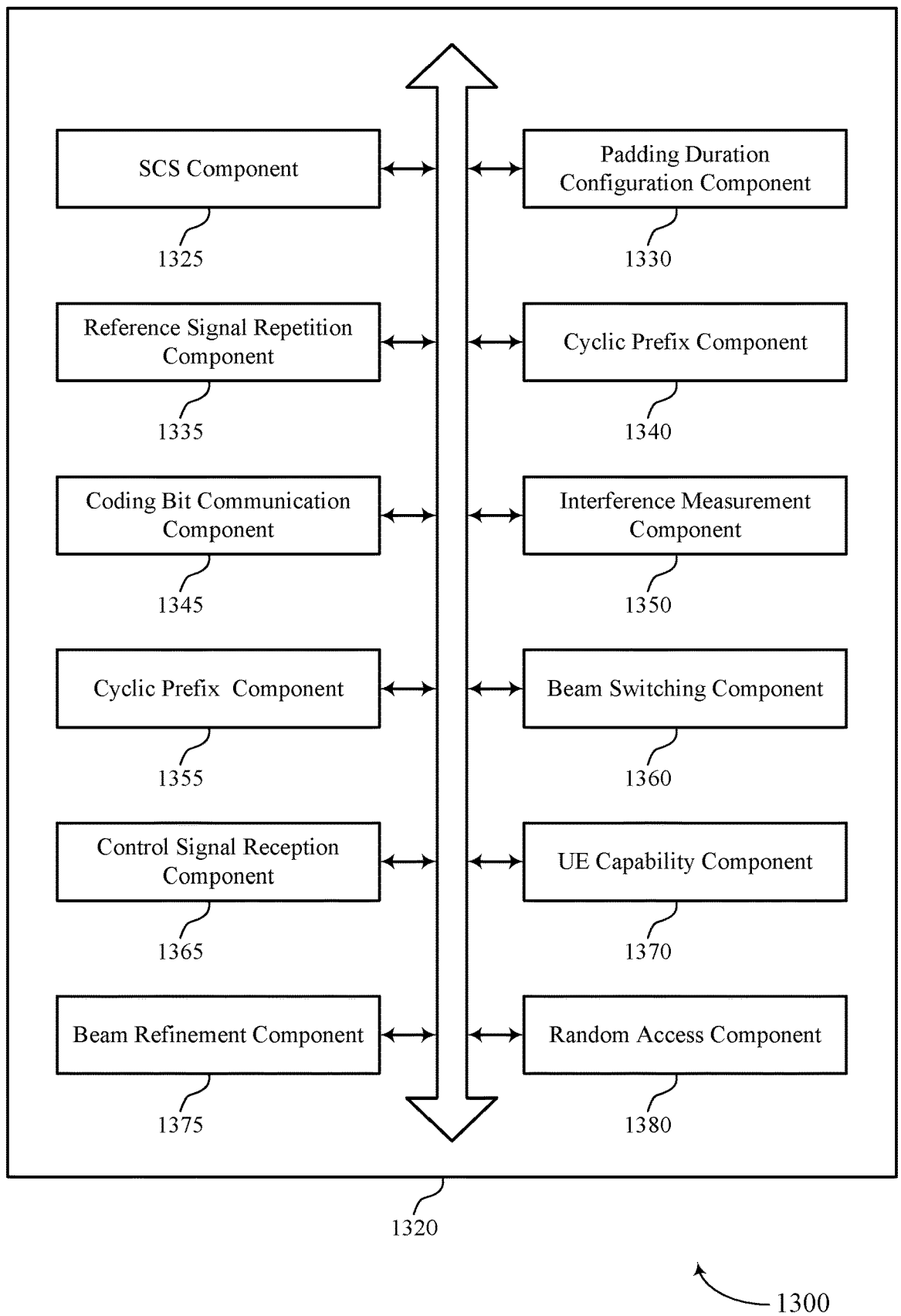
FIG. 13 shows a block diagram of a communications manager that supports configurations for utilization of a padding duration in accordance with aspects of the present disclosure.

FIG. 13 shows a block diagram 1300 of a communications manager 1320 that supports configurations for utilization of a padding duration in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of configurations for utilization of a padding duration as described herein. For example, the communications manager 1320 may include an SCS component 1325, a padding duration configuration component 1330, a reference signal repetition component 1335, a cyclic prefix component 1340, a coding bit communication component 1345, an interference measurement component 1350, a cyclic prefix component 1355, a beam switching component 1360, a control signal reception component 1365, a UE capability component 1370, a beam refinement component 1375, a random access component 1380, or any combination thereof. Each of these components may communicate, directly or indirectly, with one another (e.g., via one or more buses).

The communications manager 1320 may support wireless communication at a UE in accordance with examples as disclosed herein. The SCS component 1325 may be configured as or otherwise support a means for receiving an indication of an SCS for communications in a set of multiple TTIs, where a TTI of the set of multiple TTIs includes a set of multiple symbols, a corresponding set of multiple cyclic prefixes, and a padding duration, and where a symbol duration of the set of multiple symbols is based on the SCS, and where the padding duration is longer than the symbol duration. The padding duration configuration component 1330 may be configured as or otherwise support a means for receiving a control signal indicating a configuration for the padding duration, where the configuration allocates the padding duration and a first symbol of the set of multiple symbols for transmission of reference signal repetitions, the first symbol being subsequent in time to the padding duration. The reference signal repetition component 1335 may be configured as or otherwise support a means for communicating the reference signal repetitions during the padding duration and the first symbol in accordance with the configuration.

In some examples, the cyclic prefix component 1340 may be configured as or otherwise support a means for applying the configuration for the padding duration by shifting a first cyclic prefix corresponding to the first symbol to be prior to the padding duration in a time domain. In some examples, the padding duration is contiguous to the first symbol in a time domain. In some examples, one or more samples of each reference signal repetition in the padding duration correspond to a respective cyclic prefix for a subsequent reference signal repetition.

In some examples, to support communicating the reference signal repetitions, the reference signal repetition component 1335 may be configured as or otherwise support a means for receiving, from a base station, the reference signal repetitions during the padding duration and the first symbol.

In some examples, to support receiving the reference signal repetitions, the beam refinement component 1375 may be configured as or otherwise support a means for receiving the reference signal repetitions using a set of multiple receive beams, where the reference signal repetitions are transmitted using a same transmit beam. In some examples, to support receiving the reference signal repetitions, the beam refinement component 1375 may be configured as or otherwise support a means for selecting a receive beam from the set of multiple receive beams for reception of subsequent downlink signals in accordance with the reference signal repetitions, where the control signal indicates that the reference signal repetitions are configured for downlink beam refinement.

In some examples, to support communicating the reference signal repetitions, the reference signal repetition component 1335 may be configured as or otherwise support a means for transmitting the reference signal repetitions during the padding duration and the first symbol.

In some examples, to support transmitting the reference signal repetitions, the beam refinement component 1375 may be configured as or otherwise support a means for transmitting each of the reference signal repetitions using a same transmit beam, the reference signal repetitions including SRSs, where the control signal indicates that the reference signal repetitions are configured for uplink beam refinement.

In some examples, to support transmitting the reference signal repetitions, the random access component 1380 may be configured as or otherwise support a means for transmitting a set of multiple random access preamble message repetitions during the padding duration and the first symbol.

In some examples, to support communicating the reference signal repetitions, the reference signal repetition component 1335 may be configured as or otherwise support a means for communicating a first reference signal repetition of the reference signal repetitions prior to the gap period. In some examples, to support communicating the reference signal repetitions, the reference signal repetition component 1335 may be configured as or otherwise support a means for communicating a second reference signal repetition of the reference signal repetitions in the first symbol after the gap period.

In some examples, to support communicating the first reference signal repetition and the second reference signal repetition, the reference signal repetition component 1335 may be configured as or otherwise support a means for receiving the first reference signal repetition using a first receive beam. In some examples, to support communicating the first reference signal repetition and the second reference signal repetition, the beam switching component 1360 may be configured as or otherwise support a means for switching to a second receive beam during the gap period subsequent to the first reference signal repetition. In some examples, to support communicating the first reference signal repetition and the second reference signal repetition, the reference signal repetition component 1335 may be configured as or otherwise support a means for receiving the second reference signal repetition using the second receive beam.

In some examples, the control signal reception component 1365 may be configured as or otherwise support a means for receiving a second control signal indicating a first duration of the gap period.

In some examples, the padding duration configuration component 1330 may be configured as or otherwise support a means for applying the configuration for the padding duration by allocating a second gap period at a beginning of the padding duration, where a second duration of the second gap period is based on a first duration of the gap period, a third duration of at least one of the reference signal repetitions, and the padding duration.

In some examples, to support receiving the control signal, the padding duration configuration component 1330 may be configured as or otherwise support a means for receiving, via the control signal including the configuration for the padding duration, an allocation of resources for the reference signal repetitions, the allocation of the resources indicating at least one of fractions of symbol numbers, symbol numbers corresponding to the SCS, or a bit indicative of a quantity of symbols in the padding duration and a symbol number indicating an offset from the first symbol to the padding duration.

In some examples, a quantity of the reference signal repetitions is based on a ratio of the padding duration to the symbol duration of each symbol of the set of multiple symbols. In some examples, the symbol duration is inversely proportional to the SCS.

Additionally or alternatively, the communications manager 1320 may support wireless communication at a UE in accordance with examples as disclosed herein. In some examples, the SCS component 1325 may be configured as or otherwise support a means for receiving an indication of an SCS for communications in a set of multiple TTIs, where a TTI of the set of multiple TTIs includes a set of multiple symbols, a corresponding set of multiple cyclic prefixes, and a padding duration allocated for a beam switching procedure, and where a symbol duration of the set of multiple symbols is based on the SCS and where the padding duration is longer than a duration corresponding to the beam switching procedure. In some examples, the padding duration configuration component 1330 may be configured as or otherwise support a means for receiving a control signal indicating a configuration for the padding duration, where the configuration allocates the padding duration for one or more operations different than the beam switching procedure. In some examples, the padding duration configuration component 1330 may be configured as or otherwise support a means for performing, during at least a portion of the padding duration, at least one operation of the one or more operations for which the padding duration is allocated in accordance with the configuration.

In some examples, to support performing the at least one operation, the reference signal repetition component 1335 may be configured as or otherwise support a means for communicating at least one reference signal and at least one corresponding cyclic prefix during the portion of the padding duration, where the portion of the padding duration is less than or the same as the symbol duration of each symbol of the set of multiple symbols, and where the at least one reference signal is transmitted in a frequency domain or in a time domain.

In some examples, to support performing the at least one operation, the coding bit communication component 1345 may be configured as or otherwise support a means for communicating a set of coding bits during the portion of the padding duration, where the set of coding bits are communicated in a frequency domain or in a time domain using a cyclic prefix having a reduced duration.

In some examples, to support performing the at least one operation, the interference measurement component 1350 may be configured as or otherwise support a means for performing an interference measurement procedure during the portion of the padding duration to obtain an interference measurement value. In some examples, to support performing the at least one operation, the interference measurement component 1350 may be configured as or otherwise support a means for transmitting an indication of the interference measurement value to a base station.

In some examples, to support performing the at least one operation, the interference measurement component 1350 may be configured as or otherwise support a means for refraining from transmitting signals during the portion of the padding duration. In some examples, to support performing the at least one operation, the interference measurement component 1350 may be configured as or otherwise support a means for receiving an indication of an interference measurement value corresponding to an interference measurement procedure performed during the portion of the padding duration in accordance with refraining from transmitting the signals.

In some examples, to support performing the at least one operation, the cyclic prefix component 1355 may be configured as or otherwise support a means for communicating an extended cyclic prefix during the portion of the padding duration, where the extended cyclic prefix includes a repetition of a first symbol of the set of multiple symbols.

In some examples, the beam switching component 1360 may be configured as or otherwise support a means for performing the beam switching procedure in a first portion of the padding duration. In some examples, the padding duration configuration component 1330 may be configured as or otherwise support a means for performing the at least one operation in a remaining portion of the padding duration.

In some examples, to support receiving the control signal, the control signal reception component 1365 may be configured as or otherwise support a means for receiving at least one of a TCI state update, DCI, or a MAC-CE including the configuration for the padding duration.

In some examples, to support receiving the control signal, the control signal reception component 1365 may be configured as or otherwise support a means for receiving the control signal including an indication to switch from a first operation of the one or more operations to a second operation of the one or more operations, where performing the at least one operation includes performing the second operation in accordance with the configuration.

In some examples, the at least one operation is based on a criterion associated with the communications between the UE and a base station in the set of multiple TTIs.

In some examples, to support receiving the control signal, the UE capability component 1370 may be configured as or otherwise support a means for transmitting a UE capability message indicating a beam switching capability of the UE. In some examples, to support receiving the control signal, the UE capability component 1370 may be configured as or otherwise support a means for receiving the control signal in response to the UE capability message, where the one or more operations are based on the beam switching capability of the UE.

In some examples, the UE capability component 1370 may be configured as or otherwise support a means for receiving a signal that requests the UE capability message. In some examples, the UE capability component 1370 may be configured as or otherwise support a means for transmitting the UE capability message in response to the signal.

In some examples, the UE capability component 1370 may be configured as or otherwise support a means for transmitting an uplink message including a request for the one or more operations. In some examples, the control signal reception component 1365 may be configured as or otherwise support a means for receiving the control signal including the configuration for the padding duration in response to the uplink message, where the configuration indicates the one or more operations based on the uplink message.

Figure 14:
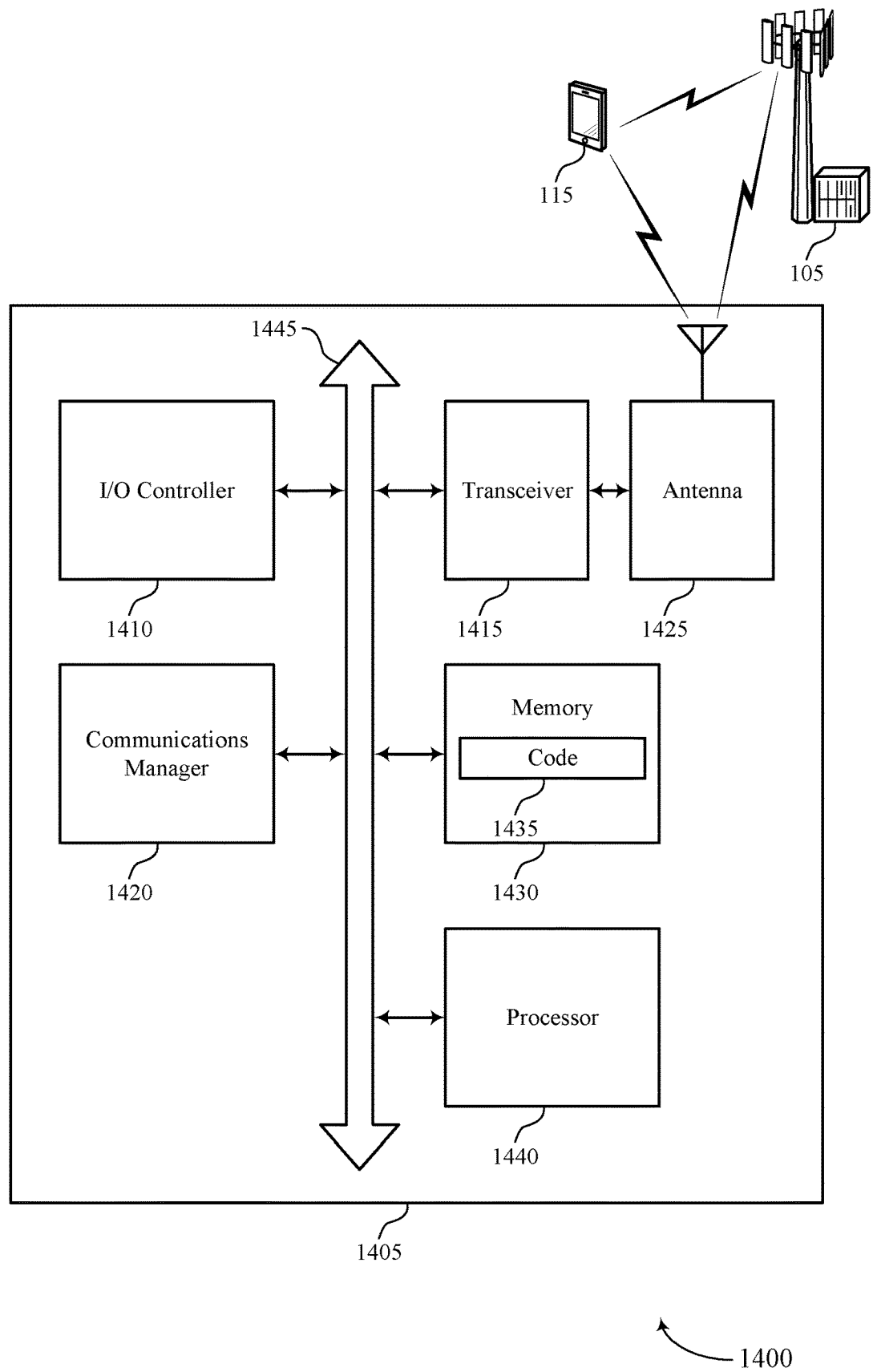
FIG. 14 shows a diagram of a system including a device that supports configurations for utilization of a padding duration in accordance with aspects of the present disclosure.

FIG. 14 shows a diagram of a system 1400 including a device 1405 that supports configurations for utilization of a padding duration in accordance with aspects of the present disclosure. The device 1405 may be an example of or include the components of a device 1105, a device 1205, or a UE 115 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting configurations for utilization of a padding duration). For example, the device 1405 or a component of the device 1405 may include a processor 1440 and memory 1430 coupled to the processor 1440, the processor 1440 and memory 1430 configured to perform various functions described herein.

The communications manager 1420 may support wireless communication at a UE in accordance with examples as disclosed herein. For example, the communications manager 1420 may be configured as or otherwise support a means for receiving an indication of an SCS for communications in a set of multiple TTIs, where a TTI of the set of multiple TTIs includes a set of multiple symbols, a corresponding set of multiple cyclic prefixes, and a padding duration, and where a symbol duration of the set of multiple symbols is based on the SCS, and where the padding duration is longer than the symbol duration. The communications manager 1420 may be configured as or otherwise support a means for receiving a control signal indicating a configuration for the padding duration, where the configuration allocates the padding duration and a first symbol of the set of multiple symbols for transmission of reference signal repetitions, the first symbol being subsequent in time to the padding duration. The communications manager 1420 may be configured as or otherwise support a means for communicating the reference signal repetitions during the padding duration and the first symbol in accordance with the configuration.

Additionally or alternatively, the communications manager 1420 may support wireless communication at a UE in accordance with examples as disclosed herein. For example, the communications manager 1420 may be configured as or otherwise support a means for receiving an indication of an SCS for communications in a set of multiple TTIs, where a TTI of the set of multiple TTIs includes a set of multiple symbols, a corresponding set of multiple cyclic prefixes, and a padding duration allocated for a beam switching procedure, and where a symbol duration of the set of multiple symbols is based on the SCS and where the padding duration is longer than a duration corresponding to the beam switching procedure. The communications manager 1420 may be configured as or otherwise support a means for receiving a control signal indicating a configuration for the padding duration, where the configuration allocates the padding duration for one or more operations different than the beam switching procedure. The communications manager 1420 may be configured as or otherwise support a means for performing, during at least a portion of the padding duration, at least one operation of the one or more operations for which the padding duration is allocated in accordance with the configuration.

By including or configuring the communications manager 1420 in accordance with examples as described herein, the device 1405 may support techniques for reduced latency, more efficient utilization of communication resources, and improved coordination between devices. The device 1405 may receive a configuration for performing one or more operations in a padding duration that may otherwise be unused or empty, which may provide for more efficient utilization of communication resources. By utilizing the padding duration to perform operations such as reference signal repetition, interference measurement, reception of coding bits or an extended cyclic prefix, or any combination thereof, the device 1405 may efficiently utilize communication resources to perform operations that may improve communication reliability and reduce latency. For example, by performing the one or more operations during the padding duration, the device 1405 may refrain from performing the operations during subsequent resources, which may reduce latency.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of configurations for utilization of a padding duration as described herein, or the processor 1440 and the memory 1430 may be otherwise configured to perform or support such operations.

Figure 15:
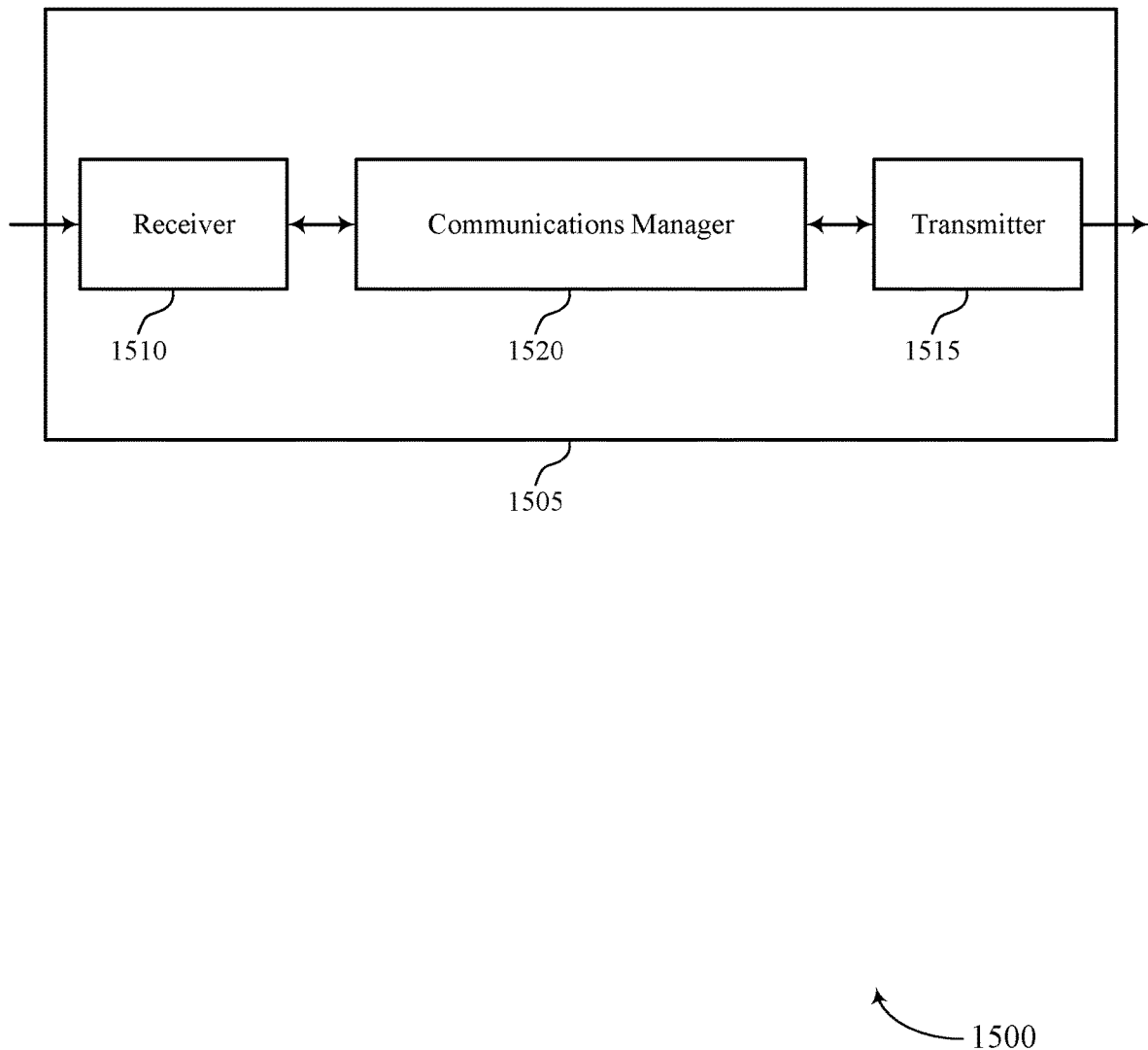
FIGS. 15 and 16 show block diagrams of devices that support configurations for utilization of a padding duration in accordance with aspects of the present disclosure.

FIG. 15 shows a block diagram 1500 of a device 1505 that supports configurations for utilization of a padding duration in accordance with aspects of the present disclosure. The device 1505 may be an example of aspects of a base station 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to configurations for utilization of a padding duration). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to configurations for utilization of a padding duration). In some examples, the transmitter 1515 may be co-located with a receiver 1510 in a transceiver module. The transmitter 1515 may utilize a single antenna or a set of multiple antennas.

The communications manager 1520, the receiver 1510, the transmitter 1515, or various combinations thereof or various components thereof may be examples of means for performing various aspects of configurations for utilization of a padding duration as described herein. For example, the communications manager 1520, the receiver 1510, the transmitter 1515, or various combinations or components thereof may support a method for performing one or more of the functions described herein.

In some examples, the communications manager 1520, the receiver 1510, the transmitter 1515, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1520, the receiver 1510, the transmitter 1515, or various combinations or components thereof may be implemented in code (e.g., as communications management software or firmware) executed by a processor. If implemented in code executed by a processor, the functions of the communications manager 1520, the receiver 1510, the transmitter 1515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1520 may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communication at a base station in accordance with examples as disclosed herein. For example, the communications manager 1520 may be configured as or otherwise support a means for transmitting, to a UE, an indication of an SCS for communications in a set of multiple TTIs, where a TTI of the set of multiple TTIs includes a set of multiple symbols, a corresponding set of multiple cyclic prefixes, and a padding duration, and where a symbol duration of the set of multiple symbols is based on the SCS, and where the padding duration is longer than the symbol duration. The communications manager 1520 may be configured as or otherwise support a means for transmitting, to the UE, a control signal including a configuration for the padding duration, where the configuration allocates the padding duration and a first symbol of the set of multiple symbols for transmission of reference signal repetitions, the first symbol being subsequent in time to the padding duration. The communications manager 1520 may be configured as or otherwise support a means for communicating the reference signal repetitions during the padding duration and the first symbol in accordance with the configuration.

Additionally or alternatively, the communications manager 1520 may support wireless communication at a base station in accordance with examples as disclosed herein. For example, the communications manager 1520 may be configured as or otherwise support a means for transmitting, to a UE, an indication of an SCS for communications in a set of multiple TTIs, where a TTI of the set of multiple TTIs includes a set of multiple symbols, a corresponding set of multiple cyclic prefixes, and a padding duration allocated for a beam switching procedure, and where a symbol duration of the set of multiple symbols is based on the SCS and where the padding duration is longer than a duration corresponding to the beam switching procedure. The communications manager 1520 may be configured as or otherwise support a means for transmitting, to the UE, a control signal indicating a configuration for the padding duration, where the configuration allocates the padding duration for one or more operations different than the beam switching procedure. The communications manager 1520 may be configured as or otherwise support a means for performing, during at least a portion of the padding duration, at least one operation of the one or more operations for which the padding duration is allocated in accordance with the configuration.

Figure 16:
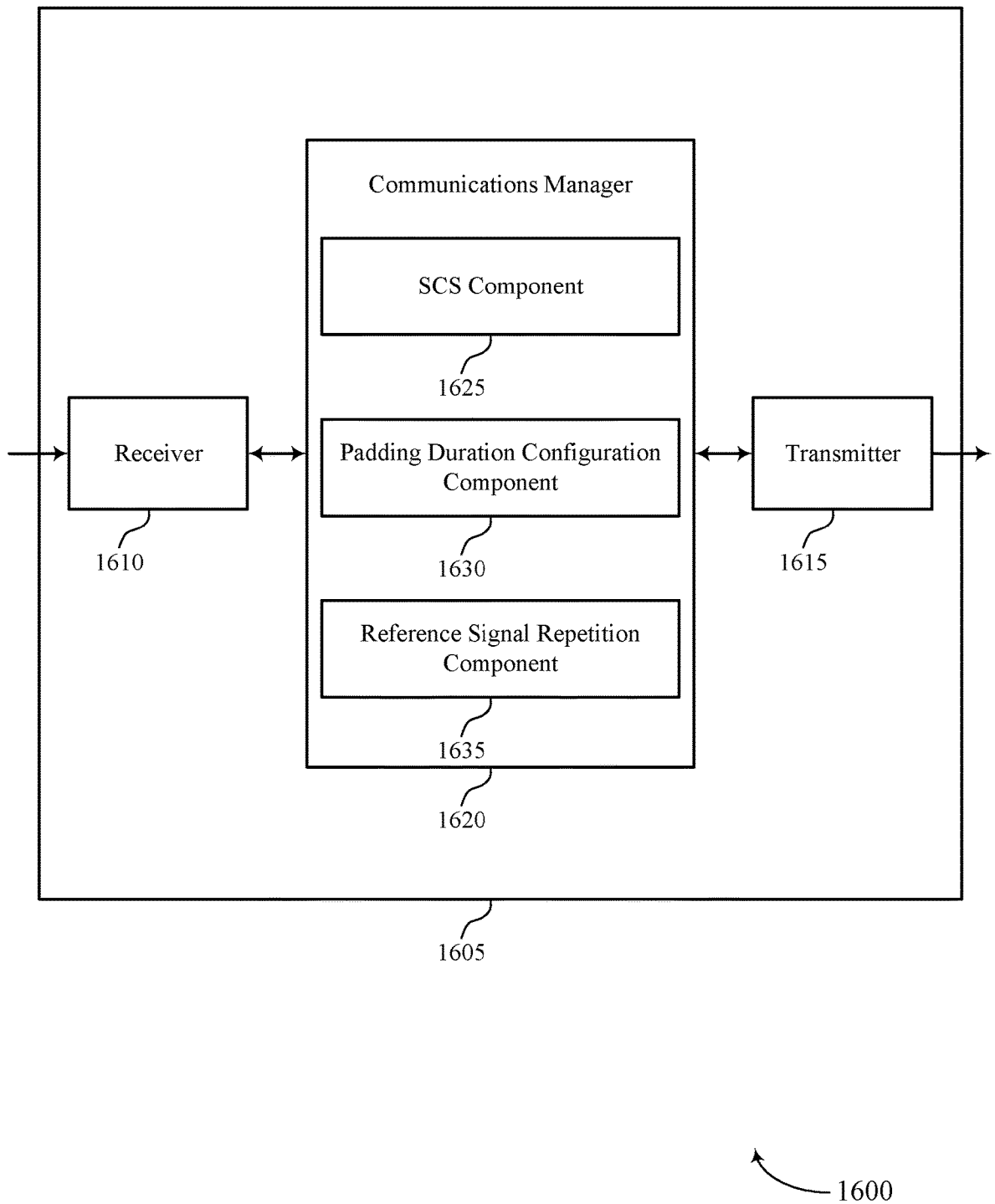

FIG. 16 shows a block diagram 1600 of a device 1605 that supports configurations for utilization of a padding duration in accordance with aspects of the present disclosure. The device 1605 may be an example of aspects of a device 1505 or a base station 105 as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for receiving information such as packets, user data, control information, or any combination thereof associated with various information channels (e.g., control channels, data channels, information channels related to configurations for utilization of a padding duration). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to configurations for utilization of a padding duration). In some examples, the transmitter 1615 may be co-located with a receiver 1610 in a transceiver module. The transmitter 1615 may utilize a single antenna or a set of multiple antennas.

The device 1605, or various components thereof, may be an example of means for performing various aspects of configurations for utilization of a padding duration as described herein. For example, the communications manager 1620 may include an SCS component 1625, a padding duration configuration component 1630, a reference signal repetition component 1635, or any combination thereof. The communications manager 1620 may be an example of aspects of a communications manager 1520 as described herein. In some examples, the communications manager 1620, or various components thereof, may be configured to perform various operations (e.g., receiving, monitoring, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to receive information, transmit information, or perform various other operations as described herein.

The communications manager 1620 may support wireless communication at a base station in accordance with examples as disclosed herein. The SCS component 1625 may be configured as or otherwise support a means for transmitting, to a UE, an indication of an SCS for communications in a set of multiple TTIs, where a TTI of the set of multiple TTIs includes a set of multiple symbols, a corresponding set of multiple cyclic prefixes, and a padding duration, and where a symbol duration of the set of multiple symbols is based on the SCS, and where the padding duration is longer than the symbol duration. The padding duration configuration component 1630 may be configured as or otherwise support a means for transmitting, to the UE, a control signal including a configuration for the padding duration, where the configuration allocates the padding duration and a first symbol of the set of multiple symbols for transmission of reference signal repetitions, the first symbol being subsequent in time to the padding duration. The reference signal repetition component 1635 may be configured as or otherwise support a means for communicating the reference signal repetitions during the padding duration and the first symbol in accordance with the configuration.

Additionally or alternatively, the communications manager 1620 may support wireless communication at a base station in accordance with examples as disclosed herein. The SCS component 1625 may be configured as or otherwise support a means for transmitting, to a UE, an indication of an SCS for communications in a set of multiple TTIs, where a TTI of the set of multiple TTIs includes a set of multiple symbols, a corresponding set of multiple cyclic prefixes, and a padding duration allocated for a beam switching procedure, and where a symbol duration of the set of multiple symbols is based on the SCS and where the padding duration is longer than a duration corresponding to the beam switching procedure. The padding duration configuration component 1630 may be configured as or otherwise support a means for transmitting, to the UE, a control signal indicating a configuration for the padding duration, where the configuration allocates the padding duration for one or more operations different than the beam switching procedure. The padding duration configuration component 1630 may be configured as or otherwise support a means for performing, during at least a portion of the padding duration, at least one operation of the one or more operations for which the padding duration is allocated in accordance with the configuration.

Figure 17:
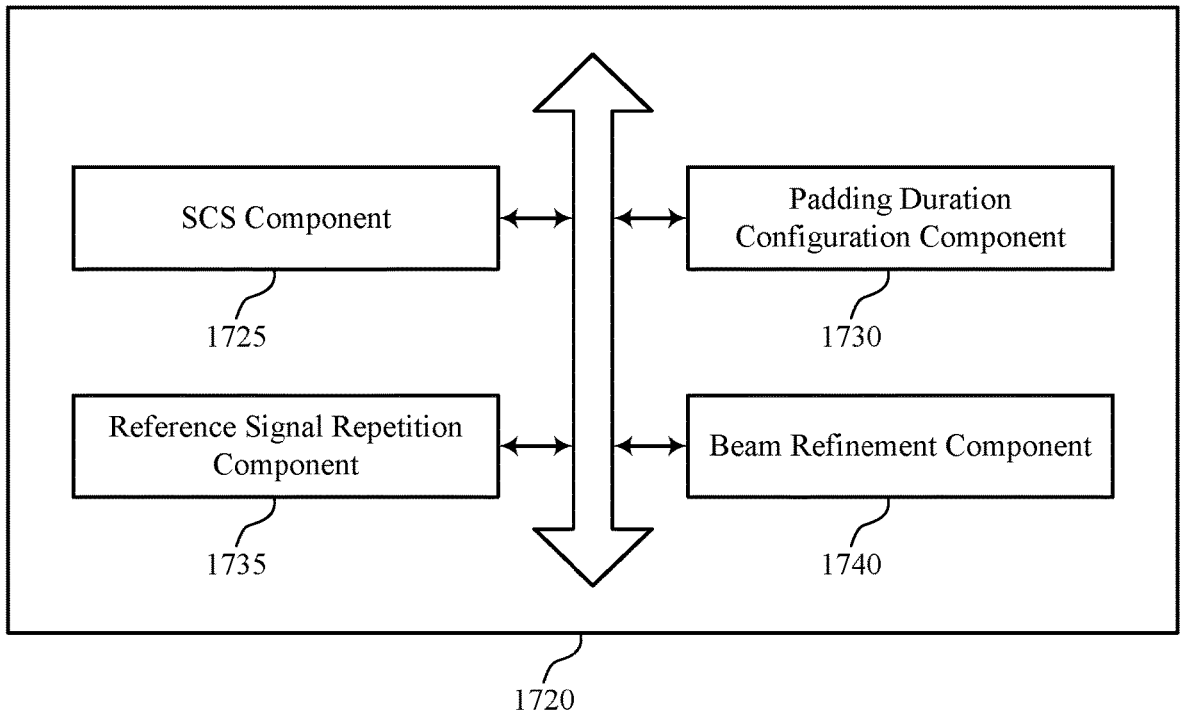
FIG. 17 shows a block diagram of a communications manager that supports configurations for utilization of a padding duration in accordance with aspects of the present disclosure.

FIG. 17 shows a block diagram 1700 of a communications manager 1720 that supports configurations for utilization of a padding duration in accordance with aspects of the present disclosure. The communications manager 1720 may be an example of aspects of a communications manager 1520, a communications manager 1620, or both, as described herein. The communications manager 1720, or various components thereof, may be an example of means for performing various aspects of configurations for utilization of a padding duration as described herein. For example, the communications manager 1720 may include an SCS component 1725, a padding duration configuration component 1730, a reference signal repetition component 1735, a beam refinement component 1740, or any combination thereof. Each of these components may communicate, directly or indirectly, with one another (e.g., via one or more buses).

The communications manager 1720 may support wireless communication at a base station in accordance with examples as disclosed herein. The SCS component 1725 may be configured as or otherwise support a means for transmitting, to a UE, an indication of an SCS for communications in a set of multiple TTIs, where a TTI of the set of multiple TTIs includes a set of multiple symbols, a corresponding set of multiple cyclic prefixes, and a padding duration, and where a symbol duration of the set of multiple symbols is based on the SCS, and where the padding duration is longer than the symbol duration. The padding duration configuration component 1730 may be configured as or otherwise support a means for transmitting, to the UE, a control signal including a configuration for the padding duration, where the configuration allocates the padding duration and a first symbol of the set of multiple symbols for transmission of reference signal repetitions, the first symbol being subsequent in time to the padding duration. The reference signal repetition component 1735 may be configured as or otherwise support a means for communicating the reference signal repetitions during the padding duration and the first symbol in accordance with the configuration.

In some examples, to support communicating the reference signal repetitions, the beam refinement component 1740 may be configured as or otherwise support a means for receiving, from the UE, the reference signal repetitions using a set of multiple receive beams, where the reference signal repetitions are transmitted using a same transmit beam. In some examples, to support communicating the reference signal repetitions, the beam refinement component 1740 may be configured as or otherwise support a means for selecting a receive beam from the set of multiple receive beams for reception of subsequent uplink signals in accordance with the reference signal repetitions, where the control signal indicates that the reference signal repetitions are configured for uplink beam refinement.

Additionally or alternatively, the communications manager 1720 may support wireless communication at a base station in accordance with examples as disclosed herein. In some examples, the SCS component 1725 may be configured as or otherwise support a means for transmitting, to a UE, an indication of an SCS for communications in a set of multiple TTIs, where a TTI of the set of multiple TTIs includes a set of multiple symbols, a corresponding set of multiple cyclic prefixes, and a padding duration allocated for a beam switching procedure, and where a symbol duration of the set of multiple symbols is based on the SCS and where the padding duration is longer than a duration corresponding to the beam switching procedure. In some examples, the padding duration configuration component 1730 may be configured as or otherwise support a means for transmitting, to the UE, a control signal indicating a configuration for the padding duration, where the configuration allocates the padding duration for one or more operations different than the beam switching procedure. In some examples, the padding duration configuration component 1730 may be configured as or otherwise support a means for performing, during at least a portion of the padding duration, at least one operation of the one or more operations for which the padding duration is allocated in accordance with the configuration.

Figure 18:
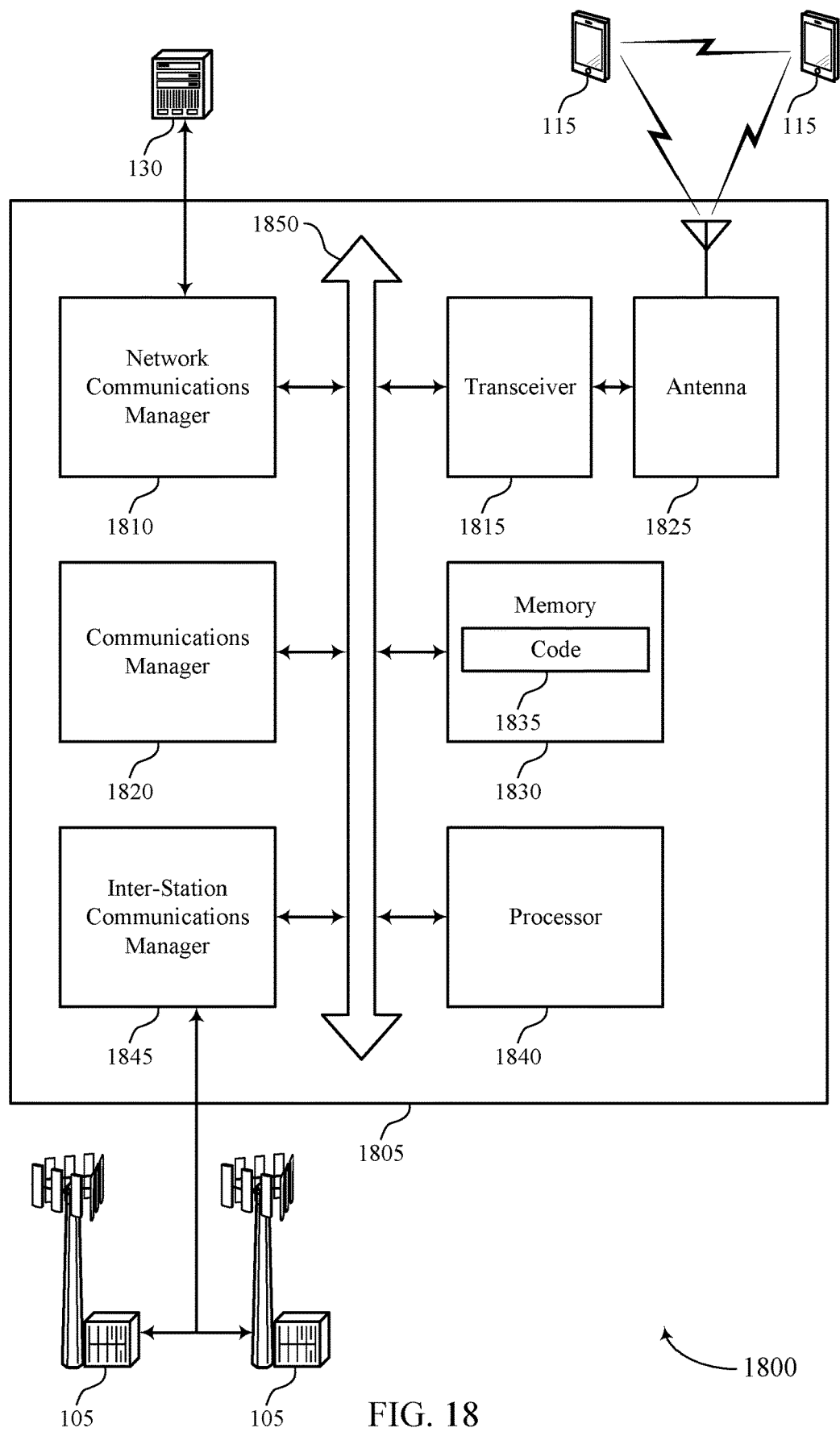
FIG. 18 shows a diagram of a system including a device that supports configurations for utilization of a padding duration in accordance with aspects of the present disclosure.

FIG. 18 shows a diagram of a system 1800 including a device 1805 that supports configurations for utilization of a padding duration in accordance with aspects of the present disclosure. The device 1805 may be an example of or include the components of a device 1505, a device 1605, or a base station 105 as described herein. The device 1805 may communicate wirelessly with one or more base stations 105, UEs 115, or any combination thereof. The device 1805 may include components for bi-directional voice and data communications including components for transmitting and receiving communications, such as a communications manager 1820, a network communications manager 1810, a transceiver 1815, an antenna 1825, a memory 1830, code 1835, a processor 1840, and an inter-station communications manager 1845. These components may be in electronic communication or otherwise coupled (e.g., operatively, communicatively, functionally, electronically, electrically) via one or more buses (e.g., a bus 1850).

The network communications manager 1810 may manage communications with a core network 130 (e.g., via one or more wired backhaul links). For example, the network communications manager 1810 may manage the transfer of data communications for client devices, such as one or more UEs 115.

In some cases, the device 1805 may include a single antenna 1825. However, in some other cases the device 1805 may have more than one antenna 1825, which may be capable of concurrently transmitting or receiving multiple wireless transmissions. The transceiver 1815 may communicate bi-directionally, via the one or more antennas 1825, wired, or wireless links as described herein. For example, the transceiver 1815 may represent a wireless transceiver and may communicate bi-directionally with another wireless transceiver. The transceiver 1815 may also include a modem to modulate the packets, to provide the modulated packets to one or more antennas 1825 for transmission, and to demodulate packets received from the one or more antennas 1825. The transceiver 1815, or the transceiver 1815 and one or more antennas 1825, may be an example of a transmitter 1515, a transmitter 1615, a receiver 1510, a receiver 1610, or any combination thereof or component thereof, as described herein.

The memory 1830 may include RAM and ROM. The memory 1830 may store computer-readable, computer-executable code 1835 including instructions that, when executed by the processor 1840, cause the device 1805 to perform various functions described herein. The code 1835 may be stored in a non-transitory computer-readable medium such as system memory or another type of memory. In some cases, the code 1835 may not be directly executable by the processor 1840 but may cause a computer (e.g., when compiled and executed) to perform functions described herein. In some cases, the memory 1830 may contain, among other things, a BIOS which may control basic hardware or software operation such as the interaction with peripheral components or devices.

The processor 1840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some other cases, a memory controller may be integrated into the processor 1840. The processor 1840 may be configured to execute computer-readable instructions stored in a memory (e.g., the memory 1830) to cause the device 1805 to perform various functions (e.g., functions or tasks supporting configurations for utilization of a padding duration). For example, the device 1805 or a component of the device 1805 may include a processor 1840 and memory 1830 coupled to the processor 1840, the processor 1840 and memory 1830 configured to perform various functions described herein.

The inter-station communications manager 1845 may manage communications with other base stations 105, and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communications network technology to provide communication between base stations 105.

The communications manager 1820 may support wireless communication at a base station in accordance with examples as disclosed herein. For example, the communications manager 1820 may be configured as or otherwise support a means for transmitting, to a UE, an indication of an SCS for communications in a set of multiple TTIs, where a TTI of the set of multiple TTIs includes a set of multiple symbols, a corresponding set of multiple cyclic prefixes, and a padding duration, and where a symbol duration of the set of multiple symbols is based on the SCS, and where the padding duration is longer than the symbol duration. The communications manager 1820 may be configured as or otherwise support a means for transmitting, to the UE, a control signal including a configuration for the padding duration, where the configuration allocates the padding duration and a first symbol of the set of multiple symbols for transmission of reference signal repetitions, the first symbol being subsequent in time to the padding duration. The communications manager 1820 may be configured as or otherwise support a means for communicating the reference signal repetitions during the padding duration and the first symbol in accordance with the configuration.

Additionally or alternatively, the communications manager 1820 may support wireless communication at a base station in accordance with examples as disclosed herein. For example, the communications manager 1820 may be configured as or otherwise support a means for transmitting, to a UE, an indication of an SCS for communications in a set of multiple TTIs, where a TTI of the set of multiple TTIs includes a set of multiple symbols, a corresponding set of multiple cyclic prefixes, and a padding duration allocated for a beam switching procedure, and where a symbol duration of the set of multiple symbols is based on the SCS and where the padding duration is longer than a duration corresponding to the beam switching procedure. The communications manager 1820 may be configured as or otherwise support a means for transmitting, to the UE, a control signal indicating a configuration for the padding duration, where the configuration allocates the padding duration for one or more operations different than the beam switching procedure. The communications manager 1820 may be configured as or otherwise support a means for performing, during at least a portion of the padding duration, at least one operation of the one or more operations for which the padding duration is allocated in accordance with the configuration.

In some examples, the communications manager 1820 may be configured to perform various operations (e.g., receiving, monitoring, transmitting) using or otherwise in cooperation with the transceiver 1815, the one or more antennas 1825, or any combination thereof. Although the communications manager 1820 is illustrated as a separate component, in some examples, one or more functions described with reference to the communications manager 1820 may be supported by or performed by the processor 1840, the memory 1830, the code 1835, or any combination thereof. For example, the code 1835 may include instructions executable by the processor 1840 to cause the device 1805 to perform various aspects of configurations for utilization of a padding duration as described herein, or the processor 1840 and the memory 1830 may be otherwise configured to perform or support such operations.

Figure 19:
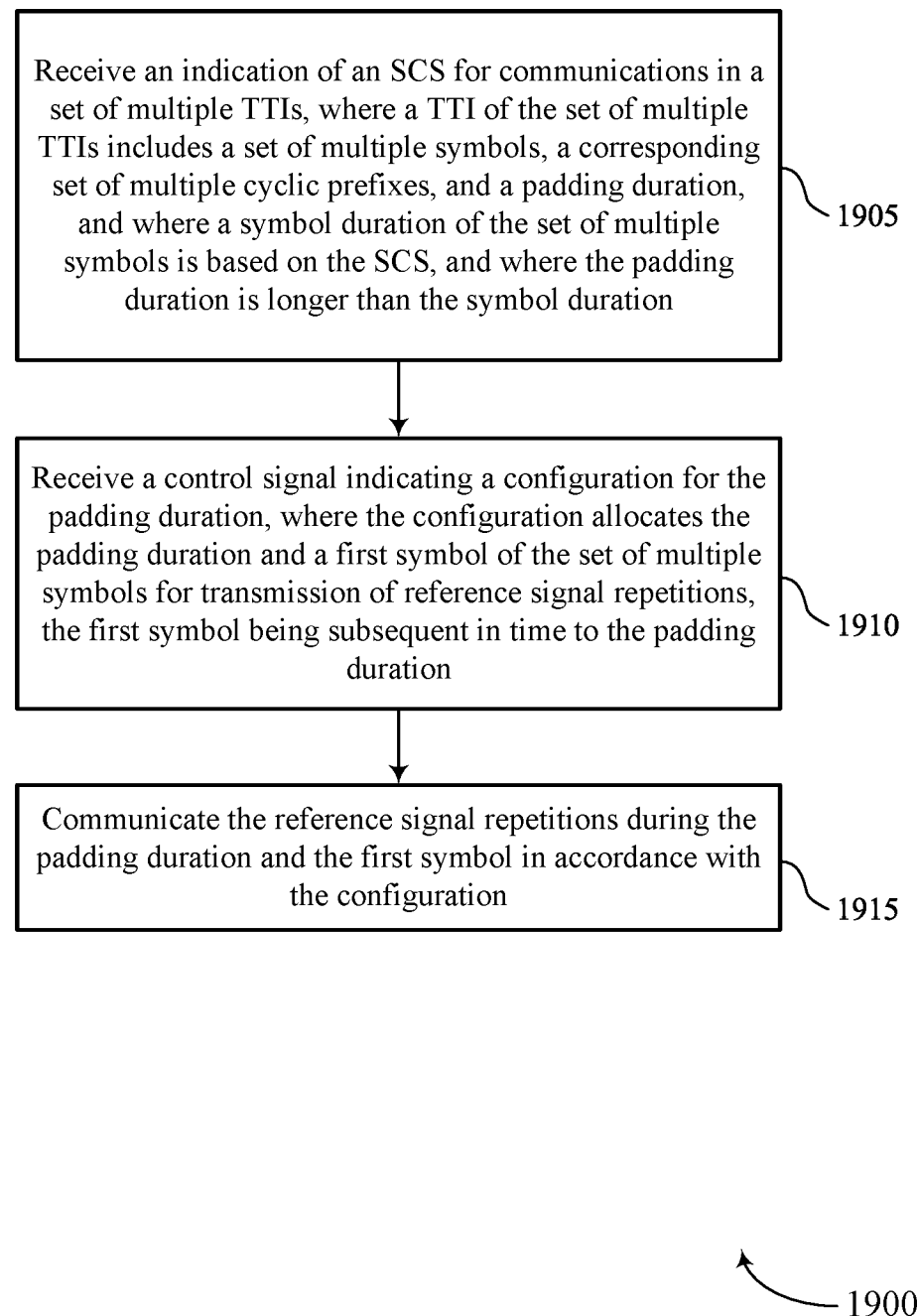
FIGS. 19 through 23 show flowcharts illustrating methods that support configurations for utilization of a padding duration in accordance with aspects of the present disclosure.

FIG. 19 shows a flowchart illustrating a method 1900 that supports configurations for utilization of a padding duration in accordance with aspects of the present disclosure. The operations of the method 1900 may be implemented by a UE or its components as described herein. For example, the operations of the method 1900 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1905, the method may include receiving an indication of an SCS for communications in a set of multiple TTIs, where a TTI of the set of multiple TTIs includes a set of multiple symbols, a corresponding set of multiple cyclic prefixes, and a padding duration, and where a symbol duration of the set of multiple symbols is based on the SCS, and where the padding duration is longer than the symbol duration. The operations of 1905 may be performed in accordance with examples as disclosed herein. In some examples, aspects of the operations of 1905 may be performed by an SCS component 1325 as described with reference to FIG. 13.

At 1910, the method may include receiving a control signal indicating a configuration for the padding duration, where the configuration allocates the padding duration and a first symbol of the set of multiple symbols for transmission of reference signal repetitions, the first symbol being subsequent in time to the padding duration. The operations of 1910 may be performed in accordance with examples as disclosed herein. In some examples, aspects of the operations of 1910 may be performed by a padding duration configuration component 1330 as described with reference to FIG. 13.

At 1915, the method may include communicating the reference signal repetitions during the padding duration and the first symbol in accordance with the configuration. The operations of 1915 may be performed in accordance with examples as disclosed herein. In some examples, aspects of the operations of 1915 may be performed by a reference signal repetition component 1335 as described with reference to FIG. 13.

Figure 20:
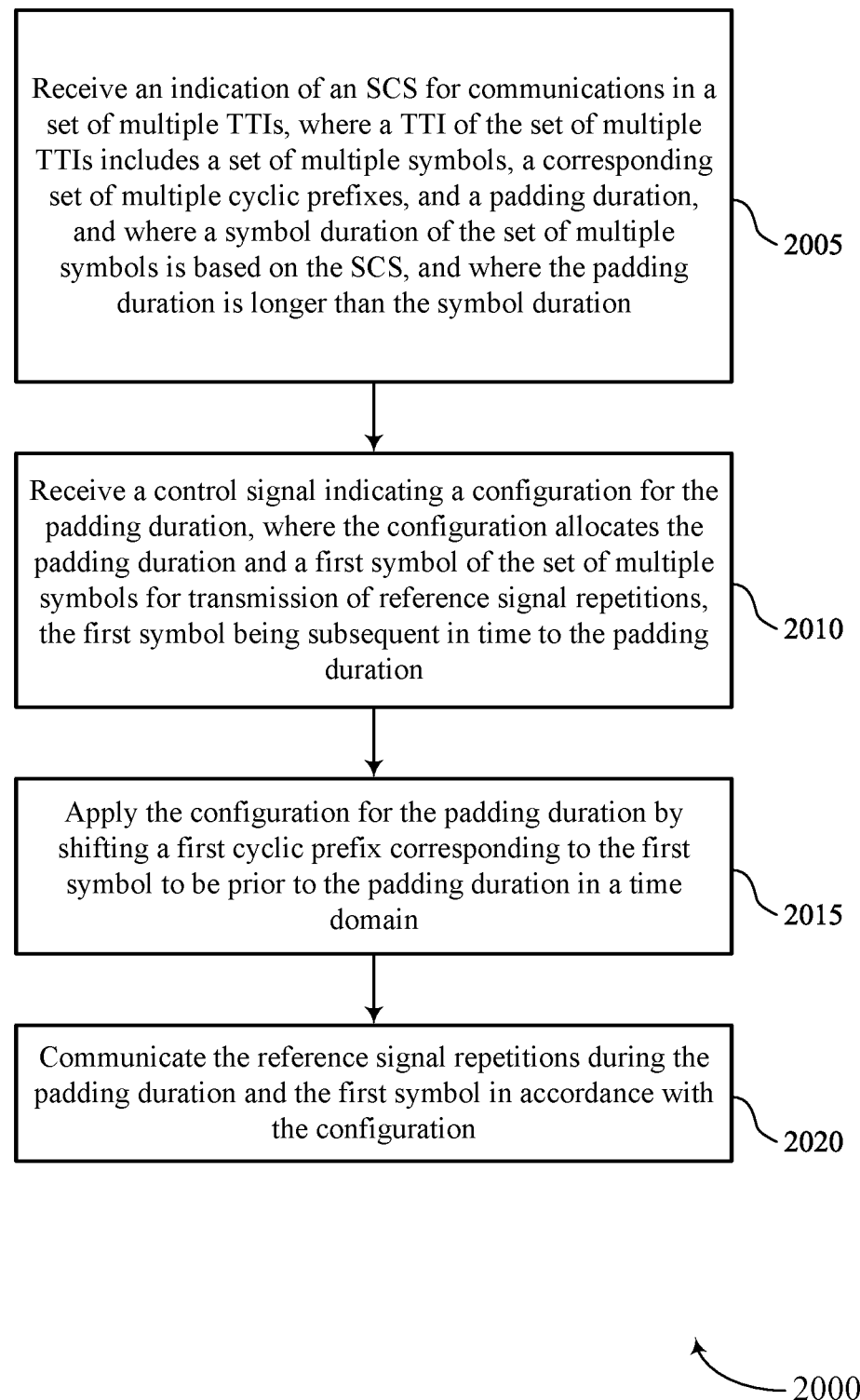

FIG. 20 shows a flowchart illustrating a method 2000 that supports configurations for utilization of a padding duration in accordance with aspects of the present disclosure. The operations of the method 2000 may be implemented by a UE or its components as described herein. For example, the operations of the method 2000 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 2005, the method may include receiving an indication of an SCS for communications in a set of multiple TTIs, where a TTI of the set of multiple TTIs includes a set of multiple symbols, a corresponding set of multiple cyclic prefixes, and a padding duration, and where a symbol duration of the set of multiple symbols is based on the SCS, and where the padding duration is longer than the symbol duration. The operations of 2005 may be performed in accordance with examples as disclosed herein. In some examples, aspects of the operations of 2005 may be performed by an SCS component 1325 as described with reference to FIG. 13.

At 2010, the method may include receiving a control signal indicating a configuration for the padding duration, where the configuration allocates the padding duration and a first symbol of the set of multiple symbols for transmission of reference signal repetitions, the first symbol being subsequent in time to the padding duration. The operations of 2010 may be performed in accordance with examples as disclosed herein. In some examples, aspects of the operations of 2010 may be performed by a padding duration configuration component 1330 as described with reference to FIG. 13.

At 2015, the method may include applying the configuration for the padding duration by shifting a first cyclic prefix corresponding to the first symbol to be prior to the padding duration in a time domain. The operations of 2015 may be performed in accordance with examples as disclosed herein. In some examples, aspects of the operations of 2015 may be performed by a cyclic prefix component 1340 as described with reference to FIG. 13.

At 2020, the method may include communicating the reference signal repetitions during the padding duration and the first symbol in accordance with the configuration. The operations of 2020 may be performed in accordance with examples as disclosed herein. In some examples, aspects of the operations of 2020 may be performed by a reference signal repetition component 1335 as described with reference to FIG. 13.

Figure 21:
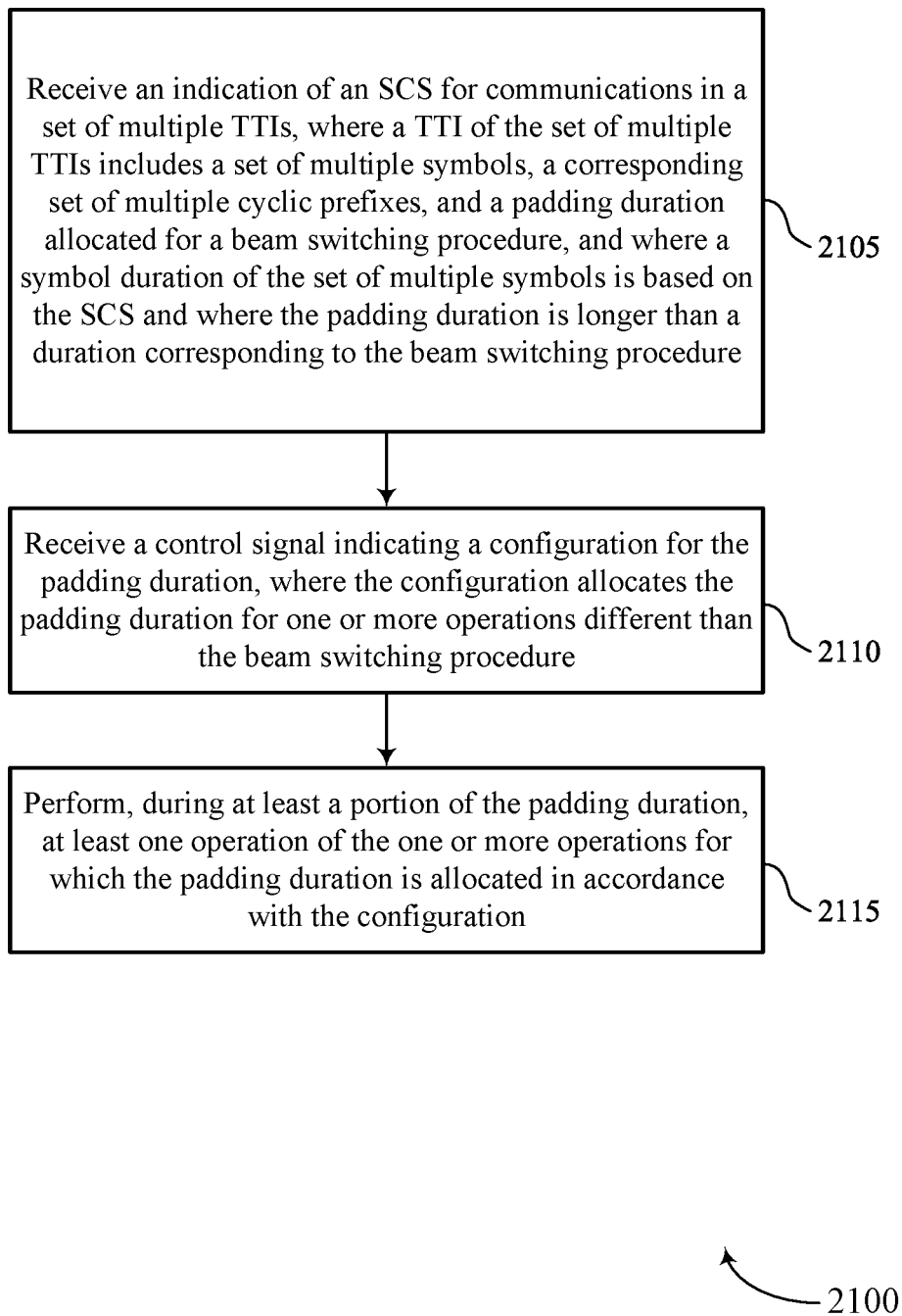

FIG. 21 shows a flowchart illustrating a method 2100 that supports configurations for utilization of a padding duration in accordance with aspects of the present disclosure. The operations of the method 2100 may be implemented by a UE or its components as described herein. For example, the operations of the method 2100 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 2105, the method may include receiving an indication of an SCS for communications in a set of multiple TTIs, where a TTI of the set of multiple TTIs includes a set of multiple symbols, a corresponding set of multiple cyclic prefixes, and a padding duration allocated for a beam switching procedure, and where a symbol duration of the set of multiple symbols is based on the SCS and where the padding duration is longer than a duration corresponding to the beam switching procedure. The operations of 2105 may be performed in accordance with examples as disclosed herein. In some examples, aspects of the operations of 2105 may be performed by an SCS component 1325 as described with reference to FIG. 13.

At 2110, the method may include receiving a control signal indicating a configuration for the padding duration, where the configuration allocates the padding duration for one or more operations different than the beam switching procedure. The operations of 2110 may be performed in accordance with examples as disclosed herein. In some examples, aspects of the operations of 2110 may be performed by a padding duration configuration component 1330 as described with reference to FIG. 13.

At 2115, the method may include performing, during at least a portion of the padding duration, at least one operation of the one or more operations for which the padding duration is allocated in accordance with the configuration. The operations of 2115 may be performed in accordance with examples as disclosed herein. In some examples, aspects of the operations of 2115 may be performed by a padding duration configuration component 1330 as described with reference to FIG. 13.

Figure 22:
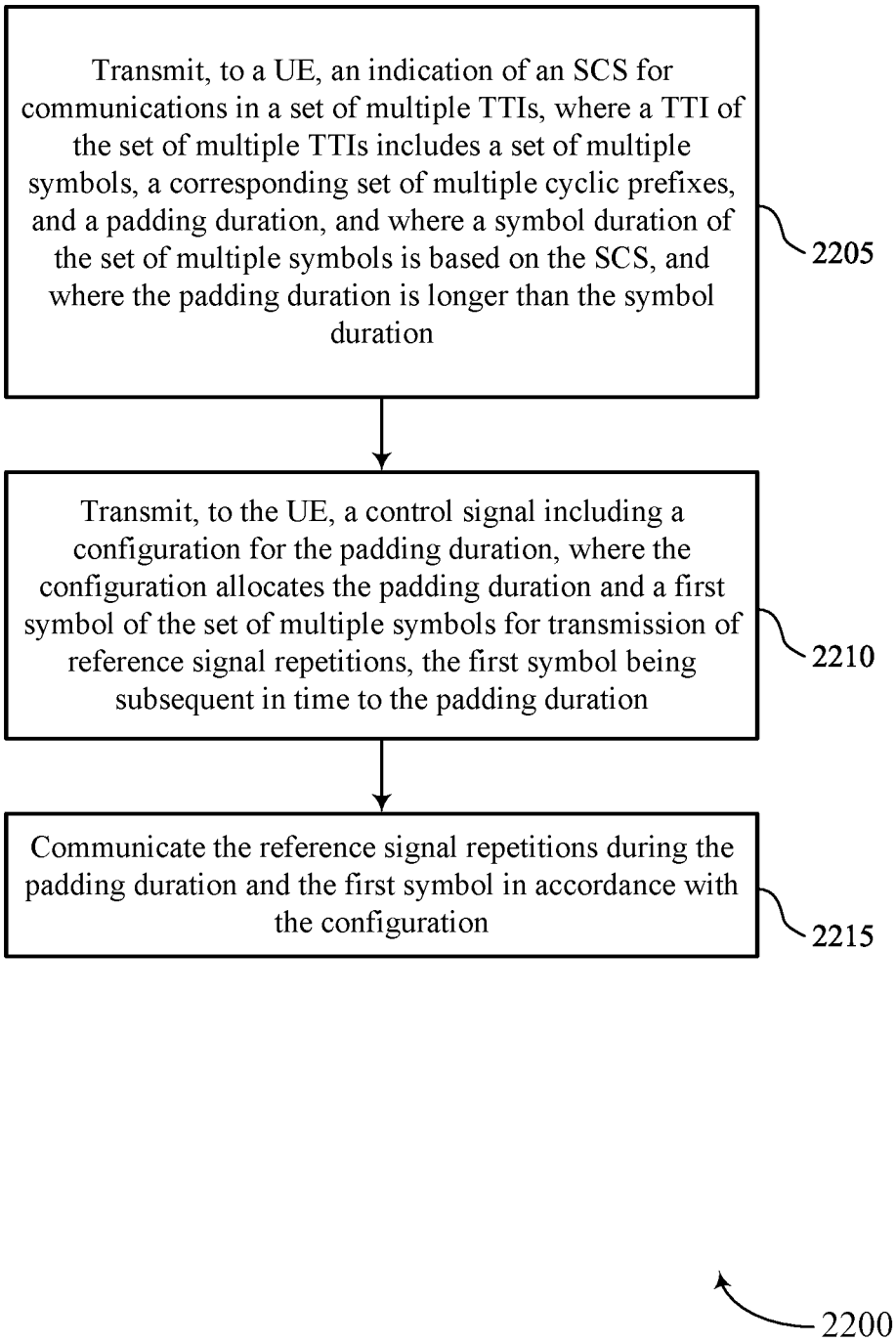

FIG. 22 shows a flowchart illustrating a method 2200 that supports configurations for utilization of a padding duration in accordance with aspects of the present disclosure. The operations of the method 2200 may be implemented by a base station or its components as described herein. For example, the operations of the method 2200 may be performed by a base station 105 as described with reference to FIGS. 1 through 10 and 15 through 18. In some examples, a base station may execute a set of instructions to control the functional elements of the base station to perform the described functions. Additionally or alternatively, the base station may perform aspects of the described functions using special-purpose hardware.

At 2205, the method may include transmitting, to a UE, an indication of an SCS for communications in a set of multiple TTIs, where a TTI of the set of multiple TTIs includes a set of multiple symbols, a corresponding set of multiple cyclic prefixes, and a padding duration, and where a symbol duration of the set of multiple symbols is based on the SCS, and where the padding duration is longer than the symbol duration. The operations of 2205 may be performed in accordance with examples as disclosed herein. In some examples, aspects of the operations of 2205 may be performed by an SCS component 1725 as described with reference to FIG. 17.

At 2210, the method may include transmitting, to the UE, a control signal including a configuration for the padding duration, where the configuration allocates the padding duration and a first symbol of the set of multiple symbols for transmission of reference signal repetitions, the first symbol being subsequent in time to the padding duration. The operations of 2210 may be performed in accordance with examples as disclosed herein. In some examples, aspects of the operations of 2210 may be performed by a padding duration configuration component 1730 as described with reference to FIG. 17.

At 2215, the method may include communicating the reference signal repetitions during the padding duration and the first symbol in accordance with the configuration. The operations of 2215 may be performed in accordance with examples as disclosed herein. In some examples, aspects of the operations of 2215 may be performed by a reference signal repetition component 1735 as described with reference to FIG. 17.

Figure 23:
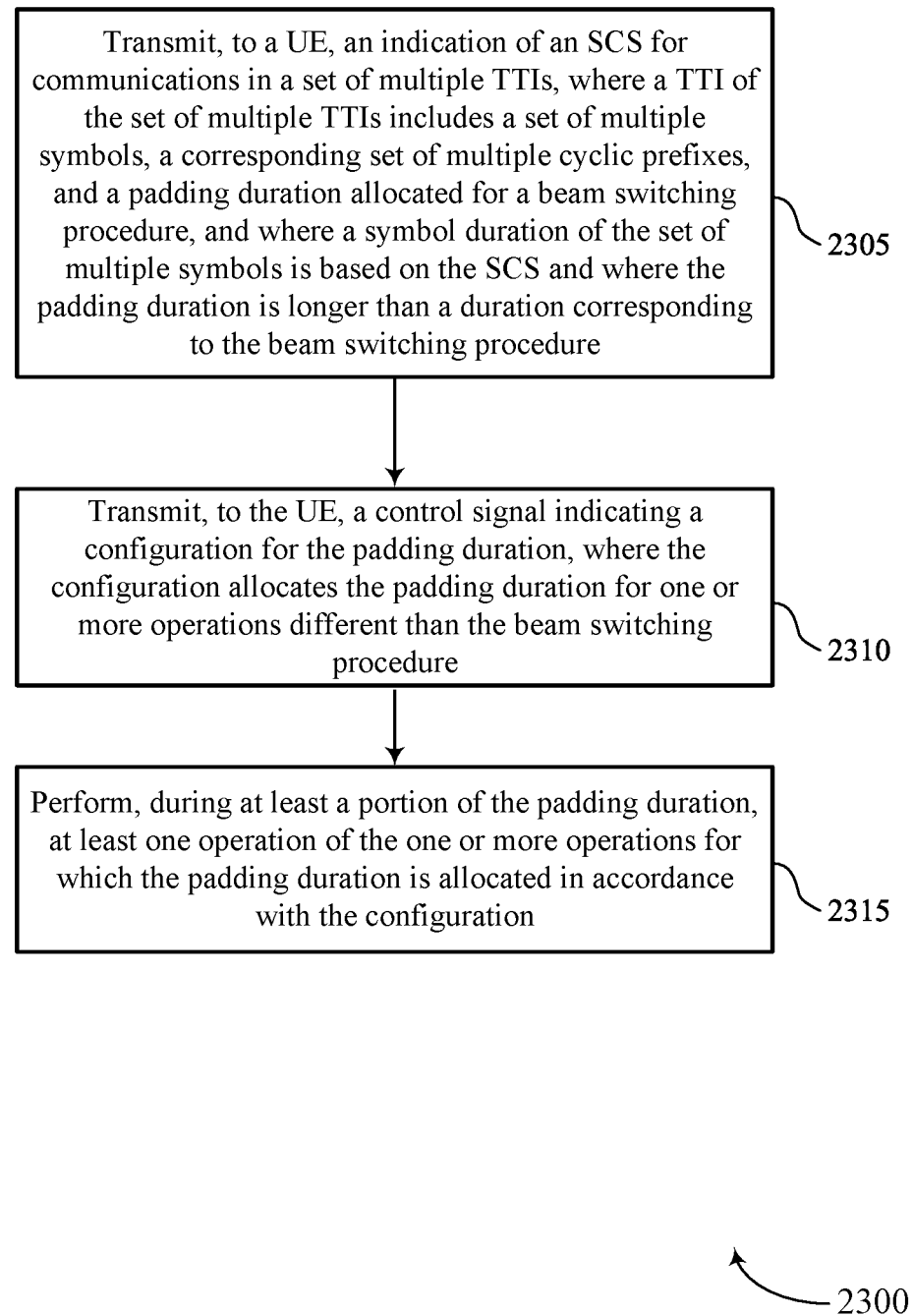

FIG. 23 shows a flowchart illustrating a method 2300 that supports configurations for utilization of a padding duration in accordance with aspects of the present disclosure. The operations of the method 2300 may be implemented by a base station or its components as described herein. For example, the operations of the method 2300 may be performed by a base station 105 as described with reference to FIGS. 1 through 10 and 15 through 18. In some examples, a base station may execute a set of instructions to control the functional elements of the base station to perform the described functions. Additionally or alternatively, the base station may perform aspects of the described functions using special-purpose hardware.

At 2305, the method may include transmitting, to a UE, an indication of an SCS for communications in a set of multiple TTIs, where a TTI of the set of multiple TTIs includes a set of multiple symbols, a corresponding set of multiple cyclic prefixes, and a padding duration allocated for a beam switching procedure, and where a symbol duration of the set of multiple symbols is based on the SCS and where the padding duration is longer than a duration corresponding to the beam switching procedure. The operations of 2305 may be performed in accordance with examples as disclosed herein. In some examples, aspects of the operations of 2305 may be performed by an SCS component 1725 as described with reference to FIG. 17.

At 2310, the method may include transmitting, to the UE, a control signal indicating a configuration for the padding duration, where the configuration allocates the padding duration for one or more operations different than the beam switching procedure. The operations of 2310 may be performed in accordance with examples as disclosed herein. In some examples, aspects of the operations of 2310 may be performed by a padding duration configuration component 1730 as described with reference to FIG. 17.

At 2315, the method may include performing, during at least a portion of the padding duration, at least one operation of the one or more operations for which the padding duration is allocated in accordance with the configuration. The operations of 2315 may be performed in accordance with examples as disclosed herein. In some examples, aspects of the operations of 2315 may be performed by a padding duration configuration component 1730 as described with reference to FIG. 17.

The following provides an overview of aspects of the present disclosure:

Aspect 1: A method for wireless communication at a UE, comprising: receiving an indication of an SCS for communications in a plurality of TTIs, wherein a TTI of the plurality of TTIs comprises a plurality of symbols, a corresponding plurality of cyclic prefixes, and a padding duration, and wherein a symbol duration of the plurality of symbols is based at least in part on the SCS, and wherein the padding duration is longer than the symbol duration; receiving a control signal indicating a configuration for the padding duration, wherein the configuration allocates the padding duration and a first symbol of the plurality of symbols for transmission of reference signal repetitions, the first symbol being subsequent in time to the padding duration; and communicating the reference signal repetitions during the padding duration and the first symbol in accordance with the configuration.

Aspect 2: The method of aspect 1, further comprising: applying the configuration for the padding duration by shifting a first cyclic prefix corresponding to the first symbol to be prior to the padding duration in a time domain.

Aspect 3: The method of any of aspects 1 through 2, wherein: the padding duration is contiguous to the first symbol in a time domain; and one or more samples of each reference signal repetition in the padding duration correspond to a respective cyclic prefix for a subsequent reference signal repetition.

Aspect 4: The method of any of aspects 1 through 3, wherein communicating the reference signal repetitions further comprises: receiving, from a base station, the reference signal repetitions during the padding duration and the first symbol.

Aspect 5: The method of aspect 4, wherein receiving the reference signal repetitions further comprises: receiving the reference signal repetitions using a plurality of receive beams, wherein the reference signal repetitions are transmitted using a same transmit beam; and selecting a receive beam from the plurality of receive beams for reception of subsequent downlink signals in accordance with the reference signal repetitions, wherein the control signal indicates that the reference signal repetitions are configured for downlink beam refinement.

Aspect 6: The method of any of aspects 1 through 3, wherein communicating the reference signal repetitions further comprises: transmitting the reference signal repetitions during the padding duration and the first symbol.

Aspect 7: The method of aspect 6, wherein transmitting the reference signal repetitions further comprises: transmitting each of the reference signal repetitions using a same transmit beam, the reference signal repetitions comprising SRSs, wherein the control signal indicates that the reference signal repetitions are configured for uplink beam refinement.

Aspect 8: The method of aspect 6, wherein transmitting the reference signal repetitions further comprises: transmitting a plurality of random access preamble message repetitions during the padding duration and the first symbol.

Aspect 9: The method of any of aspects 1 through 8, wherein the configuration allocates that the padding duration comprises a gap period configured for a beam switching procedure, and wherein communicating the reference signal repetitions further comprises: communicating a first reference signal repetition of the reference signal repetitions prior to the gap period; and communicating a second reference signal repetition of the reference signal repetitions in the first symbol after the gap period.

Aspect 10: The method of aspect 9, wherein communicating the first reference signal repetition and the second reference signal repetition further comprises: receiving the first reference signal repetition using a first receive beam; switching to a second receive beam during the gap period subsequent to the first reference signal repetition; and receiving the second reference signal repetition using the second receive beam.

Aspect 11: The method of any of aspects 9 through 10, further comprising: receiving a second control signal indicating a first duration of the gap period.

Aspect 12: The method of any of aspects 9 through 11, further comprising: applying the configuration for the padding duration by allocating a second gap period at a beginning of the padding duration, wherein a second duration of the second gap period is based at least in part on a first duration of the gap period, a third duration of at least one of the reference signal repetitions, and the padding duration.

Aspect 13: The method of any of aspects 1 through 12, wherein receiving the control signal further comprises: receiving, via the control signal comprising the configuration for the padding duration, an allocation of resources for the reference signal repetitions, the allocation of the resources indicating at least one of fractions of symbol numbers, symbol numbers corresponding to the SCS, or a bit indicative of a quantity of symbols in the padding duration and a symbol number indicating an offset from the first symbol to the padding duration.

Aspect 14: The method of any of aspects 1 through 13, wherein a quantity of the reference signal repetitions is based at least in part on a ratio of the padding duration to the symbol duration of each symbol of the plurality of symbols, and the symbol duration is inversely proportional to the SCS.

Aspect 15: A method for wireless communication at a UE, comprising: receiving an indication of an SCS for communications in a plurality of TTIs, wherein a TTI of the plurality of TTIs comprises a plurality of symbols, a corresponding plurality of cyclic prefixes, and a padding duration allocated for a beam switching procedure, and wherein a symbol duration of the plurality of symbols is based at least in part on the SCS and wherein the padding duration is longer than a duration corresponding to the beam switching procedure; receiving a control signal indicating a configuration for the padding duration, wherein the configuration allocates the padding duration for one or more operations different than the beam switching procedure; and performing, during at least a portion of the padding duration, at least one operation of the one or more operations for which the padding duration is allocated in accordance with the configuration.

Aspect 16: The method of aspect 15, wherein performing the at least one operation further comprises: communicating at least one reference signal and at least one corresponding cyclic prefix during the portion of the padding duration, wherein the portion of the padding duration is less than or the same as the symbol duration of each symbol of the plurality of symbols, and wherein the at least one reference signal is transmitted in a frequency domain or in a time domain.

Aspect 17: The method of aspect 15, wherein performing the at least one operation further comprises: communicating a set of coding bits during the portion of the padding duration, wherein the set of coding bits are communicated in a frequency domain or in a time domain using a cyclic prefix having a reduced duration.

Aspect 18: The method of aspect 15, wherein performing the at least one operation further comprises: performing an interference measurement procedure during the portion of the padding duration to obtain an interference measurement value; and transmitting an indication of the interference measurement value to a base station.

Aspect 19: The method of aspect 15, wherein performing the at least one operation further comprises: refraining from transmitting signals during the portion of the padding duration; and receiving an indication of an interference measurement value corresponding to an interference measurement procedure performed during the portion of the padding duration in accordance with refraining from transmitting the signals.

Aspect 20: The method of aspect 15, wherein performing the at least one operation further comprises: communicating an extended cyclic prefix during the portion of the padding duration, wherein the extended cyclic prefix comprises a repetition of a first symbol of the plurality of symbols.

Aspect 21: The method of any of aspects 15 through 20, further comprising: performing the beam switching procedure in a first portion of the padding duration; and performing the at least one operation in a remaining portion of the padding duration.

Aspect 22: The method of any of aspects 15 through 21, wherein receiving the control signal further comprises: receiving at least one of a TCI state update, DCI, or a MAC-CE comprising the configuration for the padding duration.

Aspect 23: The method of any of aspects 15 through 22, wherein receiving the control signal further comprises: receiving the control signal comprising an indication to switch from a first operation of the one or more operations to a second operation of the one or more operations, wherein performing the at least one operation comprises performing the second operation in accordance with the configuration.

Aspect 24: The method of any of aspects 15 through 23, wherein the at least one operation is based at least in part on a criterion associated with the communications between the UE and a base station in the plurality of TTIs.

Aspect 25: The method of any of aspects 15 through 24, wherein receiving the control signal further comprises: transmitting a UE capability message indicating a beam switching capability of the UE; and receiving the control signal in response to the UE capability message, wherein the one or more operations are based at least in part on the beam switching capability of the UE.

Aspect 26: The method of aspect 25, further comprising: receiving a signal that requests the UE capability message; and transmitting the UE capability message in response to the signal.

Aspect 27: The method of any of aspects 15 through 26, further comprising: transmitting an uplink message comprising a request for the one or more operations; and receiving the control signal comprising the configuration for the padding duration in response to the uplink message, wherein the configuration indicates the one or more operations based at least in part on the uplink message.

Aspect 28: A method for wireless communication at a base station, comprising: transmitting, to a UE, an indication of an SCS for communications in a plurality of TTIs, wherein a TTI of the plurality of TTIs comprises a plurality of symbols, a corresponding plurality of cyclic prefixes, and a padding duration, and wherein a symbol duration of the plurality of symbols is based at least in part on the SCS, and wherein the padding duration is longer than the symbol duration; transmitting, to the UE, a control signal comprising a configuration for the padding duration, wherein the configuration allocates the padding duration and a first symbol of the plurality of symbols for transmission of reference signal repetitions, the first symbol being subsequent in time to the padding duration; and communicating the reference signal repetitions during the padding duration and the first symbol in accordance with the configuration.

Aspect 29: The method of aspect 28, wherein communicating the reference signal repetitions further comprises: receiving, from the UE, the reference signal repetitions using a plurality of receive beams, wherein the reference signal repetitions are transmitted using a same transmit beam; and selecting a receive beam from the plurality of receive beams for reception of subsequent uplink signals in accordance with the reference signal repetitions, wherein the control signal indicates that the reference signal repetitions are configured for uplink beam refinement.

Aspect 30: A method for wireless communication at a base station, comprising: transmitting, to a UE, an indication of an SCS for communications in a plurality of TTIs, wherein a TTI of the plurality of TTIs comprises a plurality of symbols, a corresponding plurality of cyclic prefixes, and a padding duration allocated for a beam switching procedure, and wherein a symbol duration of the plurality of symbols is based at least in part on the SCS and wherein the padding duration is longer than a duration corresponding to the beam switching procedure; transmitting, to the UE, a control signal indicating a configuration for the padding duration, wherein the configuration allocates the padding duration for one or more operations different than the beam switching procedure; and performing, during at least a portion of the padding duration, at least one operation of the one or more operations for which the padding duration is allocated in accordance with the configuration.

Aspect 31: An apparatus for wireless communication at a UE, comprising: a processor; memory coupled with the processor; and instructions stored in the memory and executable by the processor to cause the apparatus to perform a method of any of aspects 1 through 14.

Aspect 32: An apparatus for wireless communication at a UE, comprising at least one means for performing a method of any of aspects 1 through 14.

Aspect 33: A non-transitory computer-readable medium storing code for wireless communication at a UE, the code comprising instructions executable by a processor to perform a method of any of aspects 1 through 14.

Aspect 34: An apparatus for wireless communication at a UE, comprising: a processor; memory coupled with the processor; and instructions stored in the memory and executable by the processor to cause the apparatus to perform a method of any of aspects 15 through 27.

Aspect 35: An apparatus for wireless communication at a UE, comprising at least one means for performing a method of any of aspects 15 through 27.

Aspect 36: A non-transitory computer-readable medium storing code for wireless communication at a UE, the code comprising instructions executable by a processor to perform a method of any of aspects 15 through 27.

Aspect 37: An apparatus for wireless communication at a base station, comprising a processor; memory coupled with the processor; and instructions stored in the memory and executable by the processor to cause the apparatus to perform a method of any of aspects 28 through 29.

Aspect 38: An apparatus for wireless communication at a base station, comprising at least one means for performing a method of any of aspects 28 through 29.

Aspect 39: A non-transitory computer-readable medium storing code for wireless communication at a base station, the code comprising instructions executable by a processor to perform a method of any of aspects 28 through 29.

Aspect 40: An apparatus for wireless communication at a base station, comprising a processor; memory coupled with the processor; and instructions stored in the memory and executable by the processor to cause the apparatus to perform a method of aspect 30.

Aspect 41: An apparatus for wireless communication at a base station, comprising at least one means for performing a method of aspect 30.

Aspect 42: A non-transitory computer-readable medium storing code for wireless communication at a base station, the code comprising instructions executable by a processor to perform a method of aspect 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving an indication of a subcarrier spacing for communications in a plurality of transmission time intervals, wherein a transmission time interval of the plurality of transmission time intervals comprises a plurality of symbols, a corresponding plurality of cyclic prefixes, and a padding duration, and wherein a symbol duration of the plurality of symbols is based at least in part on the subcarrier spacing, and wherein the padding duration is longer than the symbol duration;
   receiving a control signal indicating a configuration for the padding duration, wherein the configuration allocates the padding duration and a first symbol of the plurality of symbols for transmission of reference signal repetitions, the first symbol being subsequent in time to the padding duration; and
   communicating the reference signal repetitions during the padding duration and the first symbol in accordance with the configuration.

2. The method of claim 1, further comprising:
   applying the configuration for the padding duration by shifting a first cyclic prefix corresponding to the first symbol to be prior to the padding duration in a time domain.

3. The method of claim 1, wherein:
   the padding duration is contiguous to the first symbol in a time domain; and
   one or more samples of each reference signal repetition in the padding duration correspond to a respective cyclic prefix for a subsequent reference signal repetition.

4. The method of claim 1, wherein communicating the reference signal repetitions further comprises:
   receiving, from a base station, the reference signal repetitions during the padding duration and the first symbol.

5. The method of claim 4, wherein receiving the reference signal repetitions further comprises:

receiving the reference signal repetitions using a plurality of receive beams, wherein the reference signal repetitions are transmitted using a same transmit beam; and selecting a receive beam from the plurality of receive beams for reception of subsequent downlink signals in accordance with the reference signal repetitions, wherein the control signal indicates that the reference signal repetitions are configured for downlink beam refinement.

6. The method of claim 1, wherein communicating the reference signal repetitions further comprises:

transmitting the reference signal repetitions during the padding duration and the first symbol.

7. The method of claim 6, wherein transmitting the reference signal repetitions further comprises:

transmitting each of the reference signal repetitions using a same transmit beam, the reference signal repetitions comprising sounding reference signals, wherein the control signal indicates that the reference signal repetitions are configured for uplink beam refinement.

8. The method of claim 6, wherein transmitting the reference signal repetitions further comprises:

transmitting a plurality of random access preamble message repetitions during the padding duration and the first symbol.

9. The method of claim 1, wherein the configuration allocates that the padding duration comprises a gap period configured for a beam switching procedure, and wherein communicating the reference signal repetitions further comprises:

communicating a first reference signal repetition of the reference signal repetitions prior to the gap period; and communicating a second reference signal repetition of the reference signal repetitions in the first symbol after the gap period.

10. The method of claim 9, wherein communicating the first reference signal repetition and the second reference signal repetition further comprises:

receiving the first reference signal repetition using a first receive beam;

switching to a second receive beam during the gap period subsequent to the first reference signal repetition; and receiving the second reference signal repetition using the second receive beam.

11. The method of claim 9, further comprising:

receiving a second control signal indicating a first duration of the gap period.

12. The method of claim 9, further comprising:

applying the configuration for the padding duration by allocating a second gap period at a beginning of the padding duration, wherein a second duration of the second gap period is based at least in part on a first duration of the gap period, a third duration of at least one of the reference signal repetitions, and the padding duration.

13. The method of claim 1, wherein receiving the control signal further comprises:

receiving, via the control signal comprising the configuration for the padding duration, an allocation of resources for the reference signal repetitions, the allocation of the resources indicating at least one of fractions of symbol numbers, symbol numbers corresponding to the subcarrier spacing, or a bit indicative of a quantity of symbols in the padding duration and a symbol number indicating an offset from the first symbol to the padding duration.

14. The method of claim 1, wherein:

a quantity of the reference signal repetitions is based at least in part on a ratio of the padding duration to the symbol duration of each symbol of the plurality of symbols; and the symbol duration is inversely proportional to the subcarrier spacing.

15. A method for wireless communication at a user equipment (UE), comprising:

receiving an indication of a subcarrier spacing for communications in a plurality of transmission time intervals, wherein a transmission time interval of the plurality of transmission time intervals comprises a plurality of symbols, a corresponding plurality of cyclic prefixes, and a padding duration allocated for a beam switching procedure, and wherein a symbol duration of the plurality of symbols is based at least in part on the subcarrier spacing and wherein the padding duration is longer than a duration corresponding to the beam switching procedure;

receiving a control signal indicating a configuration for the padding duration, wherein the configuration allocates the padding duration for one or more operations different than the beam switching procedure; and performing, during at least a portion of the padding duration, at least one operation of the one or more operations for which the padding duration is allocated in accordance with the configuration.

16. The method of claim 15, wherein performing the at least one operation further comprises:

communicating at least one reference signal and at least one corresponding cyclic prefix during the portion of the padding duration, wherein the portion of the padding duration is less than or the same as the symbol duration of each symbol of the plurality of symbols, and wherein the at least one reference signal is transmitted in a frequency domain or in a time domain.

17. The method of claim 15, wherein performing the at least one operation further comprises:

communicating a set of coding bits during the portion of the padding duration, wherein the set of coding bits are communicated in a frequency domain or in a time domain using a cyclic prefix having a reduced duration.

18. The method of claim 15, wherein performing the at least one operation further comprises:

performing an interference measurement procedure during the portion of the padding duration to obtain an interference measurement value; and transmitting an indication of the interference measurement value to a base station.

19. The method of claim 15, wherein performing the at least one operation further comprises:

refraining from transmitting signals during the portion of the padding duration; and receiving an indication of an interference measurement value corresponding to an interference measurement procedure performed during the portion of the padding duration in accordance with refraining from transmitting the signals.

20. The method of claim 15, wherein performing the at least one operation further comprises:

communicating an extended cyclic prefix during the portion of the padding duration, wherein the extended cyclic prefix comprises a repetition of a first symbol of the plurality of symbols.

21. The method of claim 15, further comprising:
performing the beam switching procedure in a first portion of the padding duration; and
performing the at least one operation in a remaining portion of the padding duration.

22. The method of claim 15, wherein receiving the control signal further comprises:
receiving at least one of a transmission configuration indicator state update, downlink control information, or a medium access control-control element comprising the configuration for the padding duration.

23. The method of claim 15, wherein receiving the control signal further comprises:
receiving the control signal comprising an indication to switch from a first operation of the one or more operations to a second operation of the one or more operations, wherein performing the at least one operation comprises performing the second operation in accordance with the configuration.

24. The method of claim 15, wherein the at least one operation is based at least in part on a criterion associated with the communications between the UE and a base station in the plurality of transmission time intervals.

25. The method of claim 15, wherein receiving the control signal further comprises:
transmitting a UE capability message indicating a beam switching capability of the UE; and
receiving the control signal in response to the UE capability message, wherein the one or more operations are based at least in part on the beam switching capability of the UE.

26. The method of claim 25, further comprising:
receiving a signal that requests the UE capability message; and
transmitting the UE capability message in response to the signal.

27. The method of claim 15, further comprising:
transmitting an uplink message comprising a request for the one or more operations; and
receiving the control signal comprising the configuration for the padding duration in response to the uplink message, wherein the configuration indicates the one or more operations based at least in part on the uplink message.

28. A method for wireless communication at a base station, comprising:
transmitting, to a user equipment (UE), an indication of a subcarrier spacing for communications in a plurality of transmission time intervals, wherein a transmission time interval of the plurality of transmission time intervals comprises a plurality of symbols, a corresponding plurality of cyclic prefixes, and a padding duration, and wherein a symbol duration of the plurality of symbols is based at least in part on the subcarrier spacing, and wherein the padding duration is longer than the symbol duration;
transmitting, to the UE, a control signal comprising a configuration for the padding duration, wherein the configuration allocates the padding duration and a first symbol of the plurality of symbols for transmission of reference signal repetitions, the first symbol being subsequent in time to the padding duration; and
communicating the reference signal repetitions during the padding duration and the first symbol in accordance with the configuration.

29. The method of claim 28, wherein communicating the reference signal repetitions further comprises:
receiving, from the UE, the reference signal repetitions using a plurality of receive beams, wherein the reference signal repetitions are transmitted using a same transmit beam; and
selecting a receive beam from the plurality of receive beams for reception of subsequent uplink signals in accordance with the reference signal repetitions, wherein the control signal indicates that the reference signal repetitions are configured for uplink beam refinement.

30. A method for wireless communication at a base station, comprising:
transmitting, to a user equipment (UE), an indication of a subcarrier spacing for communications in a plurality of transmission time intervals, wherein a transmission time interval of the plurality of transmission time intervals comprises a plurality of symbols, a corresponding plurality of cyclic prefixes, and a padding duration allocated for a beam switching procedure, and wherein a symbol duration of the plurality of symbols is based at least in part on the subcarrier spacing and wherein the padding duration is longer than a duration corresponding to the beam switching procedure;
transmitting, to the UE, a control signal indicating a configuration for the padding duration, wherein the configuration allocates the padding duration for one or more operations different than the beam switching procedure; and
performing, during at least a portion of the padding duration, at least one operation of the one or more operations for which the padding duration is allocated in accordance with the configuration.

* * * * *